(12) United States Patent
Bennett et al.

(10) Patent No.: US 11,579,359 B2
(45) Date of Patent: Feb. 14, 2023

(54) REDUCED DIAMETER MULTI MODE OPTICAL FIBERS WITH HIGH MECHANICAL RELIABILITY

(71) Applicant: CORNING INCORPORATED, Corning, NY (US)

(72) Inventors: Kevin Wallace Bennett, Hammondsport, NY (US); Scott Robertson Bickham, Corning, NY (US); Pushkar Tandon, Painted Post, NY (US); Ruchi Sarda Tandon, Painted Post, NY (US); Bin Yang, Changzhou (CN)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/316,292

(22) Filed: May 10, 2021

(65) Prior Publication Data

US 2021/0356661 A1   Nov. 18, 2021

Related U.S. Application Data

(60) Provisional application No. 63/023,434, filed on May 12, 2020.

(51) Int. Cl.
*G02B 6/12*     (2006.01)
*C08F 22/10*    (2006.01)
(Continued)

(52) U.S. Cl.
CPC ........ *G02B 6/12002* (2013.01); *C03C 13/045* (2013.01); *C03C 25/105* (2013.01);
(Continued)

(58) Field of Classification Search
CPC ............ G02B 6/12002; G02B 6/02033; C08F 22/1006; C08F 22/14
See application file for complete search history.

(56) References Cited

U.S. PATENT DOCUMENTS 5,067,975 A * 11/1991 Backer .............. C03B 37/01446
65/427
5,140,665 A *  8/1992 Backer .............. C03B 37/01446
385/127

(Continued)

FOREIGN PATENT DOCUMENTS

WO   2001/049625 A1   7/2001
WO   2020/069053 A1   4/2020

OTHER PUBLICATIONS

Andrew D. Yablon, "Advanced Fiber Characterization Technologies for Fiber Lasers and Amplifiers", Conference on Advanced Solid State Lasers, Paper # ATh2A.45, Shanghai, China, Nov. 16-21, 2014.

(Continued)

*Primary Examiner* — Peter Radkowski
(74) *Attorney, Agent, or Firm* — Kevin L. Bray

(57) ABSTRACT

A disclosed multimode optical fiber comprises a core and a cladding surrounding the core. The core has an outer radius $r_1$ in between 20 μm and 30 μm. The cladding includes a first outer cladding region having an outer radius $r_{4a}$ and a second outer cladding region having an outer radius $r_{4b}$ less than or equal to 45 μm. The second outer cladding region comprises silica-based glass doped with titania. The optical fiber further includes a primary coating with an outer radius $r_5$ less than or equal to 80 μm, and a thickness $(r_5-r_4)$ less than or equal to 30 μm. The optical fiber further includes a secondary coating with an outer radius $r_6$ less than or equal to 100 μm. The secondary coating has a thickness $(r_6-r_5)$ less than (Continued)

or equal to 30 μm, and a normalized puncture load greater than $3.6 \times 10^{-3}$ g/micron$^2$.

28 Claims, 12 Drawing Sheets

(51) Int. Cl.
  *C03C 13/04* (2006.01)
  *C03C 25/105* (2018.01)
  *C08F 22/14* (2006.01)
  *C08G 18/32* (2006.01)
  *G02B 6/02* (2006.01)

(52) U.S. Cl.
  CPC .......... *C08F 22/1006* (2020.02); *C08F 22/14* (2013.01); *C08G 18/3221* (2013.01); *G02B 6/02033* (2013.01); *G02B 2006/1209* (2013.01); *G02B 2006/12038* (2013.01); *G02B 2006/12073* (2013.01)

(56) References Cited

U.S. PATENT DOCUMENTS

| | | | |
|---|---|---|---|
| 5,180,411 A * | 1/1993 | Backer | C03B 37/014 65/435 |
| 5,241,615 A | 8/1993 | Amos et al. | |
| 6,316,516 B1 | 11/2001 | Chien et al. | |
| 7,805,039 B2 | 9/2010 | Sanders et al. | |
| 9,989,699 B2 * | 6/2018 | Bennett | G02B 6/02266 |
| 11,054,573 B2 | 7/2021 | Bickham et al. | |
| 2012/0230638 A1* | 9/2012 | Bickham | G02B 6/03672 385/124 |
| 2018/0003890 A1 | 1/2018 | Bickham et al. | |
| 2018/0120503 A1* | 5/2018 | Bennett | G02B 6/02333 |
| 2019/0331848 A1 | 10/2019 | Bennett et al. | |
| 2019/0331849 A1 | 10/2019 | Bennett et al. | |
| 2019/0331850 A1 | 10/2019 | Bennett et al. | |
| 2019/0383999 A1 | 12/2019 | Abbott et al. | |
| 2020/0271858 A1 | 8/2020 | Bickham et al. | |

OTHER PUBLICATIONS

Baldauf et al., "Relationship of Mechanical Characteristics of Dual Coated Single Mode Optical Fibers and Microbending Loss", IEICE Transactions on Communications, vol. E76-B, No. 4, 1993, pp. 352-357.
Bickham et al., "Reduced diameter fibers for high-density optical interconnects", In Proceedings of SPIE Optical Interconnects, vol. XVIII, 2018, 7 pages.
Bickham, "Optical Fibers for Short-Reach High-Density Interconnects", In Optical Fiber Communication Conference, 2019, 3 pages.
Chu et al., "Measurement of stresses in optical fiber and preform", Applied Optics vol. 21, Issue 23, 1982, pp. 4241-4245.
Glaesemann et al., "Dynamic Fatigue Data for Fatigue Resistant Fiber in Tension vs. Bending", Optical Fiber Communication Conference, Technical Digest Series, vol. 5, WA3, Feb. 1989, 1 page.
Glavas et al., "Increased Durability of Optical Fiber Through the Use of Compressive Cladding", In Optics Letters vol. 7, Issue 5, 1982, pp. 241-243.
Gulati et al., "Improvements in Optical Fiber Reliability via High Fatigue Resistant Composition", In SPIE, vol. 842, Fiber Optics Reliability: Benign and Adverse Environments, 1987, pp. 22-31.
Li et al., Ultra-Low Bending Loss Single-Mode Fiber for FTTH, Journal of Lightwave Technology, vol. 27, No. 3, Feb. 1, 2009, 7 pages.
Park et al., "Measurement method for profiling the residual stress and the strain-optic coefficient of an optical fiber", In Applied Optics, vol. 41, Issue 1, 2002, pp. 21-26.
Vethanayagam et al.; "Mechanical Performance and Reliability of Corning Titan SMF CPC5 Fiber After Exposure to a Variety of Environments"; Proc SPIE 1366, Fiber Optics Reliability, Feb. 1991; pp. 343-350.
International Search Report and Written Opinion of the International Searching Authority; PCT/US2021/029518; dated Aug. 6, 2021; 12 pages; European Patent Office.

* cited by examiner

REDUCED DIAMETER MULTI MODE OPTICAL FIBERS WITH HIGH MECHANICAL RELIABILITY

This application claims priority under 35 USC § 119(e) from U.S. Provisional Patent Application Ser. No. 63/023,434 filed on May 12, 2020 which is incorporated by reference herein in its entirety.

FIELD

The present disclosure relates to optical fibers and in particular relates to reduced diameter multimode optical fibers with high mechanical reliability.

BACKGROUND

Data centers are continually striving to meet the challenge of delivering more bandwidth, and a key part of that endeavor is the deployment of higher capacity interconnects and cables with higher bandwidth density. Multimode optical fibers are widely used in data centers. To achieve higher capacity in data centers it is desirable to develop multimode optical fibers with reduced diameter. Multimode optical fibers with reduced diameters are attractive for reducing the size of cables for a given optical fiber count, increasing the optical fiber count of cables of a given diameter, decreasing cable cost, efficiently using existing infrastructure for upgrading cable installations, and reducing the footprint of new cable installations.

However, efforts to date to reduce the diameter of multimode optical fibers without compromising in the performance of the multimode optical fibers have achieved limited success. There remains a need for multimode fibers with reduced diameters for data center applications. In particular, there is a need for reduced-diameter multimode optical fibers that can be incorporated into higher fiber count cables and terminated with higher density connectors. The reduced-diameter multimode optical fibers must maintain high modal bandwidths needed for high transmission capacity in data centers and must have coatings that are optimized to mitigate microbending without sacrificing puncture resistance and other mechanical properties.

BRIEF SUMMARY

Accordingly, one aspect of the present disclosure provides optical fiber cables having high transmission capacity, low transmission loss, similar size to traditional cables or cables with higher fiber densities. Another aspect of the present disclosure provides optical fibers in the cables having small diameter, low transmission loss, low microbending loss, and high puncture resistance.

Aspect 1 of the description discloses: A multimode optical fiber, comprising: a core region having an outer radius $r_1$ in a range from 20 microns to 30 microns; a cladding region surrounding and directly adjacent to the core region, the cladding region including a first outer cladding region having an outer radius $r_{4a}$ and a second outer cladding region having an outer radius $r_{4b}$, wherein the second outer cladding region comprises silica-based glass doped with titania and $r_{4b}$ is less than or equal to 45 microns; a primary coating with an outer radius $r_5$ less than or equal to 80 microns surrounding and directly adjacent to the cladding region, the primary coating having a thickness $(r_5-r_4)$ less than or equal to 30 microns; and a secondary coating with an outer radius $r_6$ less than or equal to 100 microns surrounding and directly adjacent to the primary coating, the secondary coating having a thickness $(r_6-r_5)$ less than or equal to 30 microns, and a normalized puncture load greater than $3.6\times10^3$ g/micron$^2$.

Aspect 2 of the description discloses: The multimode optical fiber of Aspect 1, wherein: the second outer cladding region has a titania concentration in a range from 4 wt % to 20 wt.

Aspect 3 of the description discloses: The multimode optical fiber of Aspect 1 or 2, wherein: the core region has a graded index relative refractive index profile with a maximum relative refractive index $\Delta_{1max}$ in a range from 0.8% to 1.20%.

Aspect 4 of the description discloses: The multimode optical fiber of Aspect 3, wherein the graded index relative refractive index profile is an α-profile with a value of α in a range from 1.8 to 2.3.

Aspect 5 of the description discloses: The multimode optical fiber of any of Aspects 1-4, wherein: the first outer cladding region has an outer radius $r_{4a}$ less than or equal to 43 microns; and the second outer cladding region has a thickness $(r_{4b}-r_{4a})$ in a range from 2 microns to 6 microns.

Aspect 6 of the description discloses: The multimode optical fiber of any of Aspects 1-5, wherein: the first outer cladding region has a relative refractive index $\Delta_{4a}$ that is in the range from -0.05% to 0.05%; and the second outer cladding region has a relative refractive index $\Delta_{4b}$ that is larger than $\Delta_{1max}$.

Aspect 7 of the description discloses: The multimode optical fiber of any of Aspects 1-6, wherein: the cladding region further includes an inner cladding region surrounding and directly adjacent to the core region, the inner cladding region having an outer radius $r_2$ and a thickness $(r_2-r_1)$ in a range from 1 micron to 15 microns; and a relative refractive index $\Delta_2$ of the inner cladding region is less than a relative refractive index $\Delta_{4a}$ of the first outer cladding region.

Aspect 8 of the description discloses: The multimode optical fiber of any of Aspects 1-6, wherein: the cladding region further includes an inner cladding region surrounding and directly adjacent to the core region, the inner cladding region having an outer radius $r_2$ and a thickness $(r_2-r_1)$ in a range from 1 micron to 15 microns; and a relative refractive index $\Delta_2$ of the inner cladding region is less than a relative refractive index $\Delta_{4b}$ of the second outer cladding region.

Aspect 9 of the description discloses: The multimode optical fiber of any of Aspects 1-6, wherein: the cladding region further includes an inner cladding region and a depressed index cladding region; the inner cladding region directly surrounds the core region, and has an outer radius $r_2$ and a thickness $(r_2-r_1)$ in a range from 1 micron to 5 microns; the depressed index cladding region directly surrounds the inner cladding region, and has an outer radius $r_3$ and a thickness $(r_3-r_2)$ in a range from 3 microns to 10 microns; and a relative refractive index $\Delta_2$ of the inner cladding region is greater than a relative refractive index $\Delta_3$ of the depressed index cladding region.

Aspect 10 of the description discloses: The multimode optical fiber of Aspect 9, wherein: the relative refractive index $\Delta_2$ is in the range from -0.05% to 0.05%; and the relative refractive index $\Delta_3$ is in a range from -0.55% to -0.1%.

Aspect 11 of the description discloses: The multimode optical fiber of Aspect 9 or 10, wherein: the depressed index cladding region has a trench volume in a range from 70% Δ-micron$^2$ to 150% Δ-micron$^2$.

Aspect 12 of the description discloses: The multimode optical fiber of any of Aspects 1-11, wherein: the in situ modulus of the primary coating $E_p$ is less than or equal to 0.30 MPa; and the Young's modulus of the secondary coating $E_s$ is greater than or equal to 1600 MPa.

Aspect 13 of the description discloses: The multimode optical fiber of any of Aspects 1-11, wherein: the in situ modulus of the primary coating $E_p$ is less than or equal to 0.20 MPa; and the Young's modulus of the secondary coating $E_s$ is greater than or equal to 1900 MPa.

Aspect 14 of the description discloses: The multimode optical fiber of any of Aspects 1-13, wherein: a diameter $2r_5$ of the primary coating is less than or equal to 150 microns; and a diameter $2r_6$ of the secondary coating is less than or equal to 180 microns.

Aspect 15 of the description discloses: The multimode optical fiber of any of Aspects 1-13, wherein: a diameter $2r_5$ of the primary coating is less than or equal to 125 microns; and a diameter $2r_6$ of the secondary coating is less than or equal to 165 microns.

Aspect 16 of the description discloses: The multimode optical fiber of any of Aspects 1-15, wherein the thickness $(r_5-r_4)$ of the primary coating is in a range from 8.0 microns to 20.0 microns.

Aspect 17 of the description discloses: The multimode optical fiber of any of Aspects 1-16, wherein the thickness $(r_6-r_5)$ of the secondary coating is in a range from 8.0 microns to 20.0 microns.

Aspect 18 of the description discloses: The multimode optical fiber of any of Aspects 1-17, wherein a ratio of the thickness $(r_5-r_4)$ of the primary coating to the thickness $(r_6-r_5)$ of the secondary coating is in a range from 0.5 to 1.5.

Aspect 19 of the description discloses: The multimode optical fiber of any of Aspects 1-18, wherein a spring constant $\chi_p$ of the primary coating is less than or equal to 1.3 MPa.

Aspect 20 of the description discloses: The multimode optical fiber of any of Aspects 1-18, wherein a spring constant $\chi_p$ of the primary coating is in a range from 0.3 MPa to 1.2 MPa.

Aspect 21 of the description discloses: The multimode optical fiber of any of Aspects 1-20, further comprising: a tertiary coating with an outer radius $r_7$ less than or equal to 100 microns surrounding and directly adjacent to the secondary coating, the tertiary coating having a thickness $(r_7-r_6)$ less than or equal to 10 microns.

Aspect 22 of the description discloses: The multimode optical fiber of Aspect 21, wherein a summation $(r_7-r_5)$ of the thickness of the secondary coating and the thickness of the tertiary coating is in a range from 10 microns to 30 microns.

Aspect 23 of the description discloses: The multimode optical fiber of any of Aspects 1-22, wherein the primary coating is a cured product of a coating composition comprising: a radiation-curable monomer; an adhesion promoter, the adhesion promoter comprising an alkoxysilane compound or a mercapto-functional silane compound; and an oligomer, the oligomer comprising: a polyether urethane acrylate compound having the molecular formula:

alkylene groups; y is 1, 2, 3, or 4; and x is between 40 and 100; and a di-adduct compound having the molecular formula:

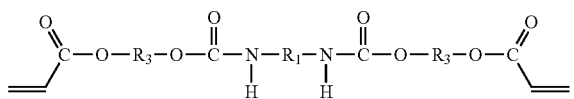

wherein the di-adduct compound is present in an amount of at least 1.0 wt % in the oligomer.

Aspect 24 of the description discloses: The multimode optical fiber of Aspect 23, wherein the oligomer is the cured product of a reaction between: a diisocyanate compound; a hydroxy (meth)acrylate compound; and a polyol compound, said polyol compound having unsaturation less than 0.1 meq/g; wherein said diisocyanate compound, said hydroxy (meth)acrylate compound and said polyol compound are reacted in molar ratios n:m:p, respectively, wherein n is in the range from 3.0 to 5.0, m is within ±15% of 2n−4, and p is 2.

Aspect 25 of the description discloses: The multimode optical fiber of any of Aspects 1-24, wherein the secondary coating is the cured product of a composition comprising: an alkoxylated bisphenol-A diacrylate monomer in an amount greater than 55 wt %, the alkoxylated bisphenol-A diacrylate monomer having a degree of alkoxylation in the range from 2 to 16; and a triacrylate monomer in an amount in the range from 2.0 wt % to 25 wt %, the triacrylate monomer comprising an alkoxylated trimethylolpropane triacrylate monomer having a degree of alkoxylation in the range from 2 to 16 or a tris[(acryloyloxy)alkyl] isocyanurate monomer.

Aspect 26 of the description discloses: The multimode optical fiber of Aspect 25, wherein the triacrylate monomer is present in an amount in the range from 8.0 wt % to 15 wt %.

Aspect 27 of the description discloses: The multimode optical fiber of any of Aspects 1-26, wherein the overfilled launch bandwidth is greater than 1000 MHz-km at a wavelength 850 nm, 980 nm, 1064 nm and/or 1300 nm.

Aspect 28 of the description discloses: An optical coupling comprising the multimode optical fiber of any of Aspects 1-27.

Aspect 29 of the description discloses: The optical coupling of Aspect 28, further comprising: a waveguide; and a connector structure in direct contact with the waveguide, the connector structure configured to support the multimode optical fiber at a bend radius $r_b$.

Aspect 30 of the description discloses: The optical coupling of Aspect 29, wherein the waveguide comprises a grating and the connector structure is configured to interface the multimode optical fiber with the grating.

Aspect 31 of the description discloses: The optical coupling of Aspect 29 or 30, wherein the bend radius $r_b$ is 3 mm or less.

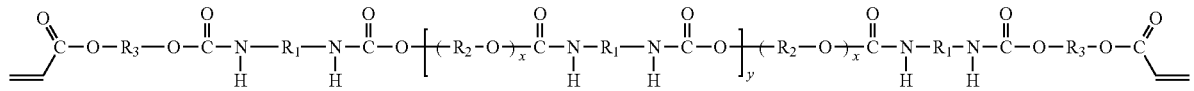

wherein $R_1$, $R_2$ and $R_3$ are independently selected from linear alkylene groups, branched alkylene groups, or cyclic Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
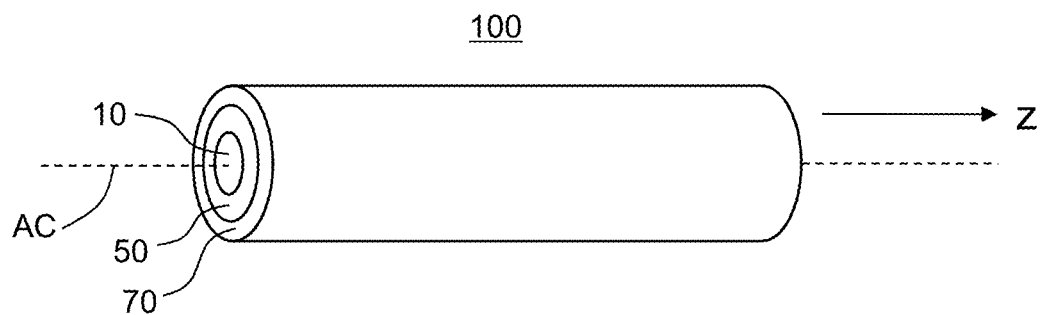
FIG. 1 is a side elevated view of a section of an exemplary optical fiber, according to some embodiments.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. When a numerical value or end-point of a range does not recite "about," the numerical value or end-point of a range is intended to include two embodiments: one modified by "about," and one not modified by "about."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

As used herein, "comprising" is an open-ended transitional phrase. A list of elements following the transitional phrase "comprising" is a non-exclusive list, such that elements in addition to those specifically recited in the list may also be present.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

The term "wherein" is used as an open-ended transitional phrase, to introduce a recitation of a series of characteristics of the structure.

Cartesian coordinates are used in some of the Figures for the sake of reference and ease of illustration and are not intended to be limiting as to direction or orientation. The z-direction is taken as the axial direction of the optical fiber.

The term "fiber" as used herein is shorthand for optical fiber.

The coordinate r is a radial coordinate, where r=0 corresponds to the centerline of the fiber. The term "radius" refers to a value of the radial coordinate. The term "outer radius", when used in reference to a region of a fiber, refers to the largest radial coordinate included in the region. The term "diameter", when used in reference to a region of a fiber, refers to twice the outer radius of the region.

The term "core" as used herein is a core region of an optical fiber, representing a cylinder of material, centered at r=0, that runs along the optical fiber's length. The core is characterized by its radius of cross-sectional area corresponding to confinement (e.g. 90%) of optical intensity in the optical fiber. The core is surrounded by a medium with a lower index of refraction, typically a cladding region. Light travelling in the core reflects from the core-cladding boundary due to total internal reflection, as long as the angle between the light and the boundary is greater than the critical angle. As a result, the optical fiber transmits all rays that enter the fiber with a sufficiently small angle relative to the optical fiber's axis.

The term "core radius" as used herein is referred to geometric core radius which is determined from the refractive index profile.

The symbol "microns" is used as shorthand for "micron," which is a micrometer, i.e., $1 \times 10^{-6}$ meter.

The symbol "nm" is used as shorthand for "nanometer," which is $1 \times 10^{-9}$ meter.

The limits on any ranges cited herein are inclusive and thus to lie within the range, unless otherwise specified.

The terms "comprising," and "comprises," e.g., "A comprises B," is intended to include as a special case the concept of "consisting," as in "A consists of B."

The phrase "bare optical fiber" or "bare fiber" as used herein means an optical fiber directly drawn from a heated glass source (i.e., a "preform") and prior to applying a protective coating layer to its outer surface (e.g., prior to the bare optical fiber being coated with a polymeric-based material).

"Refractive index" refers to the refractive index at a wavelength of 1550 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or parameter (e.g. $\Delta$ or $\Delta$ %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value ($\Delta_{ave}$) of relative refractive index in the region as defined below, unless otherwise specified. Whether by design or a consequence of normal manufacturing variability, the dependence of relative refractive index on radial position may be sloped, curved, or otherwise non-constant.

The average relative refractive index ($\Delta_{ave}$) of a region of the fiber is determined from:

$$\Delta_{ave} = \int_{r_{inner}}^{r_{outer}} \frac{\Delta(r) dr}{(r_{outer} - r_{inner})}$$

where $r_{inner}$ is the inner radius of the region, router is the outer radius of the region, and $\Delta(r)$ is the relative refractive index of the region.

The "relative refractive index" as used herein is defined as:

$$\Delta(r)\% = 100 \frac{n^2(r) - n_{cl}^2}{2n^2(r)}$$

where n(r) is the refractive index of the fiber at the radial distance r from the fiber's centerline AC (r=0) at a wavelength of 1550 nm, unless otherwise specified, and $n_{cl}$ is the refractive index of essentially pure silica, which is 1.444 at a wavelength of 1550 nm.

In the description that follows, the relative refractive index (also referred herein as the "relative refractive index percent" for short) is represented by A (or "delta"), A % (or "delta %"), or %, all of which can be used interchangeably, and its values are given in units of percent or %, unless otherwise specified. Relative refractive index is also expressed as $\Delta(r)$ or $\Delta(r)$ %.

In some embodiments, the bare optical fiber includes a region with a refractive index less than the reference index $n_{cl}$, which means that the relative refractive index percent of the region is negative. In other embodiments, the bare optical fiber includes a region with a refractive index greater than the reference index $n_{cl}$, which means that the relative refractive index percent of the region is positive. In some embodiments, the bare optical fiber includes a region with a negative relative refractive index percent and a region with a positive relative refractive index percent. The minimum relative refractive index of a region corresponds to the point in the region at which the relative refractive index is lowest. The maximum relative refractive index of a region corresponds to the point in the region at which the relative refractive index is greatest. Depending on the relative refractive index profile and on the region, each of the minimum relative refractive index and the maximum relative refractive index may be positive or negative.

In some embodiments, the term "dopant" refers to a substance that changes the relative refractive index of glass relative to pure un-doped $SiO_2$. In some embodiments, one or more other substances that are not updopants may be present in a region of an optical fiber (e.g., the core) having a positive relative refractive index $\Delta$. That is, in some embodiments, the core includes an updopant and a down-dopant and has a net relative refractive index that is positive. In some embodiments, the dopants used to form the core of the optical fiber disclosed herein include $GeO_2$ (germania), $Al_2O_3$ (alumina), and the like. Dopants that increase the relative refractive index of glass relative to pure un-doped $SiO_2$ are referred to as up-dopants and dopants that decrease the relative refractive index of glass relative to pure un-doped $SiO_2$ are referred to as down-dopants. Glass that contains an up-dopant is said to be "up-doped" relative to pure un-doped $SiO_2$ and glass that contains a down-dopant is said to be "down-doped" relative to pure un-doped $SiO_2$. When the undoped glass is silica glass, updopants include Cl, Br, Ge, Al, P, Ti, Zr, Nb, Ta, and oxides thereof, and downdopants include F and B. When comparing two doped glasses (or two doped regions of a bare optical fiber), the doped glass (or glass region) having the higher relative refractive index is said to be up-doped relative to the doped glass (or glass region) having a lower relative refractive index and the doped glass (or glass region) having the lower relative refractive index is said to be down-doped relative to the doped glass (or glass region) having the higher relative refractive index. Glass regions of constant refractive index may be formed by not doping or by doping at a uniform concentration over the thickness of the region. Regions of variable refractive index are formed through non-uniform spatial distributions of dopants over the thickness of a region and/or through incorporation of different dopants in different portions of a region.

In some embodiments, the relative refractive index of a region is an α-profile defined by a parameter α. The parameter α (also called the "profile parameter" or "alpha parameter") relates to the relative refractive $\Delta(r)$ of a region through the equation:

$$\Delta(r) = \Delta_0 \{1 - [(r - r_m)/(r_0 - r_m)]^\alpha\}$$

where $r_m$ is the point where $\Delta(r)$ is the maximum $\Delta_0$, $r_0$ is the point at which $\Delta(r)$ reaches a minimum value and r is in the range $r_i$ to $r_f$, where $\Delta(r)$ is defined above, $r_i$ is the initial point of the α-profile, $r_f$ is the final point of the α-profile and a is an exponent that is a real number. In one example, $r_0$ is the point at which $\Delta(r)=0$. At low values of α, the α-profile is a graded index profile. As the value of a increases, the α-profile more closely resembles a step index profile. For purposes of the present disclosure, an α-profile with α>10 is regarded as a step index relative refractive profile and an α-profile with α<10 is regarded as a graded relative refractive index profile.

The "trench volume" is denoted by $V_{Trench}$ and is defined as $$V_{Trench} = |2\int_{r_{Trench,inner}}^{r_{Trench,outer}} \Delta Trench(r) r \, dr|$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. In one embodiment, the trench region is an inner cladding region and $r_{Trench,inner}$ is $r_1$, $r_{Trench,outer}$ is $r_2$, and $\Delta_{Trench}$ is $\Delta_2$. In another embodiment, the trench region is a depressed index cladding region and $r_{Trench,inner}$ is $r_2$, $r_{Trench,outer}$ is $r_3$, and $\Delta_{Trench}$ is $\Delta_3$. Trench volume is defined as an absolute value and has a positive value. Trench volume is expressed herein in units of %Δmicron$^2$, %Δ-micron$^2$, %Δ-μm$^2$, or %Δμm$^2$, whereby these units can be used interchangeably herein.

The "spring constant" $\chi_p$ of a primary coating is computed from the following equation:

$$\chi_p = \frac{E_p d_g}{t_p}$$

where $E_p$ is the in situ modulus of the primary coating, $t_p$ is the thickness of the primary coating, and $d_g$ is the diameter $2r_{4b}$ of the glass fiber. The spring constant is a phenomenological parameter that describes the extent to which the primary coating mitigates coupling of the secondary coating to the glass fiber. (See "Relationship of Mechanical Characteristics of Dual Coated Single Mode Optical Fibers and Microbending Loss", by J. Baldauf et al., IEICE Transactions on Communications, Vol. E76-B, No. 4, pp. 352-357 (1993)) In the phenomenological model, the buffering effect of the primary coating is modeled as a spring with the spring constant given in the above equation. A low spring constant leads to greater resistance to microbending. The tradeoff of in situ modulus and thickness in establishing the resistance of the primary coating to microbending is reflected in the spring constant.

The "operating wavelength", $\lambda_{op}$, of an optical fiber is the wavelength at which the optical fiber is operated. The operating wavelength corresponds to the wavelength of a guided mode. Representative operating wavelengths include 850 nm, 1064 nm, 1310 nm and 1550 nm, which are commonly used in telecommunications systems, optical data links, and data centers. Although a particular operating wavelength may be specified for an optical fiber, it is understood that a particular optical fiber can operate at multiple operating wavelengths and/or over a continuous range of operating wavelengths. Characteristics such as modal bandwidth may vary with the operating wavelength and the relative refractive index profile of a particular optical fiber may be designed to provide optimal performance at a particular operating wavelength, a particular combination of operating wavelengths, or particular continuous range of operating wavelengths.

"Bandwidth" at a specified wavelength refers to overfilled launch (OFL) bandwidth at the specified wavelength as specified in the TIA/EIA 455-204 and IEC 60793-1-41 standards.

The optical fibers disclosed herein include a core region, a cladding region directly adjacent to and surrounding the core region, and a coating directly adjacent to and surrounding the cladding region. The cladding region is a single homogeneous region or multiple regions that differ in relative refractive index. The multiple cladding regions are preferably concentric regions.

In some embodiments, the cladding region includes an inner cladding region, a first outer cladding region directly adjacent to and surrounding the inner cladding region, and a second outer cladding region directly adjacent to and surrounding the first outer cladding region. The relative refractive index of the inner cladding region may be greater than, equal to, or less than the relative refractive index of the first outer cladding region. In embodiments without a depressed index cladding region, an inner cladding region having a lower refractive index than the first outer cladding region is referred to herein as a trench or trench region.

In some embodiments, the cladding region includes a depressed index cladding region between and directly adjacent to an inner cladding region and an outer cladding region, where the outer cladding region includes a first outer cladding region that surrounds and is directly adjacent to the depressed index cladding region and a second outer cladding region that surrounds and is directly adjacent to the first outer cladding region. The depressed index cladding region is a cladding region having a lower relative refractive index than the inner cladding and the first outer cladding region. The depressed index cladding region may also be referred to herein as a trench or trench region. The depressed index cladding region surrounds and is directly adjacent to the inner cladding region. The depressed index cladding region is surrounded by and directly adjacent to a first outer cladding region. The first outer cladding region is surrounded by and directly adjacent to a second outer cladding region. The depressed index cladding region may contribute to a reduction in bending losses.

The core region, inner cladding region, depressed index cladding region, first outer cladding region and second outer cladding region are also referred to as core, inner cladding, depressed index cladding, first outer cladding, and second outer cladding, respectively. The inner cladding, depressed index cladding, first outer cladding, and second outer cladding may independently have a positive or negative relative refractive index. The core preferably has a positive relative refractive index. Preferred values for relative refractive index for each of the regions are given below.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the depressed index cladding region, radial position $r_{4a}$ and relative refractive index $\Delta_{4a}$ or $\Delta_{4a}(r)$ refer to the first outer cladding region, radial position $r_{4b}$ and relative refractive index $\Delta_{4b}$ or $\Delta_{4b}(r)$ refer to the second outer cladding region, radial position $r_5$ refers to the primary coating, radial position $r_6$ refers to the secondary coating, and radial position $r_7$ refers to the optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta 2$ min. The relative refractive index $\Delta_3(r)$ has a maximum value $\Delta_{3max}$ and a minimum value $\Delta 3$ min. The relative refractive index $\Delta_{4a}(r)$ has a maximum value $\Delta_{4amax}$ and a minimum value $\Delta_{4amin}$. The relative refractive index $\Delta_{4b}(r)$ has a maximum value $\Delta_{4bmax}$ and a minimum value $\Delta_{4bmin}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that a surrounding inner cladding region, a surrounding depressed index cladding region, a surrounding outer cladding region, a surrounding primary coating, a surrounding secondary coating, and a surrounding tertiary coating are substantially annular in shape. Annular regions are characterized in terms of an inner radius and an outer radius. Radial positions $r_1$, $r_2$, $r_3$, $r_{4a}$, $r_{4b}$, $r_5$, $r_6$, and $r_7$ refer herein to the outermost radii of the core, inner cladding, depressed index cladding, first outer cladding, second outer cladding, primary coating, secondary coating, and tertiary coating, respectively. Radius $r_{4b}$ corresponds to the outer radius of the glass portion of the optical fiber. The radius $r_6$ corresponds to the outer radius of the optical fiber in embodiments without a tertiary coating. When a tertiary coating is present, the radius $r_7$ corresponds to the outer radius of the optical fiber.

When two regions are directly adjacent to each other, the outer radius of the inner of the two regions coincides with the inner radius of the outer of the two regions. In one embodiment, for example, the fiber includes a depressed index cladding region surrounded by and directly adjacent to a first outer cladding region. In such an embodiment, the radius $r_3$ corresponds to the outer radius of the depressed index cladding region and the inner radius of the first outer cladding region. In embodiments in which the relative refractive index profile includes a depressed index cladding region surrounding and directly adjacent to an inner cladding region, the radial position $r_2$ corresponds to the outer radius of the inner cladding region and the inner radius of the depressed index cladding region. In embodiments in which the relative refractive index profile includes a depressed index cladding region surrounding and directly adjacent to the core, the radial position $r_1$ corresponds to the outer radius of the core and the inner radius of the depressed index cladding region.

The following terminology applies to embodiments in which the relative refractive index profile includes an inner cladding region surrounding and directly adjacent to the core, a depressed index cladding region surrounding and directly adjacent to the inner cladding region, a first outer cladding region surrounding and directly adjacent to the depressed index cladding region, a second outer cladding region surrounding and directly adjacent to the first outer cladding region, a primary coating surrounding and directly adjacent to the second outer cladding region, and a secondary coating surrounding and directly adjacent to the primary coating. The difference between radial position $r_2$ and radial position $r_1$ is referred to herein as the thickness of the inner cladding region. The difference between radial position $r_3$ and radial position $r_2$ is referred to herein as the thickness of the depressed index cladding region. The difference between radial position $r_{4a}$ and radial position $r_3$ is referred to herein as the thickness of the first outer cladding region. The difference between radial position $r_{4b}$ and radial position $r_{4a}$ is referred to herein as the thickness of the second outer cladding region. The difference between radial position $r_5$ and radial position $r_{4b}$ is referred to herein as the thickness of the primary coating. The difference between radial position $r_6$ and radial position $r_5$ is referred to herein as the thickness of the secondary coating.

The following terminology applies to embodiments in which an inner cladding region is directly adjacent to a core region, a first outer cladding region directly adjacent to the core region, and a second outer cladding region is directly adjacent the first outer cladding region. The difference between radial position $r_2$ and radial position $r_1$ is referred to herein as the thickness of the inner cladding region. The difference between radial position $r_{4a}$ and radial position $r_2$ is referred to herein as the thickness of the first outer cladding region. The difference between radial position $r_{4b}$ and radial position $r_{4a}$ is referred to herein as the thickness of the second outer cladding region. The difference between radial position $r_5$ and radial position $r_4$ is referred to herein as the thickness of the primary coating. The difference between radial position $r_6$ and radial position $r_5$ is referred to herein as the thickness of the secondary coating.

The following terminology applies to embodiments in which the relative refractive index profile lacks both an inner cladding region and a depressed index cladding region. The difference between radial position $r_{4a}$ and radial position $r_1$ is referred to herein as the thickness of the first outer cladding region. The difference between radial position $r_{4b}$ and radial position $r_4$a is referred to herein as the thickness of the second outer cladding region. The difference between radial position $r_5$ and radial position $r_{4b}$ is referred to herein as the thickness of the primary coating. The difference between radial position $r_6$ and radial position $r_5$ is referred to herein as the thickness of the secondary coating.

The coatings described herein are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "molecular weight" when applied to polyols means number average molecular weight ($M_n$).

The term "(meth)acrylate" means methacrylate, acrylate, or a combination of methacrylate and acrylate.

Values of Young's modulus, % elongation, and tear strength refer to values as determined under the measurement conditions by the procedures described herein.

Commercially-available multimode optical fibers with small outer cladding diameters and small coated fiber diameters suffer from increased microbending losses unless the numerical aperture is increased or the core diameter is decreased, both of which negatively impact the compatability with transceivers and conventional multimode optical fibers. Improving microbending losses for the multimode optical fibers has been difficult if the total thickness of the primary and secondary coatings has a smaller value than the 56.0-65.0 microns for standard telecommunication fibers. Decreasing the modulus of the primary coating can help reduce the microbending sensitivity of the fiber, but the thickness of the primary coating can only be increased if there is a concomitant decrease in the thickness of secondary coating given the constraint on the total thickness of the two coating layers. Decreasing the secondary coating thickness is undesirable because it reduces puncture resistance of the coated fiber.

Embodiments of the present description relate to a reduced-diameter multimode optical fiber with small outer coating diameters (≤170 microns), and a small outer cladding diameter (≤90 microns). The disclosed reduced-diameter multimode optical fiber can have good microbending properties and good resistance to puncture if the thicknesses of the primary and secondary coatings are each at least about 10 microns. In some embodiments, the relative coating thickness, $t_P/t_S$, is in the range $0.5 \leq t_P/t_S \leq 1.5$.

The disclosed reduced-diameter multimode optical fiber is suitable for data center applications and features high modal bandwidth, low attenuation, low microbending sensitivity, and puncture resistance in a compact form factor. The disclosed multimode optical fibers have an increased reliability of being routed through extremely tight bend configurations or bend in a small radius arc inside a fiber array unit that couples an array of fibers to arrays of lasers and photodiodes. The disclosed multimode optical fibers comprise a second outer cladding region doped with titania to improve mechanical integrity by increasing the value of the fatigue constant. In some embodiments, the reliability is further enhanced by a reduction in the diameter of the second outer cladding region $2r_{4b}$ to 90 microns or less.

The disclosed multimode optical fibers also have low bend loss, which is achieved through the addition of a trench in the inner cladding. The disclosed multimode optical fibers have an overfilled launch (OFL) bandwidth greater than 200 MHz-km (e.g., greater than 300 MHz-km, greater than 400 MHz-km, greater than 500 MHz-km, greater than 1000 MHz-km, greater than 2000 MHz-km, greater than 4000 MHz-km, etc.) at a wavelength 850 nm, 980 nm, 1064 nm and/or 1300 nm.

Reference will now be made in detail to illustrative embodiments of the present description.

One aspect of the present disclosure relates to a multimode optical fiber. FIG. 1 is a side elevated view of a section of an exemplary multimode optical fiber, according to some embodiments. As shown, the multimode optical fiber 100 comprises a glass core region ("core") 10 that is centered on the centerline AC. The core 10 can be immediately surrounded by a glass cladding region ("cladding") 50. The cladding 50 can be immediately surrounded by a protective coating 70 made of a non-glass material, such as a polymeric material.

Figure 2:
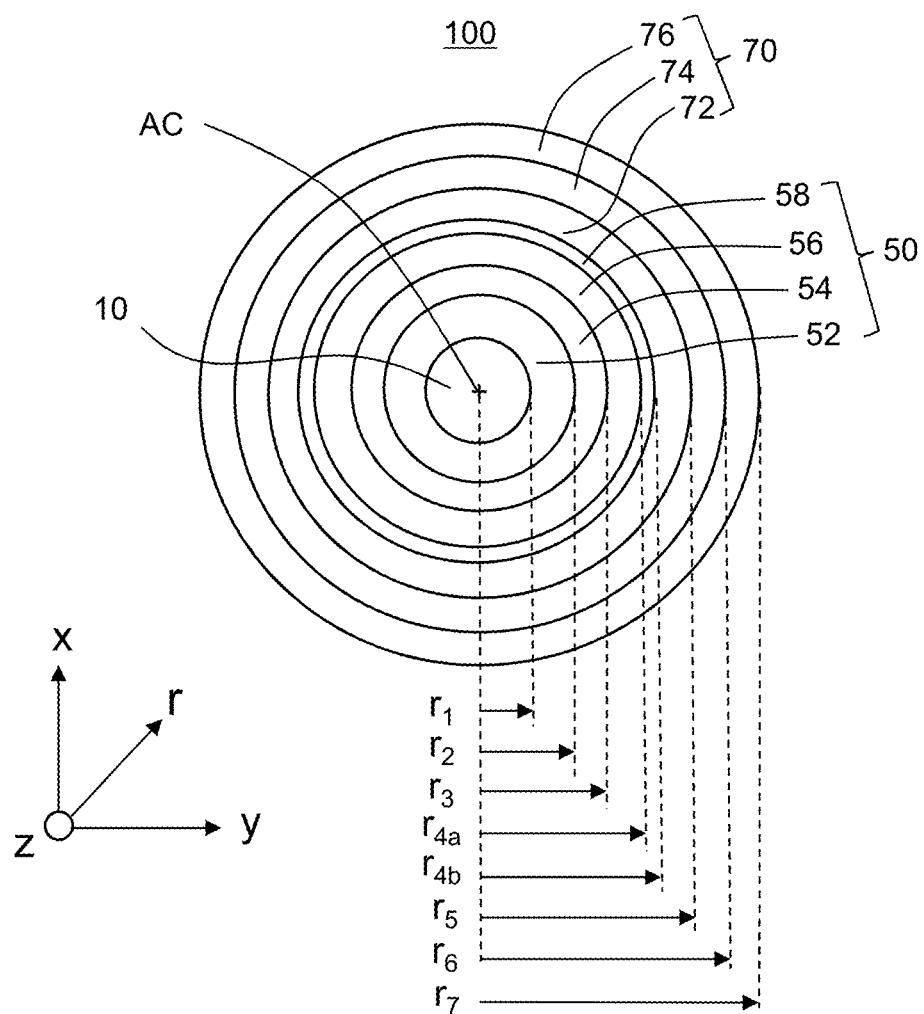
FIG. 2 is a cross-sectional view of an exemplary optical fiber, according to some embodiments.

Referring to FIG. 2, a cross-sectional view of an exemplary multimode optical fiber 100 is shown in a cross sectional view in x-y plane, in accordance with some embodiments of the present disclosure.

As shown, the multimode optical fiber 100 includes a waveguiding glass fiber surrounded by a protective coating 70 (hereinafter "coating"). The glass fiber includes a higher index core region 10 (hereinafter "core") surrounded by a lower index cladding region 50 (hereinafter "cladding"). In some embodiments, the coating 70 typically includes a primary coating with low modulus in contact with the glass fiber and a secondary coating with high modulus that surrounds and contacts the primary coating. The secondary coating provides mechanical integrity and allows the multimode optical fiber 100 to be handled for processing and installation in cables, while the primary coating acts to dissipate external forces to prevent the external forces from being transferred to the glass fiber. By dampening the external forces, the primary coating prevents damage to the glass fiber and minimizes attenuation of optical signals caused by microbending.

As illustrated, the core 10 has a radius $r_1$ and a relative refractive index $\Delta_1$. The cladding 50 can be directly adjacent to and surrounding the core 10. In some embodiments, the cladding 50 includes an inner cladding region ("inner cladding") 52 directly adjacent to and surrounding the core 10, a depressed index cladding region ("depressed index cladding") 54 directly adjacent to and surrounding the inner cladding 52, and a first outer cladding region ("first outer cladding") 56 directly adjacent to and surrounding the depressed index cladding 54, and a second outer cladding region ("second outer cladding") 58 directly adjacent to and surrounding the first outer cladding 56. The inner cladding 52 extends from the radius $r_1$ to a radius $r_2$ and has a relative refractive index $\Delta_2$. The depressed index cladding 54 extends from the radius $r_2$ to a radius $r_3$ and has a relative refractive index $\Delta_3$. The first outer cladding 56 extends from the radius $r_3$ to a radius $r_{4a}$ and has a relative refractive index $\Delta_{4a}$ while the second outer cladding 58 extends from the radius $r_{4a}$ to a radius $r_4$ and has a relative refractive index $\Delta_{4b}$.

In some alternative embodiments not shown in the figures, the depressed index cladding 54 can be omitted. That is, the cladding 50 includes only three cladding regions. The inner cladding 52 is directly adjacent to and surrounds the core 10, extends from the radius $r_1$ to a radius $r_2$, and has a relative refractive index $\Delta_2$. The first outer cladding 56 is directly adjacent to and surrounds the inner cladding 52, extends from the radius $r_2$ to a radius $r_{4a}$, and has a relative refractive index $\Delta_{4a}$. The second outer cladding 58 is directly adjacent to and surrounds the first outer cladding 56, extends from the radius $r_{4a}$ to a radius $r_{4b}$, and has a relative refractive index $\Delta_{4b}$.

In some other alternative embodiments not shown in the figures, the inner cladding 52 and the depressed index cladding 54 can be omitted. That is, the cladding 50 includes only two outer cladding regions. The first outer cladding 56 is directly adjacent to and surrounding the core 10, extends from the radius $r_1$ to a radius $r_{4a}$, and has a relative refractive index $\Delta_{4a}$. The second outer cladding 58 is directly adjacent to and surrounds the first outer cladding 56, extends from the radius $r_{4a}$ to a radius $r_{4b}$, and has a relative refractive index $\Delta_{4b}$.

Protective coating 70 is directly adjacent to and surrounds the cladding 50. In some embodiments, the protective coating 70 includes a primary coating 72 and a secondary coating 74. The primary coating 72 and the secondary coating 74 are typically formed by applying a curable coating composition to the glass fiber as a viscous liquid and curing. In some embodiments, the protective coating 70 may also include a tertiary coating 76 that surrounds the secondary coating 74.

The secondary coating 74 is a harder material (higher Young's modulus) than the primary coating 72 and is designed to protect the glass fiber from damage caused by abrasion or external forces that arise during processing, handling, and installation of the optical fiber. The primary coating 72 is a softer material (lower Young's modulus) than the secondary coating 74 and is designed to buffer or dissipates stresses that result from forces applied to the outer surface of the secondary coating 74.

The primary coating 72 dissipates shear forces and minimizes the stress that reaches the glass fiber (which includes the core 10 and the cladding 50). The primary coating 72 is especially important in dissipating shear forces that arise due to the microbends that the optical fiber encounters when deployed in a cable. The primary coating 72 should maintain adequate adhesion to the glass fiber during thermal and hydrolytic aging, yet be strippable from the glass fiber for splicing purposes.

The optional tertiary coating 76 may include pigments, inks or other coloring agents to mark the optical fiber for identification purposes and typically has a Young's modulus similar to the Young's modulus of the secondary coating 74.

Figure 3:
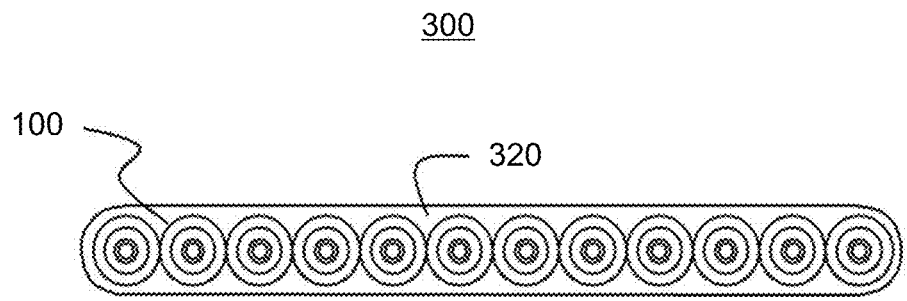
FIG. 3 is a schematic view of a representative optical fiber ribbon, according to some embodiments.

Another aspect of the present disclosure relates to an optical fiber ribbon. FIG. 3 illustrates a cross-sectional view of an exemplary optical fiber ribbon 300 in accordance with some embodiments of the present disclosure. As illustrated, the optical fiber ribbon 300 includes a plurality of optical fibers 100 and a matrix 320 encapsulating the plurality of optical fibers 100. Each optical fiber 100 includes a core, a cladding, and a protective coating as described above. The ribbon matrix 320 can be formed from the same composition used to prepare a secondary coating, or the ribbon matrix 320 can be formed from a different composition that is otherwise compatible for use.

The optical fibers 100 are aligned relative to one another in a substantially planar and parallel relationship. The optical fibers 100 in the optical fiber ribbon 300 are encapsulated by the ribbon matrix 320 in any suitable configuration (e.g., edge-bonded ribbon, thin-encapsulated ribbon, thick-encapsulated ribbon, or multi-layer ribbon) by any suitable fabricating methods. In FIG. 3, the fiber optic ribbon 300 contains twelve (12) optical fibers 100; however, it should be apparent to those skilled in the art that any number of optical fibers 100 (e.g., two or more) may be employed to form fiber optic ribbon 300 disposed for a particular use.

Figure 4:
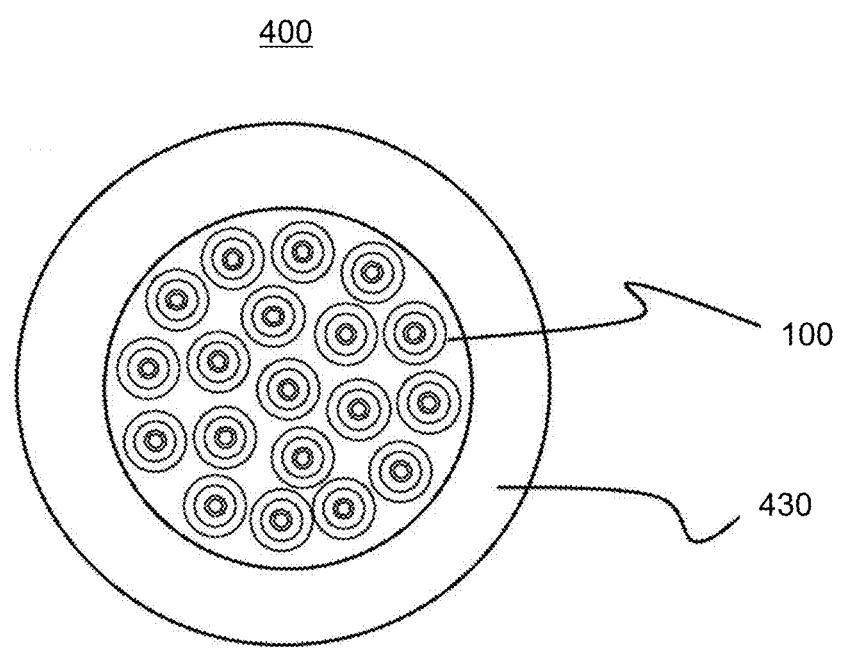
FIG. 4 is a schematic view of a representative optical fiber cable, according to some embodiments.

Another aspect of the present disclosure relates to an optical fiber cable. FIG. 4 illustrates a cross-sectional view of an exemplary optical fiber cable 400. Cable 400 includes a plurality of optical fibers 100 surrounded by jacket 430. Optical fibers 100 may be densely or loosely packed into a conduit enclosed by inner surface of jacket 430. The number of fibers placed in the jacket 430 is referred to as the "fiber count" of optical fiber cable 400. The jacket 430 is formed from an extruded polymer material and may include multiple concentric layers of polymers or other materials. Optical fiber cable 400 may include one or more strengthening members (not shown) embedded within jacket 430 or placed within the conduit defined by the inner surface of jacket 430. Strengthening members include fibers or rods that are more rigid than jacket 430. The strengthening member is made from metal, braided steel, glass-reinforced plastic, fiberglass, or other suitable material. Optical fiber cable 400 may include other layers surrounded by jacket 430 (e.g. armor layers, moisture barrier layers, rip cords, etc.). Optical fiber cable 400 may have a stranded, loose tube core or other fiber optic cable construction.

Fiber Coupling and Minimum Bend Radius

Figure 5:
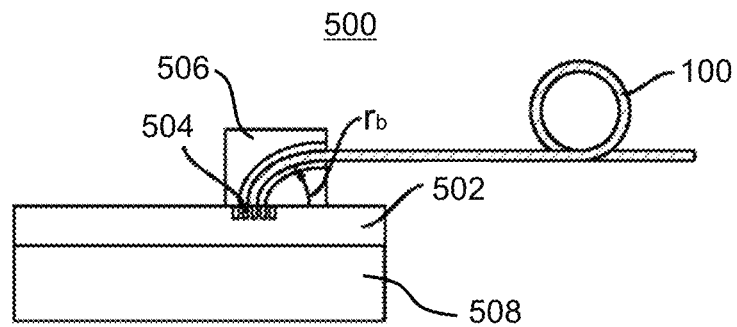
FIG. 5 shows an optical fiber coupled to a Si photonic waveguide through a ferrule connector with a curved hole for supporting a section of the optical fiber.

One challenging problem is to couple light from a silicon photonic device (e.g., a waveguide or VCSEL) to the multimode optical fiber with low cost. Referring to FIG. 5, an optical coupling 500 is shown, according to some embodiments. Elements of FIG. 5 that share numbers with those of FIGS. 1-4 may have the same structure and function as described herein in reference to FIGS. 1-4. In some embodiments, optical coupling 500 comprises a multimode optical fiber 100, a waveguide 502 on a substrate 508, and a grating 504. Optical coupling 500 may further comprise a connector structure 506.

In some embodiments, grating 504 may allow light to transmit from waveguide 502 (e.g., silicon waveguide) to multimode optical fiber 100 and/or vice versa (e.g., optical coupling). Connector structure 506 may be used to protect, support, and/or guide multimode optical fiber 100 close to where multimode optical fiber 100 interfaces with waveguide 502. Depending on volume requirements (e.g., tight spaces at data centers, the space above waveguide 502 being about 4-5 mm or less), multimode optical fiber 100 may be bent with approximately a quarter of turn (e.g., approximately 82-degree arc) at bend radius of approximately 3 mm or less, for example ≤2.5 mm. Connector structure 506 may be, for example, a glass or ceramic ferrule with curved hole. Connector structure 506 may also comprise a pair of V-groove arrays, with the first V-groove array oriented perpendicularly to waveguide 502, the second V-groove array oriented parallel to the waveguide 502, and the multimode optical fiber 100 bent at an angle between about 82 to 98 degrees between the first and second V-groove arrays. The fiber-guiding geometry of connector structure 506 may be curved such that it matches a desired bend radius, $r_b$, for multimode optical fiber 100. It should be appreciated that the bend radius $r_b$ may represent an average radius (e.g., if the fiber-guiding geometry has a non-constant radius of curvature). Multimode optical fiber 100 may be stripped of the coating down to the glass cladding, and the stripped portion inserted into the hole of connector structure 506 and bonded with an epoxy or other type of bonding agent. Typically, ordinary comparative optical fibers fiber may become easily damaged during stripping. Subsequently, the fiber insertion process may cause multimode optical fiber 100 to break (e.g., insertion failure). Insertion failure may result from mechanical stress induced by a small bend radius $r_b$. Under stress, surface defects imposed on ordinary comparative optical fibers may propagate deeper into the glass of the optical fiber, causing mechanical failure (fiber break) and/or shortened life cycle of the product. However, embodiments disclosed herein provide optical fibers that can be coupled to photonic devices even when bent to radii of 3 mm or less while providing robustness against mechanical failure or degradation. By reducing the bend radius $r_b$, the volume of optical coupling 500 may be made smaller (e.g., connector structure 506 may be made smaller), which in turn increases the number of fiber connections capable of being housed in a given space of a data center.

In some embodiments, the multimode optical fibers 100 disclosed herein can be coupled to silicon photonic device and having sufficient reliability when deployed inside an approximately 90-degree bend fiber array unit (FAU), even when bent to radii of 3.5 mm or less without mechanical failure due or fiber break, which have a minimum bend radius in the 2.5-3.5 mm range, even tighter bends are possible from a reliability standpoint if the cladding also includes a second outer cladding doped with titania. The disclosed multimode optical fibers 100 can be advantageously inserted through the hole in the coupling structure 506 that has a bend radius $r_b$ of approximately 2.5 mm or less (e.g., 1.5 mm≤$r_b$≤2.5 mm), without succumbing to mechanical failure or degradation, and thus can be bent to a such a small diameter without substantial loss of strength or significant loss of lifetime. Multimode optical fibers 100 advantageously have improved surface damage resistance and low bending loss.

It is noted that, strategies for reducing the diameter of the multimode optical fiber 100 include reducing the diameter of glass fiber and reducing the thickness of the primary and/or secondary coating. In some situations, these strategies may lead to compromises in the performance of the multimode optical fiber 100. For example, a smaller outer cladding diameter tends to increase the microbending sensitivity and to increase attenuation of the optical signal propagating in the core. As another example, decreasing the outer cladding diameter from 125 microns to 90 microns may lead to a significant increase in microbending sensitivity compared to current optical fiber designs. As yet another example, thinner primary coatings may be more susceptible to shear-induced defects during processing, while thinner secondary coatings may be more susceptible to punctures and abrasions during coloring, cabling or ribbonizing.

The disclosed multimode optical fiber 100 can have smaller outer cladding diameters, which enable the multimode optical fiber 100 to be deployed in tight bends, at a radius as small as 1.5 microns for an 82-degree bend.

Further, a titania-doped outer cladding can be used for more increased reliability requirement, such as even smaller bend radii for a same arc length, or multiple bend conditions at a given bend radius, etc. Therefore, the disclosed multimode optical fiber 100 can have a high transmission capacity, a small diameter, a low transmission loss, good microbending properties, and high puncture resistance.

Figure 6:
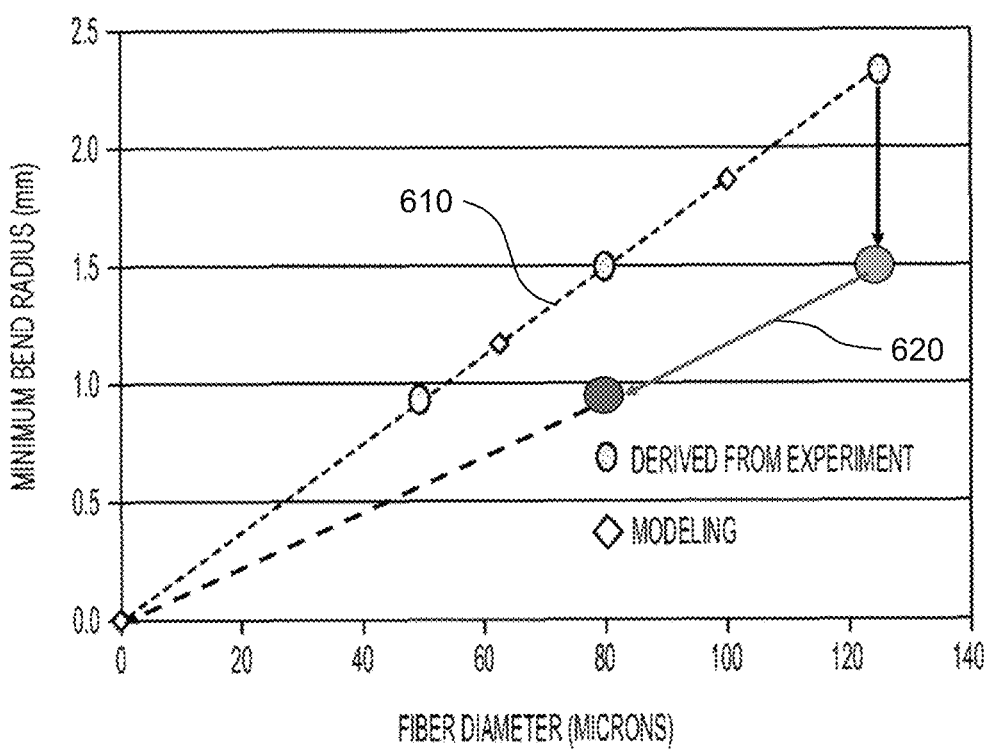
FIG. 6 shows the relationship between minimum bend radius and fiber cladding diameter.

FIG. 6 illustrates a plot of the relationship between minimum bend radius (mm) and outermost fiber cladding diameter (microns) for an 82-degree bend condition. The vertical axis of the graph represents a bend radius $r_b$ (see FIG. 5), in mm, of an optical fiber. The horizontal axis represents an outermost diameter, in microns, of the cladding of the optical fiber (e.g., $2r_{4b}$ for fibers with first and second outer cladding regions as described herein). The data that makes up the plots includes modeled and experimentally derived data and extrapolations. The plot in FIG. 6 regards configurations, for a multimode optical fiber 100 (e.g., FIGS. 1-4) being bent in a single 82-degree (approximately) arc, of the optical fiber in which the probability of failure of the optical fiber over a 5-year lifetime is $10^{-10}$ or less (i.e., the expectant lifetime of the bent optical fiber 100 is at least 5 years).

For describing embodiments with respect to FIG. 6, as a non-limiting example, reference is made to structures of multimode optical fiber 100 in FIG. 2. In some embodiments, plot 610 indicates the long term reliability limits of a comparative optical fiber having no titania-doped outer cladding (e.g., a comparative fiber in which the first outer cladding 56 is undoped silica and the second outer cladding 58 is undoped silica) based on both modelling and experiment. Plot 610 shows that, when the comparative optical fiber has an outermost diameter of cladding 50 of approximately 125 microns, the comparative optical fiber may be bent to a bend radius of approximately 2.3 mm with $10^{-10}$ probability of failure over a 5-year lifetime. Bending of the comparative optical fiber with an outermost cladding diameter of 125 microns to a bend radius of less than approximately 2.3 mm reduces the lifetime of the comparative optical fiber to less than κ years. Plot 610 shows that the relationship between bend radius and outermost cladding diameter is linear for the given conditions (i.e., approximately 82-degree bend arc and tolerance $10^{-10}$ probability of failure over a 5-year). Following the linear relationship, plot 610 shows that, when the comparative optical fiber has an outer diameter of cladding 50 of approximately 100 microns, the comparative optical fiber may be bent to a bend radius of approximately 1.9 mm with $10^{-10}$ probability of failure over a 5-year lifetime. Plot 610 shows that, when the comparative optical fiber has an outer diameter of cladding 50 of approximately 80 microns, the comparative optical fiber may be bent to a bend radius of approximately 1.5 mm (with $10^{-10}$ probability of failure over a 5-year lifetime). Plot 610 shows that, when the comparative optical fiber has an outer diameter of cladding 50 of approximately 62.5 microns, the comparative optical fiber may be bent to a bend radius of approximately 1.2 mm (with $10^{-10}$ probability of failure over a 5-year lifetime). Plot 610 shows that, when the comparative optical fiber has an outer diameter of cladding 50 of approximately 53 microns, the comparative optical fiber may be bent to a bend radius of approximately 1 mm (with $10^{-10}$ probability of failure over a 5-year lifetime).

Embodiments described herein employ titania-doped second outer cladding to increase robustness of an optical fiber at smaller bend radii. In some embodiments, plot 620 indicates the long-term reliability limits of optical fiber 100 having a titania-doped outer cladding having a thickness of 3 microns and a titania concentration of 8 wt. %. Plot 620 shows that, when optical fiber 100 has an outer diameter of cladding 50 of approximately 125 microns, optical fiber 100 may be bent to a bend radius of approximately 1.5 mm (with $10^{-10}$ probability of failure over a 5-year lifetime). Plot 620 shows that, when optical fiber 100 has an outer diameter of cladding 50 of approximately 80 microns, optical fiber 100 may be bent to a bend radius of approximately 1 mm (with $10^{-10}$ probability of failure over a 5-year lifetime). Such decreasing in the minimum allowable deployment bend radius (consistent with an expected 5-year lifetime) relative to the undoped silica-clad comparative fiber is due to titania doping of the second outer cladding region, which provide higher breaking stresses and increased fatigue resistance value (e.g., in a range from 26 to 32 instead of about 20 for undoped silica), which is a measure of a material's susceptibility to subcritical crack growth under stress.

The disclosed multimode optical fibers 100 has an improved fiber reliability, which is important for being able to deploy the multimode optical fibers 100 in short reach (e.g., fiber length less than 10 m, or less than 1 m, or between 10 cm and 1 m, or between 10 cm to 50 cm, or between 10 cm to 25 cm, etc.) interconnects within data centers, especially when the multimode optical fiber 100 is routed in configurations with effective bend radii $r_b$ less than 3.0 mm, or less than 2.5 mm, or less than 2.0 mm, etc. The short reach interconnects typically have a fairly short usage lifetime (e.g., 3-5 years) in practice, which is the same lifetime as the electronic equipment they will be connected to. These very short reach interconnects can be deployed within a rack or even within a server.

Relative Refractive Index Profiles

In some embodiments, the multimode optical fiber 100 can have a number of different physical configurations defined by way of example as a relative refractive index profile. One type of the disclosed optical fiber is a graded-index fiber, which has a core region with a refractive index that varies with distance from the fiber center. Examples of graded-index fibers include fibers having a core with a relative refractive index having an α-profile defined above or a super-Gaussian relative refractive index profile. Examples of the graded-index fibers are set forth below in connection with FIGS. 7A-7C.

Figure 7A:
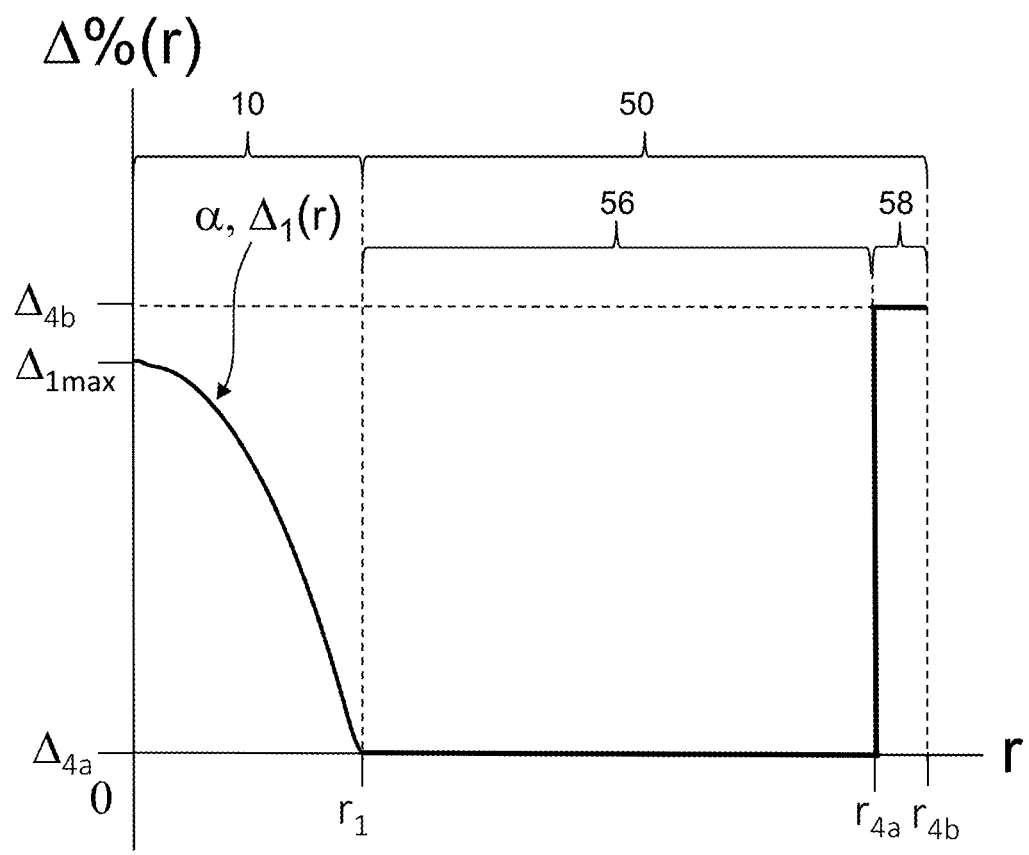
FIGS. 7A through 7C are exemplary relative refractive index profiles of an optical fiber, according to some embodiments.

Referring to FIG. 7A, a plot of the relative refractive index Δ % (r) versus the radial coordinate illustrating a first exemplary physical configuration of a graded-index fiber, according to some embodiments. As shown, the core 10 having a radius $r_1$ can have a graded refractive index defined by described by an α-profile. The radial position $r_0$ (corresponding to $\Delta_{1max}$) of the α-profile corresponds to the centerline AC (r=0) of the fiber and the radial position $r_z$ of the α-profile corresponds to the core radius $r_1$. In some embodiments with a centerline dip, the radial position $r_0$ is slightly offset from the centerline AC of the fiber.

In some embodiments, the core 10 is immediately surrounded by the cladding 50 that extends from the radius $r_1$ to a radius $r_{4b}$. The cladding 50 can include a first outer cladding region 56 surrounding the core 10, and a second outer cladding region 58 surrounding the first outer cladding region 56. The first outer cladding region 56 can be a pure silica cladding or a SiO$_2$ cladding extending from the radius $r_1$ to a radius $r_{4a}$ and having a relative refractive index $\Delta_{4a}$ that is substantially zero. The second outer cladding region 58 can be an up-doped cladding extending from the radius $r_{4a}$ to the radius $r_{4b}$, and having a relative refractive index $\Delta_{4b}$. In some embodiments, the second outer cladding region 58 is a silica-based glass doped with titania. In some embodiments, $\Delta_{4b}$ is larger than $\Delta_{1max}$.

Figure 7B:
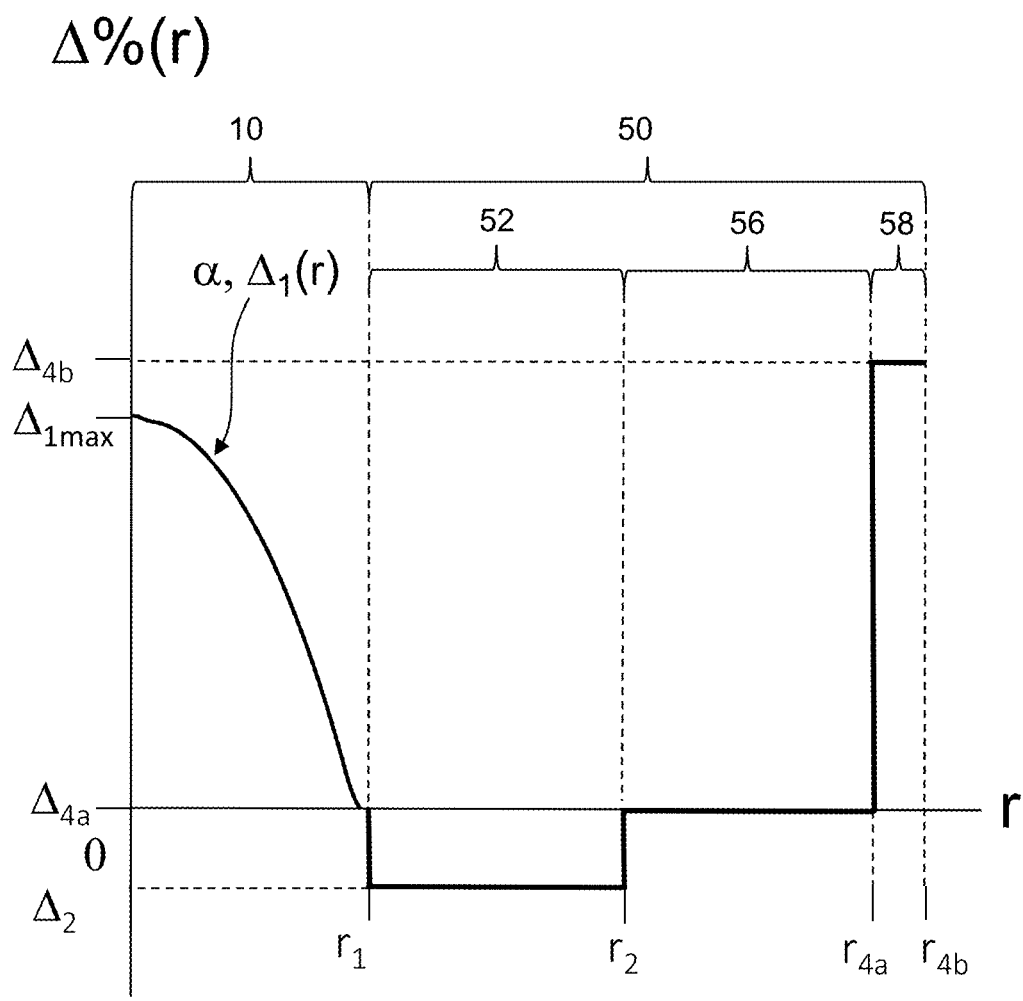

FIG. 7B is a plot of the relative refractive index Δ % (r) versus the radial coordinate illustrating a second exemplary physical configuration of a graded-index fiber, according to some embodiments. The core 10 having a radius $r_1$ can have a graded refractive index defined by described by an α-profile. The core 10 is immediately surrounded by the cladding 50 that extends from the radius $r_1$ to a radius $r_{4b}$. The cladding 50 includes an inner cladding region 52, a first outer cladding region 56 surrounding the core 10, and a second outer cladding region 58 surrounding the first outer cladding region 56. The inner cladding region 52 can be a down-doped cladding extending from the radius $r_1$ to a radius $r_2$ and having a negative relative refractive index $\Delta_2$. The first outer cladding region 56 can be a pure silica cladding or a doped SiO$_2$ cladding extending from the radius $r_2$ to a radius $r_{4a}$ and having a relative refractive index $\Delta_{4a}$, which in one embodiment is substantially zero. The second outer cladding region 58 can be an up-doped cladding extending from the radius $r_{4a}$ to the radius $r_{4b}$, and having a relative refractive index $\Delta_{4b}$. In some embodiments, the second outer cladding region 58 is a silica-based glass doped with titania. In some embodiments, $\Delta_{4b}$ is larger than $\Delta_{1max}$.

Figure 7C:
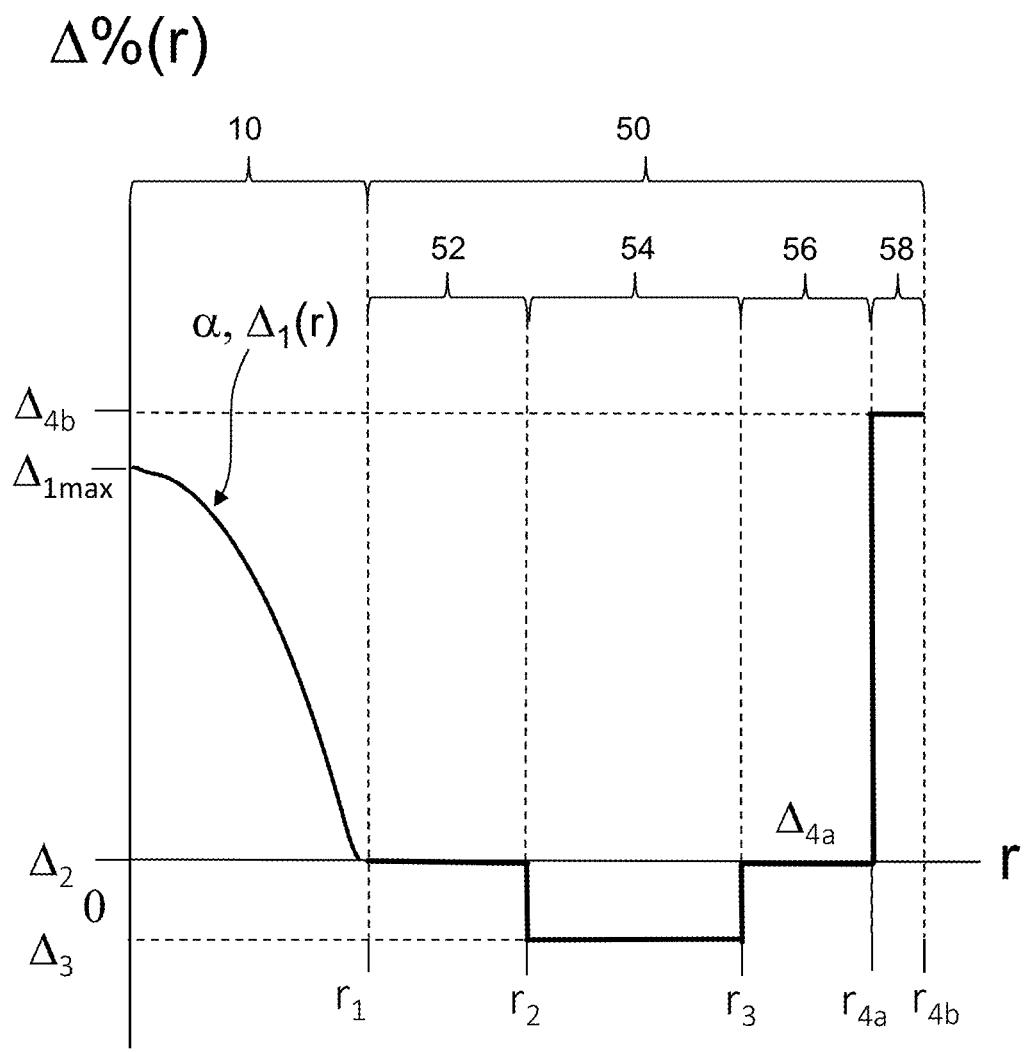

FIG. 7C is a plot of the relative refractive index Δ % (r) versus the radial coordinate illustrating a third exemplary physical configuration of a graded-index fiber, according to some embodiments. The core 10 having a radius $r_1$ can have a graded refractive index defined by described by an α-profile. The core 10 is immediately surrounded by the cladding 50 that extends from the radius $r_1$ to a radius $r_{4b}$. The cladding 50 includes an inner cladding region 52, a depressed index cladding 54 directly adjacent to and surrounding the inner cladding 52, a first outer cladding region 56 directly adjacent to and surrounding the depressed index cladding 54, and a second outer cladding region 58 directly adjacent to and surrounding the first outer cladding region 56. The inner cladding region 52 can be a pure silica cladding or a SiO$_2$ cladding extending from the radius $r_1$ to a radius $r_2$ and having a relative refractive index $\Delta_2$. The depressed index cladding 54 can be a down-doped silica cladding extending from the radius $r_2$ to a radius $r_3$ and having a negative relative refractive index $\Delta 3$. The first outer cladding region 56 can be a pure silica cladding extending from the radius $r_1$ to a radius $r_{4a}$ and having a relative refractive index $\Delta_{4a}$ that is substantially zero. The second outer cladding region 58 can be an up-doped cladding extending from the radius $r_{4a}$ to the radius $r_{4b}$, and having a relative refractive index $\Delta_{4b}$. In some embodiments, the second outer cladding region 58 is a silica-based glass doped with titania. In some embodiments, $\Delta_{4b}$ is larger than $\Delta_{1max}$. The relative refractive index $\Delta_3$ is less than the relative refractive index $\Delta_2$ and the relative refractive index $\Delta_4$a. The relative refractive index $\Delta_{4b}$ is greater than the relative refractive index $\Delta_4$a. In some embodiments, the relative refractive index $\Delta_2$ is less than the relative refractive index $\Delta_{4a}$ and in other embodiments, the relative refractive index $\Delta_2$ is greater than or equal to the relative refractive index $\Delta_{4a}$.

Parameter Specifications of Properties

In some embodiments, various fiber parameters described herein can be properly designed to increase transmission capacity, puncture resistance and microbending performance. In the following, details of various designs of the fiber parameters are described below. It is noted that, the following numerical values for fiber parameters can be applied to fibers with either step index cores or graded index cores described, for example, above in connection with FIGS. 7A-7C.

Referring again optical fiber 100 in FIG. 2 as a non-limiting example, in some embodiments, core 10 comprises silica glass. The silica glass of the core region may be Ge-free; that is the core region comprises silica glass that lacks Ge. The silica glass of core 10 may be undoped silica glass, updoped silica glass, and/or downdoped silica glass. Updoped silica glass may include silica glass doped with an alkali metal oxide (e.g. $Na_2O$, $K_2O$, $Li_2O$, $Cs_2O$, or $Rb_2O$). Downdoped silica glass may include silica glass doped with F.

In some embodiments, core 10 may include an updopant and/or a downdopant. The concentration of updopant may be highest at the centerline (r=0) and lowest at the radius $r_1$. In some embodiments, the concentration of downdopant may be lowest at the centerline (r=0) and highest at the radius $r_1$. In some embodiments, the relative refractive index $\Delta_1$ can have a positive value near the centerline (r=0) and decrease to a negative value at the radius $r_1$.

In embodiments in which the inner core region includes a combination an updopant and downdopant, the relative concentrations of updopant and downdopant may be adjusted to provide a net positive value of the maximum relative refractive index.

In various embodiments, the outer radius $r_1$ of the core is in a range from 17.5 m to 32.5 m, or in a range from 20 m to 30 m, or in a range from 22 m to 28 m, or in a range from 23 m to 27 m, or in a range from 24 m to 26 m. In some other embodiments, the relative refractive index of the core is described by an α-profile with an α value in a range from 1 to 3, or in a range from 1.5 to 2.5, or in a range from 1.8 to 2.3, or in a range from 1.9 to 2.1, or in a range from 2.0 to 2.2. The corresponding maximum relative refractive index $\Delta_{1max}$ of the core region is in a range from 0.1% to 2%, or in a range from 0.5% to 1.5%, or in a range from 0.8% to 1.2%, or in a range from 0.9% 1.10%.

In various embodiments in which the cladding includes an inner cladding surrounded by and directly adjacent to a depressed index cladding region, a thickness ($r_2-r_1$) of the inner cladding is in a range from 0.5 m to 4.0 m, or in a range from 0.7 m to 3.0 m, or in a range from 0.8 m to 2 m, or in a range from 0.9 m to 1.5 m, or in a range from 1 m to 1.4 m. The relative refractive index $\Delta_2$ of the inner cladding is in a range from −0.15% to 0.15%, or in a range from −0.10% to 0.10%, or in a range from −0.05 to 0.05%, or in a range from −0.15% to 0.0%, or in a range from −0.10% to 0.0%. In some embodiments, the inner cladding is a pure silica cladding. In some other embodiments, the inner cladding is downdoped. For example, the inner cladding can be doped with fluorine ("F-doped" hereinafter) with a fluorine concentration in a range from 0.01 wt % to 0.20 wt %, or in a range from 0.05 wt % to 0.15 wt %. In some other embodiments, the inner cladding is updoped. For example, the inner cladding can be Cl-doped with a chlorine concentration in a range from 0.01 wt % to 0.50 wt %, or in a range from 0.05 wt % to 0.40 wt %, or in a range from 0.10 wt % to 0.30 wt %.

In embodiments in which the cladding includes an inner cladding region surrounded by and directly adjacent to a depressed index cladding region, the inner radius of the depressed index cladding region is $r_2$ and has the values specified above. In various embodiments, a thickness ($r_3-r_2$) of the depressed index cladding is in a range from 3 m to 10 m, or in a range from 3.5 m to 9 m, or in a range from 4 m to 8 m, or in a range from 4.5 m to 6.5 m. The relative refractive index $\Delta_3$ of the depressed index cladding is in a range from −0.6% to 0.0%, or in a range from −0.55% to −0.1%, or in a range from −0.5% to −0.2%. As described above, the depressed index cladding is downdoped, such as being F-doped with a fluorine concentration in a range from 0.10 wt % to 0.50 wt %, or in a range from 0.15 wt % to 0.45 wt %, or in a range from 0.20 wt % to 0.40 wt %, or greater than 0.10 wt %, or greater than 0.15 wt %, or greater than 0.20 wt %. A trench volume of the depressed index cladding is greater than 40% Δ-microns², or greater than 50% Δ-microns², or greater than 60% Δ-microns², or greater than 80% Δ-microns² or greater than 100% Δ-microns², or in a range from 40% Δ-microns² to 200% Δ-microns², or in a range from 70% Δ-microns² to 150% Δ-microns².

It is noted that, in some embodiments, the cladding includes only the inner cladding and outer cladding without the intervening depressed index cladding, as described above in connection with FIG. 7B. In such embodiments, the inner cladding surrounds and is directly adjacent to the core and the first outer cladding surrounds and is directly adjacent to the inner cladding. In these embodiments, the inner cladding functions as a trench region.

In embodiments in which the cladding lacks an intervening depressed index cladding and has a first outer cladding surrounding and directly adjacent to an inner cladding that surrounds and is directly adjacent to a core region, the inner radius of the inner cladding is $r_1$ with the values specified above, a thickness ($r_2-r_1$) of the inner cladding is in a range from 3 μm to 10 μm, or in a range from 3.5 μm to 9 μm, or in a range from 4 μm to 8 μm, or in a range from 4.5 μm to 6.5 μm, and the relative refractive index $\Delta_2$ of the inner cladding is in a range from −0.5% to 0.0%, or in a range from −0.4% to −0.1%, or in a range from −0.3% to −0.2%. In these embodiments, the inner cladding is downdoped, such as being F-doped with a fluorine concentration in a range from 0.10 wt % to 0.50 wt %, or in a range from 0.15 wt % to 0.45 wt %, or in a range from 0.20 wt % to 0.40 wt %, or greater than 0.10 wt %, or greater than 0.15 wt %, or greater than 0.20 wt %. A trench volume of the inner cladding is greater than 40% Δ-microns², or greater than 50% Δ-microns², or greater than 60% Δ-microns², or greater than 80% Δ-microns² or greater than 100% Δ-microns², or in a range from 40% Δ-microns² to 200% Δ-microns², or in a range from 70% Δ-microns² to 150% Δ-microns².

The inner radius of the first outer cladding region is $r_3$ (in embodiments in which the first outer cladding is directly adjacent to a depressed index cladding that is directly adjacent to an inner cladding that is directly adjacent to a core) or $r_2$ (in embodiments in which the first outer cladding is directly adjacent to an inner cladding that is directly adjacent to a core) and has the values specified above. In various embodiments, a thickness ($r_{4a}-r_3$) or ($r_{4a}-r_2$) of the first outer cladding is in a range from 5 m to 15 m, or in a range from 6 m to 12 m, or in a range from 7 m to 11 m. The radius $r_4a$ is in a range from 29 m to 45 m, or in a range from 30 m to 42 m, or in a range from 30 m to 40 m, or in a range from 32 m to 40 m. The relative refractive index $\Delta_{4a}$ of the first outer cladding is in a range from −0.15% to 0.15%, or in a range from −0.10% to 0.10%, or in a range from −0.05 to 0.05%, or in a range from −0.15% to 0.0%, or in a range from −0.10% to 0.0%. In some embodiments, the first outer cladding is a pure silica cladding. In some other embodiments, the first outer cladding is downdoped. For example, the first outer cladding can be doped with fluorine ("F-doped" hereinafter) with a fluorine concentration in a range from 0.01 wt % to 0.20 wt %, or in a range from 0.05 wt % to 0.15 wt %. In some other embodiments, the first outer cladding is updoped. For example, the first outer cladding can be Cl-doped with a chlorine concentration in a range from 0.01 wt % to 0.50 wt %, or in a range from 0.05 wt % to 0.40 wt %, or in a range from 0.10 wt % to 0.30 wt %.

The inner radius of the second outer cladding region is $r_{4a}$ and has the values specified above. In various embodiments, a thickness $(r_{4b}-r_{4a})$ of the second outer cladding is in a range from 2 µm to 10 µm, or in a range from 2 µm to 8 µm, or in a range from 2 µm to 6 µm, or in a range from 3 µm to 6 µm. In various embodiments, the outer radius $r_{4b}$ of the second outer cladding is less than or equal to 45 µm, or less than or equal to 42 µm, or in a range from 35 µm to 45 µm, or in a range from 38 µm to 42 µm, or in a range from 39 µm to 41 µm. The relative refractive index $\Delta_{4b}$ of the second outer cladding is in a range from 0.2% to 2%, or in a range from 0.6% to 1.6%, or in a range from 0.8% to 1.4%, or in a range from 0.9% to 1.2%. In some embodiments, the relative refractive index $\Delta_{4b}$ of the second outer cladding is greater than the maximum relative refractive index $\Delta_{1max}$ of the core region. In some other embodiments, the second outer cladding is updoped. For example, the second outer cladding can be doped with a titania ($TiO_2$) concentration in a range from 2 wt % to 20 wt %, or in a range from 4 wt % to 12 wt %, or in a range from 6 wt % to 10 wt %.

It is noted that, macrobending loss can be determined using a mandrel wrap test specified in standard IEC 60793-1-47. In the mandrel wrap test, the optical fiber is wrapped one or more times around a cylindrical mandrel having a specified diameter, and the increase in attenuation at a specified wavelength due to the bending is determined. Attenuation in the mandrel wrap test is expressed in units of dB/turn, where one turn refers to one revolution of the optical fiber about the mandrel. Macrobending losses at wavelengths of 850 nm and 1310 nm were determined for selected examples described below with the mandrel wrap test using mandrels with diameters of ranging from 5 mm to 10 mm. In some embodiments, the bending loss of the optical fibers at a wavelength of 850 nm as determined by the mandrel wrap test using a mandrel having a diameter of 5 mm can be less than 3.0 dB/turn, or less than 2.5 dB/turn, or less than 2.0 dB/turn, or less than 1.5 dB/turn, or less than 1.0 dB/turn. In some embodiments, the bending loss of the optical fibers at a wavelength of 1310 nm as determined by the mandrel wrap test using a mandrel having a diameter of 5 mm can be less than 3.0 dB/turn, or less than 2.5 dB/turn, or less than 2.0 dB/turn, or less than 1.5 dB/turn, or less than 1.0 dB/turn.

In some embodiments, the overfilled launch (OFL) bandwidth of the optical fibers disclosed herein is greater than 200 MHz-km (e.g., >300 MHz-km, >400 MHz-km, >500 MHz-km, greater than 1000 MHz-km, greater than 2000 MHz-km, greater than 4000 MHz-km, etc.) at a wavelength of 850 nm, 980 nm, 1064 nm, and/or 1300 nm (that is, the overfilled launch (OFL) bandwidth has the value specified at at least one of the wavelengths of 850 nm, 980 nm, 1064 nm, and 1300 nm).

In some embodiments, the puncture resistance of the secondary coating of the optical fibers disclosed herein can be greater than 30 g (e.g., >40 g, >50 g, etc.). In some embodiments, the normalized puncture load of the optical fiber 100 is greater than $3.6 \times 10^{-3}$ g/microns$^2$ (e.g., >$3.8 \times 10^{-3}$ g/microns$^2$, >$4.0 \times 10^{-3}$ g/microns$^2$, etc.).

In some embodiments, proper combination of the fiber parameters in the ranges described above can result in optical fiber properties that meet the requirements of a high transmission capacity, a small diameter, a low transmission loss, good microbending properties, and high puncture resistance. The profiles designs shown in FIGS. 7A to 7C, other profiles as described herein, and the various fiber parameters described above can be compliant with various optical fibers, such as ITU G.652.D, G.657.A1, G.657.A2, G.654, etc.

Optical Fiber Coatings

The transmissivity of light through an optical fiber is highly dependent on the properties of the coatings applied to the glass fiber. The coatings typically include a primary coating and a secondary coating, where the secondary coating surrounds the primary coating and the primary coating contacts the glass fiber (which includes a central core region surrounded by a cladding region). The secondary coating is a harder material (higher Young's modulus) than the primary coating and is designed to protect the glass fiber from damage caused by abrasion or external forces that arise during processing, handling, and installation of the optical fiber. The primary coating is a softer material (lower Young's modulus) than the secondary coating and is designed to buffer or dissipates stresses that result from lateral forces applied to the outer surface of the secondary coating. The primary coating is especially important in dissipating stresses that arise due to the microbends that the optical fiber encounters when deployed in a cable. The primary coating should maintain adequate adhesion to the glass fiber during thermal and hydrolytic aging, yet be strippable from the glass fiber for splicing purposes.

Primary and secondary coatings are typically formed by applying a curable coating composition to the glass fiber as a viscous liquid and curing. The optical fiber may also include a tertiary coating (not shown) that surrounds the secondary coating. The tertiary coating may include pigments, inks or other coloring agents to mark the optical fiber for identification purposes and typically has a Young's modulus similar to the Young's modulus of the secondary coating.

As described above, the design of the refractive index profile of the cladding may include a refractive index trench that diminishes the sensitivity of the coated fiber to bending, and a titania-doped outer cladding, which improves the mechanical reliability of the fiber and provides a substantial increase in resistance to mechanical abrasion. This cladding structure may enable use of a primary coating and a secondary coating with reduced thickness relative to commercially available fibers. The thinner coating thickness of the optical fiber embodiments described herein advantageously provides compact coated fibers that can be densely packed and/or readily installed in existing fiber infrastructures. The mechanical properties of the primary coating are selected such that good microbending performance of the coated fiber is achieved, even when the thickness of the primary coating is reduced. The mechanical properties of the secondary coating are selected such that good puncture resistance of the coated fiber is achieved, even when the thickness of the secondary coating is reduced.

Primary Coating—Compositions. The primary coating is a cured product of a curable primary coating composition. The curable primary coating compositions provide a primary coating for optical fibers that exhibits low Young's modulus, low pullout force, and strong cohesion. The curable primary coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces. Even for optical fibers with reduced primary coating thicknesses, the optical fibers are expected to have low loss and low microbend loss performance. The primary coatings exhibit these advantages even at reduced thickness.

The primary coating is a cured product of a radiation-curable primary coating composition that includes an oligomer, a monomer, a photoinitiator and, optionally, an additive. The following disclosure describes oligomers for the radiation-curable primary coating compositions, radiation-curable primary coating compositions containing at least one of the oligomers, cured products of the radiation-curable primary coating compositions that include at least one of the oligomers, glass fibers coated with a radiation-curable primary coating composition containing at least one of the oligomers, and glass fibers coated with the cured product of a radiation-curable primary coating composition containing at least one of the oligomers.

The oligomer preferably includes a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

A preferred diisocyanate compound is represented by formula (I):

$$O\!=\!C\!=\!N\!-\!R_1\!-\!N\!=\!C\!=\!O \quad (I)$$

which includes two terminal isocyanate groups separated by a linkage group $R_1$. In one embodiment, the linkage group $R_1$ includes an alkylene group. The alkylene group of linkage group $R_1$ is linear (e.g. methylene or ethylene), branched (e.g. isopropylene), or cyclic (e.g. cyclohexylene, phenylene). The cyclic group is aromatic or non-aromatic. In some embodiments, the linkage group $R_1$ is 4,4'-methylene bis(cyclohexyl) group and the diisocyanate compound is 4,4'-methylene bis(cyclohexyl isocyanate). In some embodiments, the linkage group $R_1$ lacks an aromatic group, or lacks a phenylene group, or lacks an oxyphenylene group.

The polyol is represented by molecular formula (II):

where $R_2$ includes an alkylene group, $O\!-\!R_2\!-$ is a repeating alkoxylene group, and x is an integer. Preferably, x is greater than 20, or greater than 40, or greater than 50, or greater than 75, or greater than 100, or greater than 125, or greater than 150, or in the range from 20 to 500, or in the range from 20 to 300, or in the range from 30 to 250, or in the range from 40 to 200, or in the range from 60 to 180, or in the range from 70 to 160, or in the range from 80 to 140. $R_2$ is preferably a linear or branched alkylene group, such as methylene, ethylene, propylene (normal, iso or a combination thereof), or butylene (normal, iso, secondary, tertiary, or a combination thereof). The polyol may be a polyalkylene oxide, such as polyethylene oxide, or a polyalkylene glycol, such as polypropylene glycol. Polypropylene glycol is a preferred polyol. The molecular weight of the polyol is greater than 1000 g/mol, or greater than 2500 g/mol, or greater than 5000 g/mol, or greater than 7500 g/mol, or greater than 10000 g/mol, or in the range from 1000 g/mol to 20000 g/mol, or in the range from 2000 g/mol to 15000 g/mol, or in the range from 2500 g/mol to 12500 g/mol, or in the range from 2500 g/mol to 10000 g/mol, or in the range from 3000 g/mol to 7500 g/mol, or in the range from 3000 g/mol to 6000 g/mol, or in the range from 3500 g/mol to 5500 g/mol. In some embodiments, the polyol is polydisperse and includes molecules spanning a range of molecular weights such that the totality of molecules combines to provide the number average molecular weight specified hereinabove.

The unsaturation of the polyol is less than 0.25 meq/g, or less than 0.15 meq/g, or less than 0.10 meq/g, or less than 0.08 meq/g, or less than 0.06 meq/g, or less than 0.04 meq/g, or less than 0.02 meq/g, or less than 0.01 meq/g, or less than 0.005 meq/g, or in the range from 0.001 meq/g to 0.15 meq/g, or in the range from 0.005 meq/g to 0.10 meq/g, or in the range from 0.01 meq/g to 0.10 meq/g, or in the range from 0.01 meq/g to 0.05 meq/g, or in the range from 0.02 meq/g to 0.10 meq/g, or in the range from 0.02 meq/g to 0.05 meq/g. As used herein, unsaturation refers to the value determined by the standard method reported in ASTM D4671-16. In the method, the polyol is reacted with mercuric acetate and methanol in a methanolic solution to produce acetoxymercuricmethoxy compounds and acetic acid. The reaction of the polyol with mercuric acetate is equimolar and the amount of acetic acid released is determined by titration with alcoholic potassium hydroxide to provide the measure of unsaturation used herein. To prevent interference of excess mercuric acetate on the titration of acetic acid, sodium bromide is added to convert mercuric acetate to the bromide.

The reaction to form the oligomer further includes addition of a hydroxy acrylate compound to react with terminal isocyanate groups present in unreacted starting materials (e.g. the diisocyanate compound) or products formed in the reaction of the diisocyanate compound with the polyol (e.g. urethane compounds with terminal isocyanate groups). The hydroxy acrylate compound reacts with terminal isocyanate groups to provide terminal acrylate groups for one or more constituents of the oligomer. In some embodiments, the hydroxy acrylate compound is present in excess of the amount needed to fully convert terminal isocyanate groups to terminal acrylate groups. The oligomer includes a single polyether urethane acrylate compound or a combination of two or more polyether urethane acrylate compounds.

The hydroxy acrylate compound is represented by molecular formula (III):

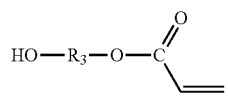

where $R_3$ includes an alkylene group. The alkylene group of $R_3$ is linear (e.g. methylene or ethylene), branched (e.g. isopropylene), or cyclic (e.g. phenylene). In some embodiments, the hydroxy acrylate compound includes substitution of the ethylenically unsaturated group of the acrylate group. Substituents of the ethylenically unsaturated group include alkyl groups. An example of a hydroxy acrylate compound with a substituted ethylenically unsaturated group is a hydroxy methacrylate compound. The discussion that follows describes hydroxy acrylate compounds. It should be understood, however, that the discussion applies to substituted hydroxy acrylate compounds and in particular to hydroxy methacrylate compounds.

In different embodiments, the hydroxy acrylate compound is a hydroxyalkyl acrylate, such as 2-hydroxyethyl acrylate.

In the foregoing exemplary molecular formulas (I), II), and (III), the groups $R_1$, $R_2$, and $R_3$ independently are all the same, are all different, or include two groups that are the same and one group that is different.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. In embodiments, when p is 2.0, n is in the range from 3.0 to 5.0, or in the range from 3.2 to 4.8, or in the range from 3.4 to 4.6, or in the range from 3.5 to 4.4, or in the range from 3.6 to 4.2, or in the range from 3.7 to 4.0; and m is in the range from 1.5 to 4.0, or in the range from 1.6 to 3.6, or in the range from 1.7 to 3.2, or in the range from 1.8 to 2.8, or in the range from 1.9 to 2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

In one embodiment, the oligomer is formed from a reaction mixture that includes 4,4'-methylene bis(cyclohexyl isocyanate), 2-hydroxyethyl acrylate, and polypropylene glycol in the molar ratios n:m:p as specified above, where the polypropylene glycol has a number average molecular weight in the range from 2500 g/mol to 6500 g/mol, or in the range from 3000 g/mol to 6000 g/mol, or in the range from 3500 g/mol to 5500 g/mol.

The oligomer preferably includes two components. The first component is a polyether urethane diacrylate compound having the molecular formula (IV):

and the second component is a di-adduct compound having the molecular formula (V):

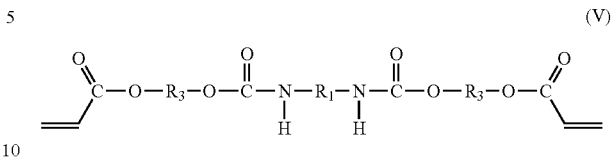

(V)

where the groups $R_1$, $R_2$, $R_3$, and the integer x are as described hereinabove, y is a positive integer, and it is understood that the group $R_1$ in molecular formulas (IV) and (V) is the same as group $R_1$ in molecular formula (I), the group $R_2$ in molecular formula (IV) is the same as group $R_2$ in molecular formula (II), and the group $R_3$ in molecular formulas (IV) and (V) is the same as group $R_3$ in molecular formula (III). The di-adduct compound corresponds to the compound formed by reaction of both terminal isocyanate groups of the diisocyanate compound of molecular formula (I) with the hydroxy acrylate compound of molecular formula (II) where the diisocyanate compound has undergone no reaction with the polyol of molecular formula (II).

The di-adduct compound is formed from a reaction of the diisocyanate compound with the hydroxy acrylate compound during the reaction used to form the oligomer. Alternatively, the di-adduct compound is formed independent of the reaction used to form the oligomer and is added to the product of the reaction used to form the polyether urethane diacrylate compound or to a purified form of the polyether urethane diacrylate compound. The hydroxy group of the hydroxy acrylate compound reacts with an isocyanate group of the diisocyanate compound to provide a terminal acrylate group. The reaction occurs at each isocyanate group of the diisocyanate compound to form the di-adduct compound. The di-adduct compound is present in the oligomer in an amount of at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 2.5 wt % to 6.0 wt %, or in the range from 3.0 wt % to 8.0 wt %, or in the range from 3.0 wt % to 5.0 wt %, or in the range from 3.0 wt % to 5.5 wt %, or in the range from 3.5 wt % to 5.0 wt %, or in the range from 3.5 wt % to 7.0 wt %. It is noted that the concentration of di-adduct is expressed in terms of wt % of the oligomer and not in terms of wt % in the coating composition.

An illustrative reaction for synthesizing an oligomer in accordance with the present disclosure includes reaction of a diisocyanate compound (4,4'-methylene bis(cyclohexyl isocyanate, which is also referred to herein as H12MDI) and a polyol (polypropylene glycol with $M_n$~ 4000 g/mol, which is also referred to herein as PPG4000) to form a polyether urethane diisocyanate compound with formula (VI):

H12MDI~PPG4000~H12MDI~PPG4000~H12MDI (VI)

(IV)

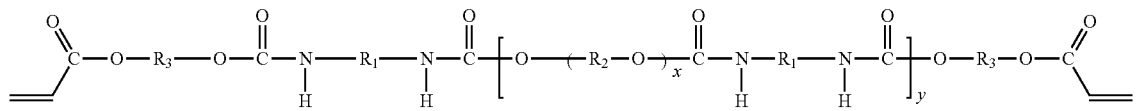

where "~" denotes a urethane linkage formed by the reaction of a terminal isocyanate group of H12MDI with a terminal alcohol group of PPG4000; and ~H12MDI, ~H12MDI~, and ~PPG4000~ refer to residues of H12MDI and PPG4000 remaining after the reaction; and $M_n$ refers to number average molecular weight. The polyether urethane diisocyanate compound has a repeat unit of the type ~(H12MDI-PPG4000)~. The particular polyether urethane diisocyanate shown includes two PPG4000 units. The reaction may also provide products having one PPG4000 unit, or three or more PPG4000 units. The polyether urethane diisocyanate and any unreacted H12MDI include terminal isocyanate groups. In accordance with the present disclosure, a hydroxy acrylate compound (such as 2-hydroxyethyl acrylate, which is referred to herein as HEA) is included in the reaction to react with terminal isocyanate groups to convert them to terminal acrylate groups. The conversion of terminal isocyanate groups to terminal acrylate groups effects a quenching of the isocyanate group. The amount of HEA included in the reaction may be an amount estimated to react stoichiometrically with the expected concentration of unreacted isocyanate groups or an amount in excess of the expected stoichiometric amount. Reaction of HEA with the polyether urethane diisocyanate compound forms the polyether urethane acrylate compound with formula (VII):

HEA~H12MDI~PPG4000~H12MDI~PPG4000~H12MDI (VII)

and/or the polyether urethane diacrylate compound with formula (VIII):

HEA~H12MDI~PPG4000~H12MDI~PPG4000~H12MDI~HEA (VIII)

and reaction of HEA with unreacted H12MDI forms the di-adduct compound with formula (IX):

HEA~H12MDI~HEA (IX)

where, as above, ~ designates a urethane linkage and -HEA designates the residue of HEA remaining after reaction to form the urethane linkage (consistent with formulas (IV) and (V)). The combination of a polyether urethane diacrylate compound and a di-adduct compound in the product composition constitutes an oligomer in accordance with the present disclosure. As described more fully hereinbelow, when one or more oligomers are used in coating compositions, coatings having improved tear strength and critical stress characteristics result. In particular, it is demonstrated that oligomers having a high proportion of di-adduct compound provide coatings with high tear strengths and/or high critical stress values.

The oligomer includes a compound that is a polyether urethane diacrylate compound with formula (X):

(hydroxy acrylate)~(diisocyanate~polyol)$_x$~diisocyanate~(hydroxy acrylate) (X)

and a compound that is a di-adduct compound with formula (XI):

(hydroxy acrylate)~diisocyanate~(hydroxy acrylate) (XI)

where the relative proportions of diisocyanate compound, hydroxy acrylate compound, and polyol used in the reaction to form the oligomer correspond to the mole numbers n, m, and p disclosed hereinabove.

Compounds represented by molecular formulas (I) and (II) above, for example, react to form a polyether urethane diisocyanate compound represented by molecular formula (XII):

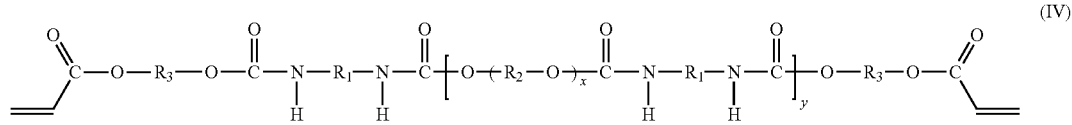
(XII)

where y is the same as y in formula (IV) and is 1, or 2, or 3 or 4 or higher; and x is determined by the number of repeat units of the polyol (as described hereinabove).

Further reaction of the polyether urethane isocyanate of molecular formula (VI) with the hydroxy acrylate of molecular formula (III) provides the polyether urethane diacrylate compound represented by molecular formula (IV) referred to hereinabove and repeated below:

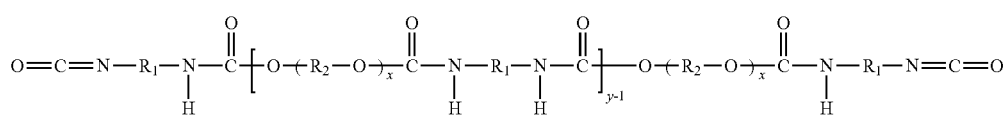
(IV)

where y is 1, or 2, or 3, or 4 or higher; and x is determined by the number of repeat units of the polyol (as described hereinabove).

Variations in the mole numbers n, m, and p provide control over the relative proportions of polyether urethane diacrylate and di-adduct formed in the reaction. Increasing the mole number n relative to the mole number m or the mole number p, for example, may increase the amount of di-adduct compound formed in the reaction. Reaction of the diisocyanate compound, the hydroxy acrylate compound, and polyol compound in molar ratios n:m:p, where n is in the range from 3.0 to 5.0, m is in the range within ±15% of 2n−4 or within ±10% of 2n−4 or within ±5% of 2n−4, and p is 2.0, for example, produce amounts of the di-adduct compound in the oligomer sufficient to achieve the preferred primary coating properties. By way of example, the embodiment in which n=4.0, m is within ±15% of 2n−4, and p=2.0 means that n=4.0, m is within ±15% of 4, and p=2.0, which means that that n=4.0, m is in the range from 3.4 to 4.6, and p=2.0.

Variations in the relative proportions of di-adduct and polyether urethane diacrylate are obtained through changes in the mole numbers n, m, and p and through such variations, it is possible to precisely control the Young's modulus, in situ modulus, tear strength, critical stress, tensile toughness, and other mechanical properties of coatings formed from coating compositions that include the oligomer.

Improved fiber primary coatings result when utilizing a primary coating composition that incorporates an oligomer that includes a polyether urethane acrylate compound represented by molecular formula (IV) and a di-adduct compound represented by molecular formula (V), where concentration of the di-adduct compound in the oligomer is at least 1.0 wt %, or at least 1.5 wt %, or at least 2.0 wt %, or at least 2.25 wt %, or at least 2.5 wt %, or at least 3.0 wt %, or at least 3.5 wt %, or at least 4.0 wt %, or at least 4.5 wt %, or at least 5.0 wt %, or at least 7.0 wt % or at least 9.0 wt %, or in the range from 1.0 wt % to 10.0 wt %, or in the range from 2.0 wt % to 9.0 wt %, or in the range from 3.0 wt % to 8.0 wt %, or in the range from 3.5 wt % to 7.0 wt % or in the range from 2.5 wt % to 6.0 wt %, or in the range from 3.0 wt % to 5.5 wt %, or in the range from 3.5 wt % to 5.0 wt %. It is noted that the concentration of di-adduct is expressed in terms of wt % of the oligomer and not in terms of wt % in the coating composition. The concentration of the di-adduct compound is increased in one embodiment by varying the molar ratio n:m:p of diisocyanate:hydroxy acrylate:polyol. In one aspect, molar ratios n:m:p that are rich in diisocyanate relative to polyol promote the formation of the di-adduct compound.

The oligomer of the primary coating composition includes a polyether urethane diacrylate compound and di-adduct compound as described hereinabove. In some embodiments, the oligomer includes two or more polyether urethane diacrylate compounds and/or two or more di-adduct compounds. The oligomer content of the primary coating composition includes the combined amounts of the one or more polyether urethane diacrylate compound(s) and one or more di-adduct compound(s) and is greater than 20 wt %, or greater than 30 wt %, or greater than 40 wt %, or in the range from 20 wt % to 80 wt %, or in the range from 30 wt % to 70 wt %, or in the range from 40 wt % to 60 wt %, where the concentration of di-adduct compound within the oligomer content is as described above.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—, or —O—CH(CH$_3$)—CH$_2$—), etc. As used herein, the degree of alkoxylation refers to the number of alkoxylene groups in the monomer. In one embodiment, the alkoxylene groups are bonded consecutively in the monomer.

In some embodiments, the primary coating composition includes an alkoxylated monomer of the form R$_4$—R$_5$—O—(CH(CH$_3$)CH$_2$—O)$_q$—C(O)CH=CH$_2$, where R$_4$ and R$_5$ are aliphatic, aromatic, or a mixture of both, and q=1 to 10, or R$_4$—O—(CH(CH$_3$)CH$_2$—O)$_q$—C(O)CH=CH$_2$, where C(O) is a carbonyl group, R$_1$ is aliphatic or aromatic, and q=1 to 10.

Representative examples of monomers include ethylenically unsaturated monomers such as lauryl acrylate (e.g., SR335 available from Sartomer Company, Inc., AGEFLEX FA12 available from BASF, and PHOTOMER 4812 available from IGM Resins), ethoxylated nonylphenol acrylate (e.g., SR504 available from Sartomer Company, Inc. and PHOTOMER 4066 available from IGM Resins), caprolactone acrylate (e.g., SR495 available from Sartomer Company, Inc., and TONE M-100 available from Dow Chemical), phenoxyethyl acrylate (e.g., SR339 available from Sartomer Company, Inc., AGEFLEX PEA available from BASF, and PHOTOMER 4035 available from IGM Resins), isooctyl acrylate (e.g., SR440 available from Sartomer Company, Inc. and AGEFLEX FA8 available from BASF), tridecyl acrylate (e.g., SR489 available from Sartomer Company, Inc.), isobornyl acrylate (e.g., SR506 available from Sartomer Company, Inc. and AGEFLEX IBOA available from CPS Chemical Co.), tetrahydrofurfuryl acrylate (e.g., SR285 available from Sartomer Company, Inc.), stearyl acrylate (e.g., SR257 available from Sartomer Company, Inc.), isodecyl acrylate (e.g., SR395 available from Sartomer Company, Inc. and AGEFLEX FA10 available from BASF), 2-(2-ethoxyethoxy)ethyl acrylate (e.g., SR256 available from Sartomer Company, Inc.), epoxy acrylate (e.g., CN120, available from Sartomer Company, and EBECRYL 3201 and 3604, available from Cytec Industries Inc.), lauryloxyglycidyl acrylate (e.g., CN130 available from Sartomer Company) and phenoxyglycidyl acrylate (e.g., CN131 available from Sartomer Company) and combinations thereof.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule. Examples of multifunctional (meth)acrylates include dipentaerythritol monohydroxy pentaacrylate (e.g., PHOTOMER 4399 available from IGM Resins); methylolpropane polyacrylates with and without alkoxylation such as trimethylolpropane triacrylate, ditrimethylolpropane tetraacrylate (e.g., PHOTOMER 4355, IGM Resins); alkoxylated glyceryl triacrylates such as propoxylated glyceryl triacrylate with propoxylation being 3 or greater (e.g., PHOTOMER 4096, IGM Resins); and erythritol polyacrylates with and without alkoxylation, such as pentaerythritol tetraacrylate (e.g., SR295, available from Sartomer Company, Inc. (Westchester, Pa.)), ethoxylated pentaerythritol tetraacrylate (e.g., SR494, Sartomer Company, Inc.), dipentaerythritol pentaacrylate (e.g., PHOTOMER 4399, IGM Resins, and SR399, Sartomer Company, Inc.), tripropyleneglycol diacrylate, propoxylated hexanediol diacrylate, tetrapropyleneglycol diacrylate, pentapropyleneglycol diacrylate, methacrylate analogs of the foregoing, and combinations thereof.

In some embodiments, the primary coating composition includes an N-vinyl amide monomer such as an N-vinyl lactam, or N-vinyl pyrrolidinone, or N-vinyl caprolactam, where the N-vinyl amide monomer is present in the coating composition at a concentration greater than 1.0 wt %, or greater than 2.0 wt %, or greater than 3.0 wt %, or in the range from 1.0 wt % to 15.0 wt %, or in the range from 2.0 wt % to 10.0 wt %, or in the range from 3.0 wt % to 8.0 wt %.

In an embodiment, the primary coating composition includes one or more monofunctional acrylate or methacrylate monomers in an amount from 15 wt % to 90 wt %, or from 30 wt % to 75 wt %, or from 40 wt % to 65 wt %. In another embodiment, the primary coating composition may include one or more monofunctional aliphatic epoxy acrylate or methacrylate monomers in an amount from 5 wt % to 40 wt %, or from 10 wt % to 30 wt %.

In different embodiments, the total monomer content of the primary coating composition is between about 15 wt % and about 90 wt %, or between about 30 wt % and about 75 wt %, or between about 40 wt % and about 65 wt %.

In addition to a curable monomer and a curable oligomer, the curable primary coating composition also includes a polymerization initiator. The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiators and/or phosphine oxide photoinitiators.

Representative photoinitiators include 1-hydroxycyclohexylphenyl ketone (e.g., IRGACURE 184 available from BASF)); bis(2,6-dimethoxybenzoyl)-2,4,4-trimethylpentylphosphine oxide (e.g., commercial blends IRGACURE 1800, 1850, and 1700 available from BASF); 2,2-dimethoxy-2-phenylacetophenone (e.g., IRGACURE 651, available from BASF); bis(2,4,6-trimethylbenzoyl)-phenylphosphine oxide (IRGACURE 819); (2,4,6-trimethylbenzoyl) diphenyl phosphine oxide (LUCIRIN TPO, available from BASF (Munich, Germany)); ethoxy(2,4,6-trimethylbenzoyl)-phenylphosphine oxide (LUCIRIN TPO-L from BASF); and combinations thereof.

The coating composition includes a single photoinitiator or a combination of two or more photoinitiators. The total photoinitiator content of the coating composition is up to about 10 wt %, or between about 0.5 wt % and about 6 wt %.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent.

An adhesion promoter is a compound that facilitates adhesion of the primary coating and/or primary composition to glass (e.g. the cladding portion of a glass fiber). Suitable adhesion promoters include alkoxysilanes, mercapto-functional silanes, organotitanates, and zirconates. Representative adhesion promoters include mercaptoalkyl silanes or mercaptoalkoxy silanes such as 3-mercaptopropyl-trialkoxysilane (e.g., 3-mercaptopropyl-trimethoxysilane, available from Gelest (Tullytown, Pa.)); bis(trialkoxysilyl-ethyl)benzene; acryloxypropyltrialkoxysilane (e.g., (3-acryloxypropyl)-trimethoxysilane, available from Gelest), methacryloxypropyltrialkoxysilane, vinyltrialkoxysilane, bis (trialkoxysilylethyl)hexane, allyltrialkoxysilane, styrylethyltrialkoxysilane, and bis(trimethoxysilylethyl) benzene (available from United Chemical Technologies (Bristol, Pa.)); see U.S. Pat. No. 6,316,516, the disclosure of which is hereby incorporated by reference in its entirety herein.

The adhesion promoter is present in the primary coating composition in an amount between 0.02 wt % and 10.0 wt %, or between 0.05 wt % and 4.0 wt %, or between 0.1 wt % and 4.0 wt %, or between 0.1 wt % and 3.0 wt %, or between 0.1 wt % and 2.0 wt %, or between 0.1 wt % and 1.0 wt %, or between 0.5 wt % and 4.0 wt %, or between 0.5 wt % and 3.0 wt %, or between 0.5 wt % and 2.0 wt %, or between 0.5 wt % and 1.0 wt %.

A representative antioxidant is thiodiethylene bis[3-(3,5-di-tert-butyl)-4-hydroxy-phenyl) propionate] (e.g., IRGANOX 1035, available from BASF). In some aspects, an antioxidant is present in the coating composition in an amount greater than 0.25 wt %, or greater than 0.50 wt %, or greater than 0.75 wt %, or greater than 1.0 wt %, or an amount in the range from 0.25 wt % to 3.0 wt %, or an amount in the range from 0.50 wt % to 2.0 wt %, or an amount in the range from 0.75 wt % to 1.5 wt %.

Primary Coating—Properties. Relevant properties of the primary coating include radius, thickness, Young's modulus, and in situ modulus.

The radius $r_5$ of the primary coating is less than or equal to 75.0 microns, or less than or equal to 70.0 microns, or less than or equal to 65.0 microns, or less than or equal to 60.0 microns, or less than or equal to 55.0 microns, or less than or equal to 50.0 microns, or in the range from 45.0 microns to 75.0 microns, or in the range from 45.0 microns to 65.0 microns, or in the range from 45.0 microns to 60.0 microns, or in the range from 45.0 microns to 55.0 microns, or in the range from 50.0 microns to 70.0 microns, or in the range from 50.0 microns to 65.0 microns.

To facilitate decreases in the diameter of the optical fiber, it is preferable to minimize the thickness $r_5-r_4$ of the primary coating. The thickness $r_5-r_4$ of the primary coating is greater than or equal to 7.0 microns, and less than or equal to 30.0 microns, or less than or equal to 25.0 microns, or less than or equal to 20.0 microns, or less than or equal to 15.0 microns, or less than or equal to 10.0 microns, or in the range from 7.0 microns to 25.0 microns, or in the range from 9.0 microns to 20.0 microns, or in the range from 10.0 microns to 17.0 microns.

In some embodiments, to facilitate effective buffering of stress and protection of the glass fiber, it is preferable for the primary coating to have a low Young's modulus and/or a low in situ elastic modulus $E_P$. The Young's modulus of the primary coating is less than or equal to 0.7 MPa, or less than or equal to 0.6 MPa, or less than or equal to 0.5 MPa, or less than or equal to 0.4 MPa, or in the range from 0.2 MPa to 0.7 MPa, or in the range from 0.3 MPa to 0.6 MPa. The in situ modulus $E_P$ of the primary coating is less than or equal to 0.35 MPa, or less than or equal to 0.30 MPa, or less than or equal to 0.25 MPa, or less than or equal to 0.20 MPa, or less than or equal to 0.15 MPa, or less than or equal to 0.10 MPa, or in the range from 0.05 MPa to 0.25 MPa, or in the range from 0.10 MPa to 0.20 MPa.

In some other embodiments, the primary coating can act as a "spring" that couples the stiff glass portion (e.g., the second outer cladding region 58) to the relatively stiff secondary coating that has an in situ modulus $E_P$ greater than 1200 MPa, or greater than 1400 MPa, or greater than 1500 MPa, or greater than 1800 MPa. The spring constant of the primary coating is defined as $\chi_P = E_P * d_4/t_P$, where $d_4$ is the diameter of the glass portion of the fiber (i.e., $d_4=2r_{4b}$), and $t_P$ and $E_P$ are the thickness and in situ modulus, respectively, of the primary coating. In some embodiments, the spring constant of the primary coating has a value $\chi_P \leq 1.6$ MPa, or $\chi_P \leq 1.5$ MPa, or $\chi_P \leq 1.4$ MPa, or $\chi_P \leq 1.3$ MPa, or $\chi_P \leq 1.2$ MPa, or $\chi_P \leq 1.1$ MPa, or $\chi_P \leq 1.0$ MPa, or $\chi_P \leq 0.9$ MPa, or $\chi_P \leq 0.8$ MPa, or $\chi_P \leq 0.7$ MPa, or $\chi_P \leq 0.6$ MPa, or 0.5 MPa $\leq \chi_P \leq 1.5$ MPa, or 0.5 MPa $\leq \chi_P \leq 1.2$ MPa, or 0.6 MPa $\leq \chi_P \leq 1.0$ MPa. Such design can reduce the microbending losses and improve microbending resistance, since a small spring constant provides lower degree of coupling between the glass portion of the fiber and the secondary coating.

Secondary Coating—Compositions. The secondary coating is a cured product of a curable secondary coating composition that includes a monomer, a photoinitiator, an optional oligomer, and an optional additive. The present disclosure describes optional oligomers for the radiation-curable secondary coating compositions, radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. The one or more monomers may be present in an amount of 50 wt % or greater, or in an amount from about 60 wt % to about 99 wt %, or in an amount from about 75 wt % to about 99 wt %, or in an amount from about 80 wt % to about 99 wt % or in an amount from about 85 wt % to about 99 wt %. In one embodiment, the secondary coating is the radiation-cured product of a secondary coating composition that contains urethane acrylate monomers.

The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. In one embodiment, the monomer component of the curable secondary coating composition includes ethylenically unsaturated monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

In one embodiment, the monomer component of the curable secondary coating composition includes ethylenically unsaturated monomers. The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Exemplary monofunctional ethylenically unsaturated monomers for the curable secondary coating composition include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4066, IGM Resins); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is an alkyl group with 7 or more carbons.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—), etc. As used herein, the degree of alkoxylation refers to the number of alkoxylene groups in the monomer. In one embodiment, the alkoxylene groups are bonded consecutively in the monomer.

Representative multifunctional ethylenically unsaturated monomers for the curable secondary coating composition include, without limitation, alkoxylated bisphenol-A diacrylates, such as ethoxylated bisphenol-A diacrylate, and alkoxylated trimethylolpropane triacrylates, such as ethoxylated trimethylolpropane triacrylate, with the degree of alkoxylation being 2 or greater, or 4 or greater, or 6 or greater, or less than 16 or less than 12, or less than $\kappa$, or less than 5, or in the range from 2 to 16, or in the range from 2 to 12, or in the range from 2 to 8, or in the range from 2 to 4, or in the range from 3 to 12, or in the range from 3 to 8, or in the range from 3 to 5, or in the range from 4 to 12, or in the range from 4 to 10, or in the range from 4 to 8.

Multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30 (e.g. SR349, SR601, and SR602 available from Sartomer Company, Inc. West Chester, Pa. and Photomer 4025 and Photomer 4028, available from IGM Resins), or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater; for example, ranging from 3 to about 30 (e.g., Photomer 4149, IGM Resins, and SR499, Sartomer Company, Inc.); propoxylated-trimethylolpropane triacrylate with the degree of propoxylation being 3 or greater; for example, ranging from 3 to 30 (e.g., Photomer 4072, IGM Resins and SR492, Sartomer); ditrimethylolpropane tetraacrylate (e.g., Photomer 4355, IGM Resins); alkoxylated glyceryl triacrylates such as propoxylated glyceryl triacrylate with the degree of propoxylation being 3 or greater (e.g., Photomer 4096, IGM Resins and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, IGM Resins, and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with the degree of ethoxylation being 2 or greater; for example, ranging from about 2 to 30; epoxy acrylates formed by adding acrylate to bisphenol A diglycidylether and the like (e.g., Photomer 3016, IGM Resins); and single and multi-ring cyclic aromatic or non-aromatic polyacrylates such as dicyclopentadiene diacrylate and dicyclopentane diacrylate.

In some embodiments, the curable secondary coating composition includes a multifunctional monomer with three or more curable functional groups in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, each of the three or more curable functional groups is an acrylate group.

In some embodiments, the curable secondary coating composition includes a trifunctional monomer in an amount greater than 2.0 wt %, or greater than 5.0 wt %, or greater than 7.5 wt %, or greater than 10 wt %, or greater than 15 wt %, or greater than 20 wt %, or in the range from 2.0 wt % to 25 wt %, or in the range from 5.0 wt % to 20 wt %, or in the range from 8.0 wt % to 15 wt %. In a preferred embodiment, the trifunctional monomer is a triacrylate monomer.

In some embodiments, the curable secondary coating composition includes a difunctional monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a trifunctional monomer in an amount in the range from 2.0 wt % to 25 wt %, or in the range from 5.0 wt % to 20 wt %, or in the range from 8.0 wt % to 15 wt %. In a preferred embodiment, the difunctional monomer is a diacrylate monomer and the trifunctional monomer is a triacrylate monomer. Preferred diacrylate monomers include alkoxylated bisphenol-A diacrylates. Preferred triacrylate monomers include alkoxylated trimethylolpropane triacrylates and isocyanurate triacrylates. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

A preferred difunctional monomer is an alkoxylated bisphenol-A diacrylate. Alkoxylated bisphenol-A diacrylate has the general formula (XIII):

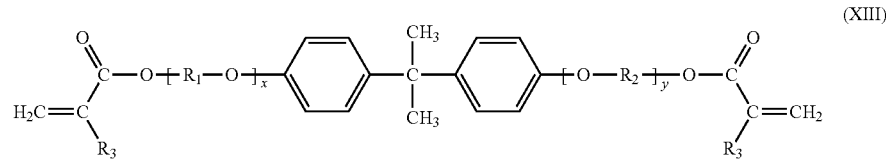

where $R_1$ and $R_2$ are alkylene groups, $R_1$—O and $R_2$—O are alkoxylene groups, and $R_3$ is H. Any two of the groups $R_1$, $R_2$, and $R_3$ are the same or different. In one embodiment, the groups $R_1$ and $R_2$ are the same. The number of carbons in each of the groups $R_1$ and $R_2$ is in the range from 1 to 8, or in the range from 2 to 6, or in the range from 2 to 4. The degree of alkoxylation is $\frac{1}{2}(x+y)$. The values of x and y are the same or different. In one embodiment, x and y are the same.

A preferred trifunctional monomer is an alkoxylated trimethylolpropane triacrylate. Alkoxylated trimethylolpropane triacrylate has the general formula (XIV):

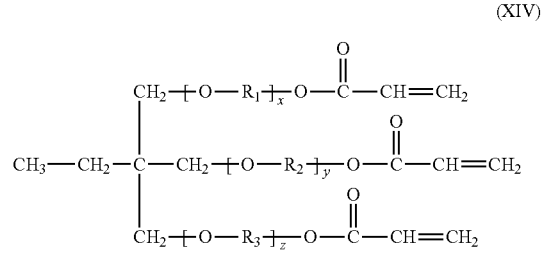

where $R_1$ and $R_2$ are alkylene groups, O—$R_1$, O—$R_2$, and O—$R_3$ are alkoxylene groups. Any two of the groups $R_1$, $R_2$, and $R_3$ are the same or different. In one embodiment, the groups $R_1$, $R_2$, and $R_3$ are the same. The number of carbons in the each of the groups $R_1$, $R_2$, and $R_3$ is in the range from 1 to 8, or in the range from 2 to 6, or in the range from 2 to 4. The degree of alkoxylation is $\frac{1}{3}(x+y+z)$. The values of any two of x, y and z are the same or different. In one embodiment, x, y, and z are the same.

Another preferred trifunctional monomer is a tris[(acryloyloxy)alkyl] isocyanurate. Tris[(acryloyloxy)alkyl] isocyanurates are also referred to as tris[n-hydroxyalkyl] isocyanurate triacrylates. A representative tris[(acryloyloxy)

alkyl] isocyanurate is tris[2-hydroxyethyl) isocyanurate triacrylate, which has the general formula (XV):

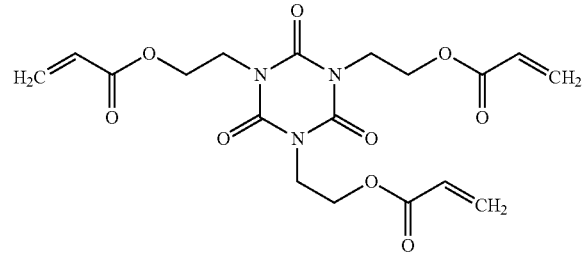

(XV)

In formula (III), an ethylene linkage (—$CH_2$—$CH_2$—) bonds each acryloyloxy group to a nitrogen of the isocyanurate ring. In other embodiments of tris[(acryloyloxy) alkyl] isocyanurates, alkylene linkages other than ethylene bond the acryloyloxy groups to nitrogen atoms of the isocyanurate ring. The alkylene linkages for any two of the three alkylene linkages are the same or different. In one embodiment, the three alkylene linkages are the same. The number of carbons in each of the alkylene linkages is in the range from 1 to 8, or in the range from 2 to 6, or in the range from 2 to 4.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylolpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes an alkoxylated trimethylpropane triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes a tris[(acryloyloxy)alkyl] isocyanurate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

In one embodiment, the curable secondary composition includes bisphenol-A epoxy diacrylate monomer in an amount greater than 5.0 wt %, or greater than 10 wt %, or greater than 15 wt %, or in the range from 5.0 wt % to 20 wt % or in the range from 8 wt % to 17 wt %, or in the range from 10 wt % to 15 wt %, and further includes an alkoxylated bisphenol-A diacrylate monomer in an amount greater than 55 wt %, or greater than 60 wt %, or greater than 65 wt %, or greater than 70 wt %, or in the range from 55 wt % to 80 wt %, or in the range from 60 wt % to 75 wt %, and further includes tris(2-hydroxyethyl) isocyanurate triacrylate monomer in an amount in the range from 2.0 wt % to 25 wt %, or in the range from 5.0 wt % to 20 wt %, or in the range from 8.0 wt % to 15 wt %. Preferably the curable secondary coating composition lacks an alkoxylated bisphenol-A diacrylate having a degree of alkoxylation greater than 17, or greater than 20, or greater than 25, or in the range from 15 to 40, or in the range from 20 to 35.

Secondary Coating—Properties. Relevant properties of the secondary coating include radius, thickness, Young's modulus, tensile strength, yield strength, elongation at yield, glass transition temperature, and puncture resistance The radius $r_6$ of the secondary coating is less than or equal to 100.0 microns, or less than or equal to 95.0 microns, or less than or equal to 90.0 microns, or less than or equal to 85.0 microns, or less than or equal to 80.0 microns, or less than or equal to 75.0 microns, or less than or equal to 70.0 microns, or less than or equal to 65.0 microns, or less than or equal to 60.0 microns.

To facilitate decreases in the diameter of the optical fiber, it is preferable to minimize the thickness ($r_6-r_5$) of the secondary coating. The thickness ($r_6-r_5$) of the secondary coating is greater than or equal to 7.0 microns, and less than or equal to 30.0 microns, or less than or equal to 25.0 microns, or less than or equal to 20.0 microns, or less than or equal to 15.0 microns, or in the range from 7.0 microns to 25.0 microns, or in the range from 8.0 microns to 20.0 microns, or in the range from 9.0 microns to 18.0 microns, or in the range from 10.0 microns to 16.0 microns.

A factor promoting puncture resistance and low microbend loss is the ratio of the thickness ($r_5-r_4$) of the primary coating to the thickness ($r_6-r_5$) of the secondary coating. The ratio of the thickness ($r_5-r_4$) of the primary coating to the thickness ($r_6$–$r_5$) of the secondary coating is in a range from 0.3 to 1.7, or in a range from 0.5 to 1.5, or in a range from 0.7 to 1.2.

To facilitate puncture resistance and high protective function, it is preferable for the secondary coating to have a high Young's modulus. The Young's modulus of the secondary coating is greater than or equal to 1600 MPa, or greater than or equal to 1800 MPa, or greater than or equal to 2000 MPa, or greater than or equal to 2200 MPa, or in the range from 1600 MPa to 2800 MPa, or in the range from 1800 MPa to 2600 MPa. In some embodiments, the in situ modulus of the secondary coating is greater than or equal to 1200 MPa, or greater than or equal to 1500 MPa, or greater than or equal to 1800 MPa, or greater than or equal to 2000 MPa, or in the range from 1200 MPa to 2800 MPa, or in the range from 1500 MPa to 2600 MPa.

Tertiary Coating—Properties. As described above, the optical fiber can optionally have a tertiary coating situated on top of the secondary coating. In some embodiments, the tertiary coating is an ink layer or a coating containing ink. A sum of the thicknesses of the secondary coating and the tertiary coating can be larger than or equal to 10 microns, or larger than or equal to 12 microns, or in a range from 12 microns to 30 microns. The combined cross-sectional areas of the secondary coating and optional tertiary coating can be larger than or equal to 20000 micron$^2$, or larger than or equal to 25000 micron$^2$, or larger than or equal to 30000 micron$^2$, which advantageously ensures that the fiber has sufficient puncture resistance.

Design Examples—Glass Fiber

Nine modeled design examples Ex. 1 through Ex. 9 of the multimode optical fiber 100 with different core/cladding designs and optical attributes are set forth in Tables 1-2 below. Ex. 1 through Ex. 9 are graded-index fibers having a relative refractive index profile of the type shown in FIG. 7C. Ex. 1 through Ex. 9 each comprises a graded-index core, an undoped inner cladding, a downdoped depressed index cladding (corresponding to a trench), an undoped first outer cladding, and an updoped second outer cladding. All the exemplary optical fibers in Ex. 1-Ex. 5 set forth in Table 1 have a radius of the glass fiber equal to 40.25 microns. Exemplary optical fiber in Ex. 6 set forth in Table 2 has a radius of the glass fiber less than or equal to 40.0 microns, and exemplary optical fibers in Ex. 7-Ex. 9 forth in Table 2 have a radius of the glass fiber equal to 40.25 microns.

TABLE 1

Core/Cladding Design Examples of Glass Fibers (1)

| Parameter | Ex. 1 | Ex. 2 | Ex. 3 | Ex. 4 | Ex. 5 |
|---|---|---|---|---|---|
| Radius of core $r_1$ (micron) | 24.6 | 24.4 | 24.4 | 24.4 | 19.3 |
| Core Alpha α | 2.079 | 2.072 | 2.085 | 2.072 | 2.056 |
| Core Index maximum $\Delta_{1max}$ (%) | 1.08 | 1.01 | 1.08 | 1.01 | 1.04 |
| Radius of inner cladding $r_2$ (micron) | 25.7 | 25.7 | 25.7 | 25.7 | 20.4 |
| Index of inner cladding $\Delta_2$ (%) | 0.00 | 0.00 | 0.00 | 0.00 | 0.00 |
| Thickness of inner cladding $r_2 - r_1$ (micron) | 1.1 | 1.3 | 1.3 | 1.3 | 1.1 |
| Radius of depressed index cladding $r_3$ (micron) | 30.9 | 31.1 | 31.0 | 31.0 | 25.2 |
| Index of depressed index cladding $\Delta_3$ (%) | −0.29 | −0.34 | −0.29 | −0.37 | −0.38 |
| Thickness of depressed index cladding $r_3 - r_2$ (micron) | 5.2 | 5.4 | 5.3 | 5.3 | 4.8 |
| Trench Volume $V_3$ (%-micron$^2$) | 84.8 | 104.1 | 86.1 | 105.9 | 82.6 |
| Radius of first outer cladding $r_{4a}$ (micron) | 39.25 | 39.25 | 39.25 | 37.25 | 37.25 |
| Index of first outer cladding $\Delta_{4a}$ (%) | 0.00 | 0.00 | 0.00 | 0.00 | 0.00 |
| Thickness of first outer cladding $r_{4a} - r_3$ (micron) | 8.35 | 8.15 | 8.25 | 6.25 | 12.05 |
| Radius of second outer cladding $r_{4b}$ (micron) | 40.25 | 40.25 | 40.25 | 40.25 | 40.25 |
| Index of second outer cladding $\Delta_{4b}$ (%) | 0.84 | 1.26 | 1.68 | 0.84 | 1.68 |
| Thickness of second outer cladding $r_{4b} - r_{4a}$ (micron) | 1 | 1 | 1 | 3 | 3 |
| TiO$_2$ concentration in second outer cladding (Wt. %) | 4 | 6 | 8 | 4 | 6 |
| Overfilled Bandwidth at 850 nm (MHz-km) | 8173 | 2189 | 6672 | 2092 | 2364 |
| Overfilled Bandwidth at 1300 nm (MHz-km) | 1139 | 2173 | 270 | 1589 | 1471 |

TABLE 2

Core/Cladding Design Examples of Glass Fibers (2)

| Parameter | Ex. 6 | Ex. 7 | Ex. 8 | Ex. 9 |
|---|---|---|---|---|
| Radius of core $r_1$ (micron) | 22.84 | 24.33 | 24.46 | 20.26 |
| Core Alpha α | 2.045 | 2.048 | 2.067 | 2.070 |
| Core Index maximum $\Delta_{1max}$ (%) | 0.98 | 0.99 | 1.00 | 0.99 |
| Radius of inner cladding $r_2$ (micron) | 24.06 | 25.36 | 25.70 | 21.52 |
| Index of inner cladding $\Delta_2$ (%) | 0.00 | 0.00 | 0.00 | 0.00 |
| Thickness of inner cladding $r_2-r_1$ (micron) | 1.22 | 1.03 | 1.24 | 1.26 |
| Radius of depressed index cladding $r_3$ (micron) | 29.77 | 31.45 | 31.81 | 26.59 |
| Index of depressed index cladding $\Delta_3$ (%) | −0.41 | −0.40 | −0.39 | −0.40 |
| Thickness of depressed index cladding $r_3-r_2$ (micron) | 5.67 | 6.09 | 6.11 | 5.07 |
| Trench Volume $V_3$ (%-micron$^2$) | 124.7 | 139.4 | 138.9 | 97.9 |
| Radius of first outer cladding $r_{4a}$ (micron) | 37.25 | 35.25 | 35.25 | 35.25 |
| Index of first outer cladding $\Delta_{4a}$ (%) | 0.00 | 0.00 | 0.00 | 0.00 |
| Thickness of first outer cladding $r_{4a}-r_3$ (micron) | 7.48 | 3.8 | 3.44 | 8.66 |
| Radius of second outer cladding $r_{4b}$ (micron) | 40.00 | 40.25 | 40.25 | 40.25 |
| Index of second outer cladding $\Delta_{4b}$ (%) | 1.68 | 0.84 | 1.26 | 1.68 |
| Thickness of second outer cladding $r_{4b}-r_{4a}$ (micron) | 3 | 5 | 5 | 5 |
| TiO$_2$ concentration in second outer cladding (wt. %) | 8 | 4 | 6 | 8 |
| Overfilled Bandwidth at 850 nm (MHz-km) | 1089 | 1145 | 1951 | 1768 |
| Overfilled Bandwidth at 900 nm (MHz-km) | 1570 | 1570 | 3818 | 3549 |
| Overfilled Bandwidth at 953 nm (MHz-km) | 2404 | 2460 | 14069 | 17760 |
| Overfilled Bandwidth at 1300 nm (MHz-km) | 13518 | 8300 | 2107 | 2050 |

Measurement of Stresses in Optical Fiber

Residual stresses in optical fibers are induced due to the viscosity and coefficient of thermal expansion differences from radial composition distribution. The mismatch in the properties result in thermal and mechanical stresses induced during the drawing process of manufacturing optical fibers. Residual stresses in optical fibers are measured using welldocumented methods in literature and familiar to those skilled in the art. These methods include measuring stresses using a polariscope or using traverse interferometry. Details of method for measuring residual stresses in optical fibers using polariscope are described in Park et al., Applied Optics, 41 (1), 21-26 (2002) and Chu and Whitbread, Applied Optics, 21 (23), 4241 (1982). The method entails immersing the optical fiber in an index matching fluid and impinging a light from a light source onto the optical fiber laterally. The ray entering the optical fiber is split into two components due to stress-induced birefringence. The two components experience different refractive indices in the optical fiber. As the light exits the fiber, the two components have a phase shift called retardation, with the magnitude of the retardation being a function of the ray incident position. The residual stresses can be estimated from the measurements of retardation as a function of ray incident position. Alternate method of measuring residual stresses is using the transverse interferometry method, as described in A. Yablon, "Advanced Fiber Characterization Technologies for Fiber Lasers and Amplifiers", Conference on Advanced Solid State Lasers, Paper # ATh2A.45, Shanghai, China, 16-21 Nov. 2014. The measurement of stresses using this method can be performed using the IFA instrument available from Interfiber Analysis LLC (Sharon, Mass., USA).

FIGS. 8A-8D illustrate axial stress of the multimode optical fiber 100 along the radial position with various designs of the second outer cladding, according to some embodiments of the present disclosure. It is noted that, the compressive stress applied on the surface of the reduced diameter multimode fibers in the example can be greater than 100 Mpa, greater than 130 Mpa, greater than 160 Mpa and may be less than 250 Mpa.

Figure 8A:
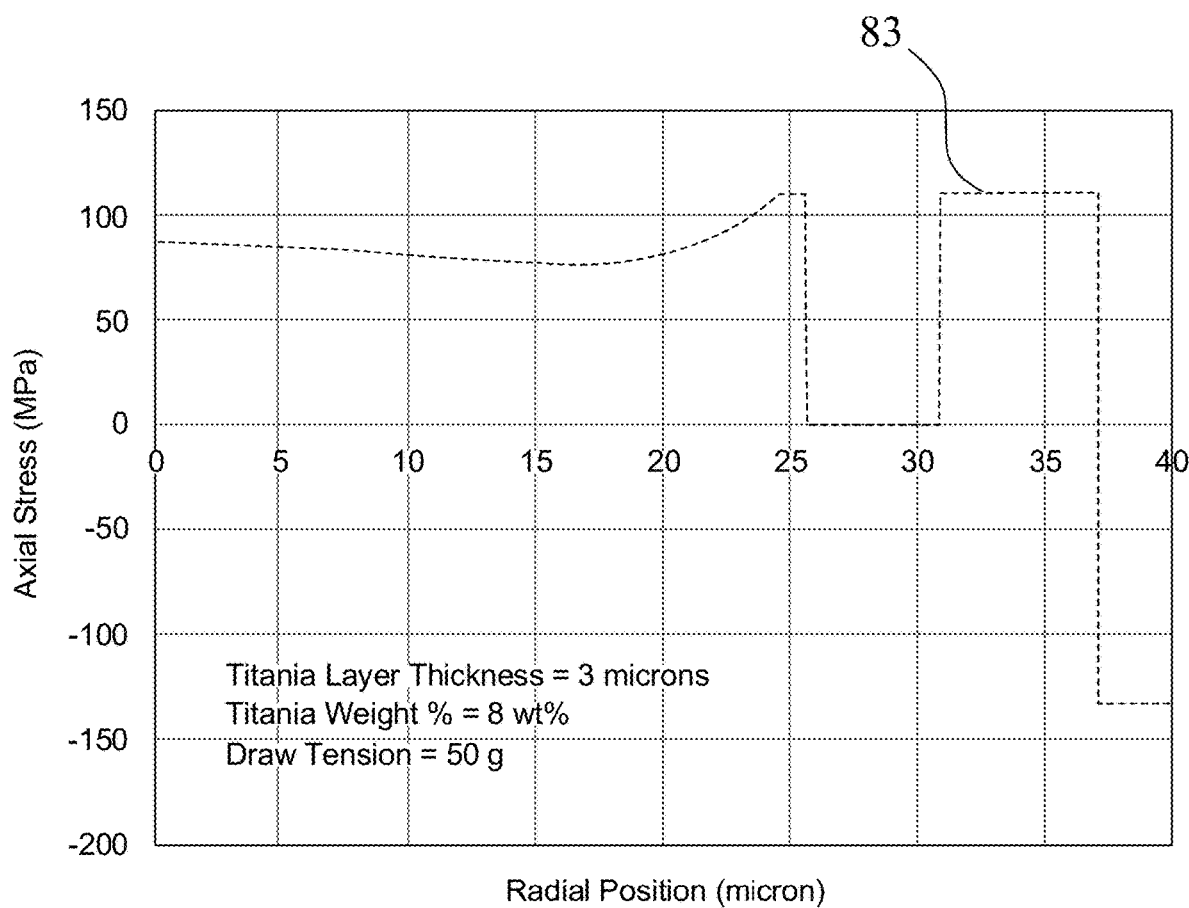
FIGS. 8A through 8D are exemplary axial stress profiles of an optical fiber, according to some embodiments.

Referring to FIG. 8A, the multimode optical fiber has a core/cladding designs and optical attributes as Ex. 1 listed above in Table 1. Specifically, the second outer cladding has a thickness of 3 microns and a titania concentration 8 wt %. The dotted line 83 shows the axial stress distribution of the multimode optical fiber along the radial position under a 50 g draw tension.

Figure 8B:
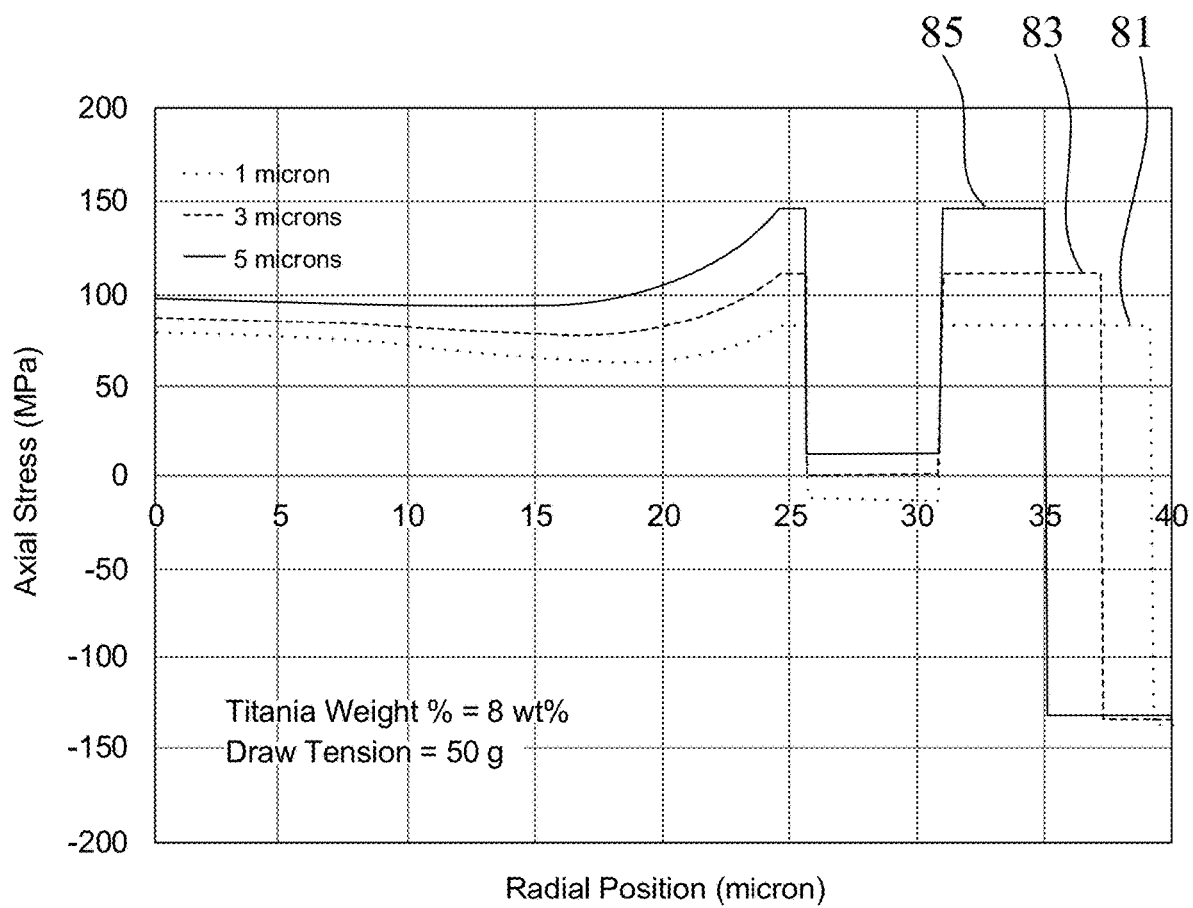

Referring to FIG. 8B, while keeping the titania concentration as 8 wt % and the draw tension as 50 g, the thickness of the second outer cladding is varied to show the changes of the axial stress of the multimode optical fiber. The dotted line 85 shows the axial stress distribution of the multimode optical fiber with a 1-micron-thick second outer cladding, the dashed line 83 shows the axial stress distribution of the multimode optical fiber with a 3-micron-thick second outer cladding, and the solid line 81 shows the axial stress distribution of the multimode optical fiber with a 5-micron-thick second outer cladding. As seen in FIG. 8B, a decreasing of the thickness of the second outer cladding can reduce the entire axial stress of the multimode optical fiber along the radial position.

Figure 8C:
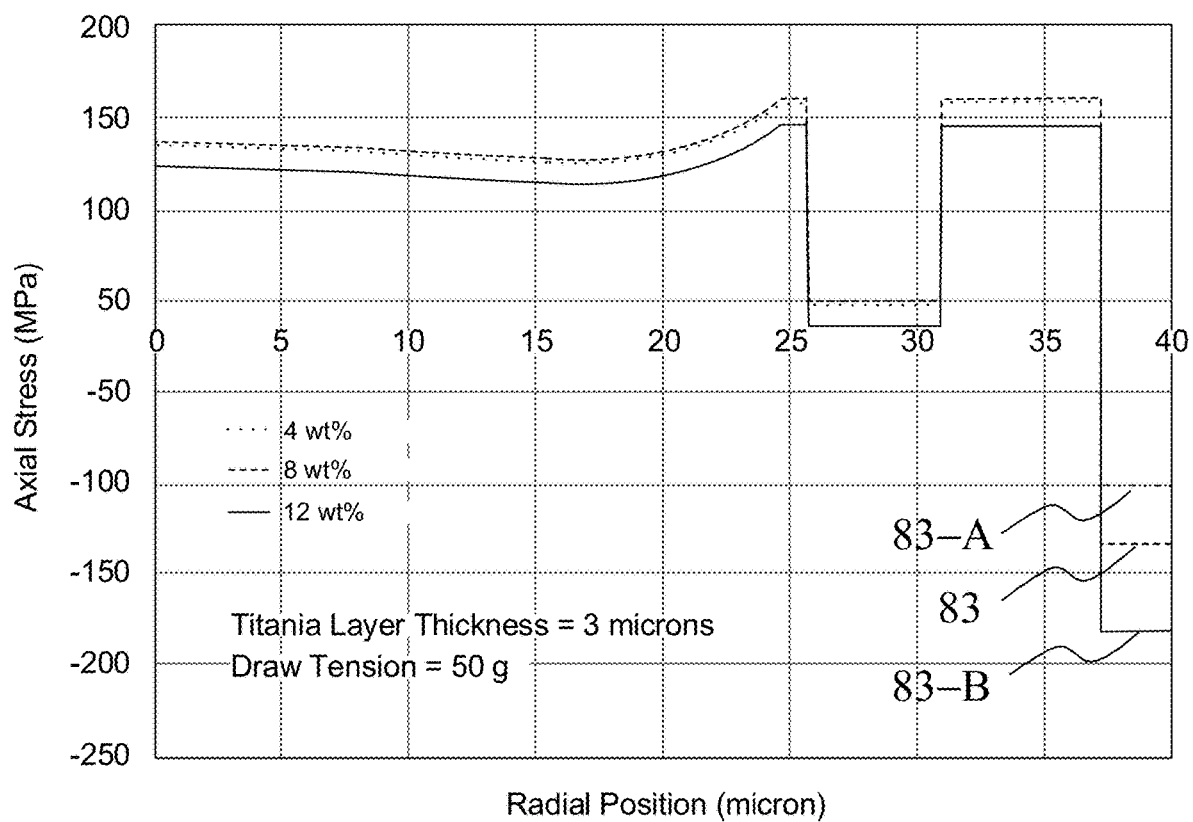

Referring to FIG. 8C, while keeping the thickness of the second outer cladding as 3 microns and the draw tension as 50 g, the titania concentration of the second outer cladding is varied to show the changes of the axial stress of the multimode optical fiber. The dotted line 83-A shows the axial stress distribution of the multimode optical fiber with a 4 wt % titania concentration of the second outer cladding, the dashed line 83 shows the axial stress distribution of the multimode optical fiber with an 8 wt % titania concentration of the second outer cladding, and the solid line 83-B shows the axial stress distribution of the multimode optical fiber with a 12 wt % titania concentration of the second outer cladding. As seen in FIG. 8C, an increasing of the titania concentration of the second outer cladding can only reduce the axial stress of the second outer cladding of the multimode optical fiber.

Figure 8D:
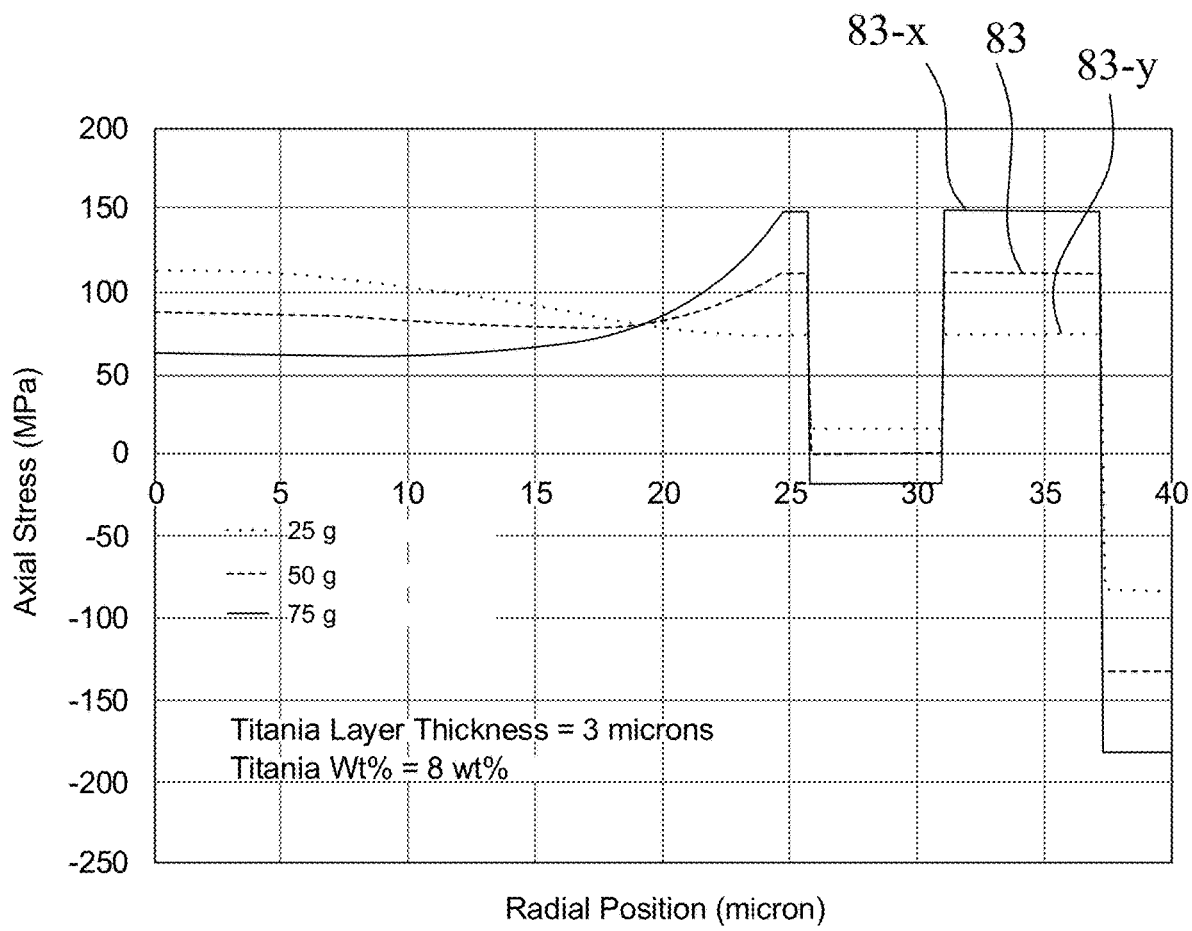

Referring to FIG. 8D, while keeping the thickness of the second outer cladding as 3 microns and the titania concentration as 8 wt %, the draw tension is varied to show the changes of the axial stress of the multimode optical fiber. The dotted line 83-$x$ shows the axial stress distribution of the multimode optical fiber under a 25 g draw tension, the dashed line 83 shows the axial stress distribution of the multimode optical fiber under a 50 g draw tension, and the solid line 83-$y$ shows the axial stress distribution of the multimode optical under a 75 g draw tension. As seen in FIG. 8D, an increasing of the draw tension can increase the distribution difference of the axial stress of the multimode optical fiber along the radial position.

The following examples illustrate preparation of a representative primary and secondary coatings. Measurements of selected properties of the representative primary and secondary coatings are also described. In addition, modeled properties of glass fibers coated with primary and secondary coatings at different coating thickness and modulus are presented.

Design Examples—Primary Coating

Primary Coating—Oligomer. The primary coating composition included an oligomer. For purposes of illustration, preparation of exemplary oligomers from H12MDI (4,4'-methylene bis(cyclohexyl isocyanate), PPG4000 (polypropylene glycol with $M_n$~ 4000 g/mol) and HEA (2-hydroxyethyl acrylate) in accordance with the reaction scheme hereinabove is described. All reagents were used as supplied by the manufacturer and were not subjected to further purification. H12MDI was obtained from ALDRICH. PPG4000 was obtained from COVESTRO and was certified to have an unsaturation of 0.004 meq/g as determined by the method described in the standard ASTM D4671-16. HEA was obtained from KOWA.

The relative amounts of the reactants and reaction conditions were varied to obtain a series of six oligomers. Oligomers with different initial molar ratios of the constituents were prepared with molar ratios of the reactants satisfying H12MDI:HEA:PPG4000=n:m:p, where n was in the range from 3.0 to 4.0, m was in the range from 1.5n to 3 to 2.5n to 5, and p=2. In the reactions used to form the oligomers materials, dibutyltin dilaurate was used as a catalyst (at a level of 160 ppm based on the mass of the initial reaction mixture) and 2,6-di-tert-butyl-4-methylphenol (BHT) was used as an inhibitor (at a level of 400 ppm based on the mass of the initial reaction mixture).

The amounts of the reactants used to prepare each of the six oligomers are summarized in Table 3 below. The six oligomers are identified by separate Sample numbers 1-6. Corresponding sample numbers will be used herein to refer to coating compositions and cured films formed from coating compositions that individually contain each of the six oligomers. The corresponding mole numbers used in the preparation of each of the six samples are listed in Table 4 below. The mole numbers are normalized to set the mole number p of PPG4000 to 2.0.

TABLE 3

Reactants and Amounts for Exemplary Oligomer Samples 1-6

| Sample | H12MDI (g) | HEA (g) | PPG4000 (g) |
|---|---|---|---|
| 1 | 22 | 6.5 | 221.5 |
| 2 | 26.1 | 10.6 | 213.3 |
| 3 | 26.1 | 10.6 | 213.3 |
| 4 | 27.8 | 12.3 | 209.9 |
| 5 | 27.8 | 12.3 | 209.9 |
| 6 | 22 | 6.5 | 221.5 |

TABLE 4

Mole Numbers for Oligomer Samples 1-6

| Sample | H12MDI Mole Number (n) | HEA Mole Number (m) | PPG4000 Mole Number (p) | Di-adduct (wt %) |
|---|---|---|---|---|
| 1 | 3.0 | 2.0 | 2.0 | 1.3 |
| 2 | 3.7 | 3.4 | 2.0 | 3.7 |
| 3 | 3.7 | 3.4 | 2.0 | 3.7 |
| 4 | 4.0 | 4.0 | 2.0 | 5.0 |
| 5 | 4.0 | 4.0 | 2.0 | 5.0 |
| 6 | 3.0 | 2.0 | 2.0 | 1.3 |

The oligomers were prepared by mixing 4,4'-methylene bis(cyclohexyl isocyanate), dibutyltin dilaurate and 2,6-di-tert-butyl-4 methylphenol at room temperature in a 500 mL flask. The 500 mL flask was equipped with a thermometer, a $CaCl_2$ drying tube, and a stirrer. While continuously stirring the contents of the flask, PPG4000 was added over a time period of 30-40 minutes using an addition funnel. The internal temperature of the reaction mixture was monitored as the PPG4000 was added and the introduction of PPG4000 was controlled to prevent excess heating (arising from the exothermic nature of the reaction). After the PPG4000 was added, the reaction mixture was heated in an oil bath at about 70° C. to 75° C. for about 1 to 1½ hours. At various intervals, samples of the reaction mixture were retrieved for analysis by infrared spectroscopy (FTIR) to monitor the progress of the reaction by determining the concentration of unreacted isocyanate groups. The concentration of unreacted isocyanate groups was assessed based on the intensity of a characteristic isocyanate stretching mode near 2265 $cm^{-1}$. The flask was removed from the oil bath and its contents were allowed to cool to below 65° C. Addition of supplemental HEA was conducted to insure complete quenching of isocyanate groups. The supplemental HEA was added dropwise over 2-5 minutes using an addition funnel. After addition of the supplemental HEA, the flask was returned to the oil bath and its contents were again heated to about 70° C. to 75° C. for about 1 to 1½ hours. FTIR analysis was conducted on the reaction mixture to assess the presence of isocyanate groups and the process was repeated until enough supplemental HEA was added to fully react any unreacted isocyanate groups. The reaction was deemed complete when no appreciable isocyanate stretching intensity was detected in the FTIR measurement. The HEA amounts listed in Table 1 include the initial amount of HEA in the composition and any amount of supplemental HEA needed to quench unreacted isocyanate groups.

The concentration (wt %) of di-adduct compound in each oligomer was determined by gel permeation chromatography (GPC). A Waters Alliance 2690 GPC instrument was used to determine the di-adduct concentration. The mobile phase was THF. The instrument included a series of three Polymer Labs columns. Each column had a length of 300 mm and an inside diameter of 7.5 mm. Two of the columns (columns 1 and 2) were sold under Part No. PL1110-6504 by Agilent Technologies and were packed with PLgel Mixed D stationary phase (polystyrene divinyl benzene copolymer, average particle size=5 microns, specified molecular weight range=200 g/mol to 400,000 g/mol). The third column (column 3) was sold under Part No. PL1110-6520 by Agilent Technologies and was packed with PLgel 100A stationary phase (polystyrene divinyl benzene copolymer, average particle size=5 microns, specified molecular weight range=up to 4,000 g/mol). The columns were calibrated with polystyrene standards ranging from 162 g/mol to 6,980,000 g/mol using EasiCal PS-1 & 2 polymer calibrant kits (Agilent Technologies Part Nos. PL2010-505 and PL2010-0601). The GPC instrument was operated under the following conditions: flow rate=1.0 mL/min, column temperature=40° C., injection volume=100 µL, and run time=35 min (isocratic conditions). The detector was a Waters Alliance 2410 differential refractometer operated at 40° C. and sensitivity level 4. The samples were injected twice along with a THF+0.05% toluene blank.

The amount (wt %) of di-adduct in the oligomers was quantified using the preceding GPC system and technique. A calibration curve was obtained using standard solutions containing known amounts of the di-adduct compound (HEA~H12MDI-HEA) in THF. Standard solutions with di-adduct concentrations of 115.2 µg/g, 462.6 µg/g, 825.1 µg/g, and 4180 µg/g were prepared. (As used herein, the dimension "µg/g" refers to µg of di-adduct per gram of total solution (di-adduct+THF)). Two 100 µL aliquots of each di-adduct standard solution were injected into the column to obtain the calibration curve. The retention time of the di-adduct was approximately 23 min and the area of the GPC peak of the di-adduct was measured and correlated with di-adduct concentration. A linear correlation of peak area as a function of di-adduct concentration was obtained (correlation coefficient ($R^2$)=0.999564).

The di-adduct concentration in the oligomers was determined using the calibration. Samples were prepared by diluting ~0.10 g of oligomeric material in THF to obtain a ~1.5 g test solution. The test solution was run through the GPC instrument and the area of the peak associated with the di-adduct compound was determined. The di-adduct concentration in units of µg/g was obtained from the peak area and the calibration curve, and was converted to wt % by multiplying by the weight (g) of the test solution and dividing by the weight of the sample of oligomeric material before dilution with THF. The wt % of di-adduct compound present in each of the six oligomers prepared in this example are reported in Table 4.

Through variation in the relative mole ratios of H12MDI, HEA, and PPG4000, the illustrative oligomers include a polyether urethane compound of the type shown in molecular formula (IV) hereinabove and an enhanced concentration of di-adduct compound of the type shown in molecular formula (V) hereinabove.

Primary Coating—Compositions. Oligomers corresponding to Samples 1-6 were separately combined with other components to form a series of six coating compositions. The amount of each component in the coating composition is listed in Table 5 below. The entry in Table 5 for the oligomer includes the combined amount of polyether urethane acrylate compound and di-adduct compound present in the oligomer. A separate coating composition was made for each of the six exemplary oligomers corresponding to Samples 1-6, where the amount of di-adduct compound in the oligomeric material corresponded to the amount listed in Table 4.

TABLE 5

Coating Composition

| Component | Amount |
| --- | --- |
| Oligomeric Material | 49.10 wt % |
| Sartomer SR504 | 45.66 wt % |
| V-CAP/RC | 1.96 wt % |
| TPO | 1.47 wt % |
| Irganox 1035 | 0.98 wt % |
| adhesion promoter | 0.79 wt % |
| Tetrathiol | 0.03 wt % |

Sartomer SR504 is ethoxylated(4)nonylphenol acrylate (available from Sartomer). V-CAP/RC is N-vinylcaprolactam (available from ISP Technologies). TPO is 2,4,6-trimethylbenzoyl)diphenyl phosphine oxide (available from BASF under the trade name Lucirin and functions as a photoinitiator). Irganox 1035 is thiodiethylene bis[3-(3,5-di-tert-butyl)-4-hydroxy-phenyl) propionate] (available from BASF) and functions as an antioxidant. The adhesion promoters were 3-acryloxypropyl trimethoxysilane (available from Gelest) and 3-mercaptopropyl trimethoxysilane (available from Aldrich). 3-acryloxypropyl trimethoxysilane was used for Samples 1, 3, and 5. 3-mercaptopropyl trimethoxysilane was used for Samples 2, 4, and 6. Tetrathiol is a catalyst quencher.

The coating compositions of Table 5 were each formulated using a high-speed mixer in an appropriate container heated to 60° C., with a heating band or heating mantle. In each case, the components were weighed into the container using a balance and allowed to mix until the solid components were thoroughly dissolved and the mixture appeared homogeneous. The oligomer and monomers (SR504, NVC) of each composition were blended together for at least 10 minutes at 55° C. to 60° C. The photoinitiator, antioxidant, and catalyst quencher were then added, and blending was continued for one hour while maintaining a temperature of 55° C. to 60° C. Finally, the adhesion promoter was added, and blending was continued for 30 minutes at 55° C. to 60° C. to form the coating compositions.

Primary Coating—Properties—Tensile Properties. Tensile properties (Young's modulus, tensile strength at yield, and elongation at yield) were measured on films formed by curing the six coating compositions. Separate films were formed from each coating composition. Wet films of the coating composition were cast on silicone release paper with the aid of a draw-down box having a gap thickness of about 0.005". The wet films were cured with a UV dose of 1.2 J/cm$^2$ (measured over a wavelength range of 225 to 424 nm by a Light Bug model IL490 from International Light) by a Fusion Systems UV curing apparatus with a 600 W/in D-bulb (50% Power and approximately 12 ft/min belt speed) to yield cured coatings in film form. Cured film thickness was between about 0.0030" and 0.0035".

The films were aged (23° C., 50% relative humidity) for at least 16 hours prior to testing. Film samples were cut to dimensions of 12.5 cm×13 mm using a cutting template and a scalpel. Young's modulus, tensile strength at yield, and elongation at yield were measured at room temperature (approximately 20° C.) on the film samples using a MTS Sintech tensile test instrument following procedures set forth in ASTM Standard D882-97. Young's modulus is defined as the steepest slope of the beginning of the stress-strain curve. Films were tested at an elongation rate of 2.5 cm/min with the initial gauge length of 5.1 cm. The results are shown in Table 6.

TABLE 6

Young's Modulus, Tensile Strength, and Elongation of Film Samples

| Sample | Young's Modulus (MPa) | Tensile Strength (MPa) | Elongation (%) |
| --- | --- | --- | --- |
| 1 | 0.72 | 0.51 | 137.9 |
| 2 | 0.57 | 0.44 | 173 |
| 3 | 1.0 | 0.86 | 132.8 |
| 4 | 0.71 | 0.45 | 122.3 |
| 5 | 0.72 | 0.56 | 157.4 |
| 6 | 0.33 | 0.33 | 311.9 |

Primary Coating—Properties—In Situ Modulus. In situ modulus measurements of primary coating composition Samples 2, 3, and 5 were completed. In situ modulus measurements require forming the primary coatings on a glass fiber having a diameter of 125 microns. Each of Samples 2, 3, and 5 was separately applied as a primary coating composition to a glass fiber as the glass fiber was being drawn. The fiber draw speed was 50 m/s. The primary coating compositions were cured using a stack of five LED sources. Each LED source was operated at 395 nm and had an intensity of 12 W/cm$^2$. Subsequent to application and curing of the primary coating compositions, a secondary coating composition was applied to each of the cured primary coatings and cured using UV sources to form a secondary coating layer. The thickness of the primary coating was 32.5 microns and the thickness of the secondary coating was 26.0 microns.

The in situ modulus was measured using the following procedure. A six-inch sample of fiber was obtained and a one-inch section from the center of the fiber was window stripped and wiped with isopropyl alcohol. The window-stripped fiber was mounted on a sample holder/alignment stage equipped with 10 mm×5 mm rectangular aluminum tabs that were used to affix the fiber. Two tabs were oriented horizontally and positioned so that the short 5 mm sides were facing each other and separated by a 5 mm gap. The window-stripped fiber was laid horizontally on the sample holder across the tabs and over the gap separating the tabs. The coated end of one side of the window-stripped region of the fiber was positioned on one tab and extended halfway into the 5 mm gap between the tabs. The one-inch window-stripped region extended over the remaining half of the gap and across the opposing tab. After alignment, the sample was moved and a small dot of glue was applied to the half of each tab closest to the 5 mm gap. The fiber was then returned to position and the alignment stage was raised until the glue just touched the fiber. The coated end was then pulled away from the gap and through the glue such that the majority of the 5 mm gap between the tabs was occupied by the window-stripped region of the fiber. The portion of the window-stripped region remaining on the opposing tab was in contact with the glue. The very tip of the coated end was left to extend beyond the tab and into the gap between the tabs. This portion of the coated end was not embedded in the glue and was the object of the in situ modulus measurement. The glue was allowed to dry with the fiber sample in this configuration to affix the fiber to the tabs. After drying, the length of fiber fixed to each of the tabs was trimmed to 5 mm. The coated length embedded in glue, the non-embedded coated length (the portion extending into the gap between the tabs), and the primary diameter were measured.

The in situ modulus measurements were performed on a Rheometrics DMTA IV dynamic mechanical testing apparatus at a constant strain of 9e–6 1/s for a time of forty-five minutes at room temperature (21° C.). The gauge length was 15 mm. Force and the change in length were recorded and used to calculate the in situ modulus of the primary coating. The tab-mounted fiber samples were prepared by removing any epoxy from the tabs that would interfere with the 15 mm clamping length of the testing apparatus to ensure that there was no contact of the clamps with the fiber and that the sample was secured squarely to the clamps. The instrument force was zeroed out. The tab to which the non-coated end of the fiber was affixed was then mounted to the lower clamp (measurement probe) of the testing apparatus and the tab to which the coated end of the fiber was affixed was mounted to the upper (fixed) clamp of the testing apparatus. The test was then executed and the sample was removed once the analysis was completed.

The in situ modulus of primary coating Samples 2, 3, and 5 are listed in Table 7.

TABLE 7

In Situ Modulus of Selected Primary Coatings

| Sample | In-Situ Modulus (MPa) |
|---|---|
| 2 | 0.27 |
| 3 | 0.33 |
| 5 | 0.3 |

Design Examples—Secondary Coating

Secondary Coating Compositions. Representative curable secondary coating compositions are listed in Table 8.

TABLE 8

Secondary Coating Compositions

| | Composition | | | |
|---|---|---|---|---|
| Component | KA | KB | KC | KD |
| SR601 (wt %) | 72.0 | 30.0 | 30.0 | 30.0 |
| SR602 (wt %) | | 37.0 | 37.0 | 37.0 |
| SR349 (wt %) | | 30.0 | 15.0 | |
| SR399 (wt %) | | | 15.0 | |
| SR499 (wt %) | | | | 30.0 |
| CD9038 (wt %) | 10.0 | | | |
| Photomer 3016 (wt %) | 15.0 | | | |
| TPO (wt %) | 1.5 | | | |
| Irgacure 184 (wt %) | 1.5 | | | |
| Irgacure 1850 (wt %) | | 3.0 | 3.0 | 3.0 |
| Irganox 1035 (pph) | 0.5 | | | |
| DC-190 (pph) | 1.0 | | | |

SR601 is ethoxylated (4) bisphenol A diacrylate (a monomer). SR602 is ethoxylated (10) bisphenol A diacrylate (a monomer). SR349 is ethoxylated (2) bisphenol A diacrylate (a monomer). SR399 is dipentaerythritol pentaacrylate. SR499 is ethoxylated (6) trimethylolpropane triacrylate. CD9038 is ethoxylated (30) bisphenol A diacrylate (a monomer). Photomer 3016 is bisphenol A epoxy diacrylate (a monomer). TPO is a photoinitiator. Irgacure 184 is 1-hydroxycyclohexylphenyl ketone (a photoinitiator). Irgacure 1850 is bis(2,6-dimethoxybenzoyl)-2,4,4-trimethylpentylphosphine oxide (a photoinitiator). Irganox 1035 is thiodiethylene bis(3,5-di-tert-butyl)-4-hydroxyhydrocinnamate (an antioxidant). DC190 is silicone-ethylene oxide/propylene oxide copolymer (a slip agent). The concentration unit "pph" refers to an amount relative to a base composition that includes all monomers, oligomers, and photoinitiators. For example, for secondary coating composition KA, a concentration of 1.0 pph for DC-190 corresponds to 1 g DC-190 per 100 g combined of SR601, CD9038, Photomer 3016, TPO, and Irgacure 184.

A comparative curable secondary coating composition (A) and three representative curable secondary coating compositions (SB, SC, and SD) within the scope of the disclosure are listed in Table 9.

TABLE 9

Secondary Coating Compositions

| | Composition | | | |
|---|---|---|---|---|
| Component | A | SB | SC | SD |
| PE210 (wt %) | 15.0 | 15.0 | 15.0 | 15.0 |
| M240 (wt %) | 72.0 | 72.0 | 72.0 | 62.0 |
| M2300 (wt %) | 10.0 | — | — | — |
| M3130 (wt %) | — | 10.0 | — | — |
| M370 (wt %) | — | — | 10.0 | 10.0 |
| TPO (wt %) | 1.5 | 1.5 | 1.5 | 1.5 |
| Irgacure 184 (wt %) | 1.5 | 1.5 | 1.5 | 1.5 |
| Irganox 1035 (pph) | 0.5 | 0.5 | 0.5 | 0.5 |
| DC-190 (pph) | 1.0 | 1.0 | 1.0 | 1.0 |

PE210 is bisphenol-A epoxy diacrylate (available from Miwon Specialty Chemical, Korea), M240 is ethoxylated (4) bisphenol-A diacrylate (available from Miwon Specialty Chemical, Korea), M2300 is ethoxylated (30) bisphenol-A diacrylate (available from Miwon Specialty Chemical, Korea), M3130 is ethoxylated (3) trimethylolpropane triacrylate (available from Miwon Specialty Chemical, Korea), TPO (a photoinitiator) is (2,4,6-trimethylbenzoyl)diphenyl phosphine oxide (available from BASF), Irgacure 184 (a photoinitiator) is 1-hydroxycyclohexyl-phenyl ketone (available from BASF), Irganox 1035 (an antioxidant) is benzenepropanoic acid, 3,5-bis(1,1-dimethylethyl)-4-hydroxythiodi-2,1-ethanediyl ester (available from BASF). DC190 (a slip agent) is silicone-ethylene oxide/propylene oxide copolymer (available from Dow Chemical). The concentration unit "pph" refers to an amount relative to a base composition that includes all monomers and photoinitiators. For example, for secondary coating composition A, a concentration of 1.0 pph for DC-190 corresponds to 1 g DC-190 per 100 g combined of PE210, M240, M2300, TPO, and Irgacure 184.

Secondary Coating—Properties. The Young's modulus, tensile strength at break, and elongation at break of secondary coatings made from secondary compositions A, KA, KB, KC, KD, SB, SC and SD were measured.

Secondary Coating—Properties—Measurement Techniques. Properties of secondary coatings were determined using the measurement techniques described below:

Tensile Properties. The curable secondary coating compositions were cured and configured in the form of cured rod samples for measurement of Young's modulus, tensile strength at yield, yield strength, and elongation at yield. The cured rods were prepared by injecting the curable secondary composition into Teflon® tubing having an inner diameter of about 0.025". The rod samples were cured using a Fusion D bulb at a dose of about 2.4 J/cm$^2$ (measured over a wavelength range of 225-424 nm by a Light Bug model IL390 from International Light). After curing, the Teflon® tubing was stripped away to provide a cured rod sample of the secondary coating composition. The cured rods were allowed to condition for 18-24 hours at 23° C. and 50% relative humidity before testing. Young's modulus, tensile strength at break, yield strength, and elongation at yield were measured using a Sintech MTS Tensile Tester on defect-free rod samples with a gauge length of 51 mm, and a test speed of 250 mm/min. Tensile properties were measured according to ASTM Standard D882-97. The properties were determined as an average of at least five samples, with defective samples being excluded from the average.

In Situ Modulus of Secondary Coating. For secondary coatings, the in situ modulus was measured using fiber tube-off samples prepared from the fiber samples. A Miller stripper (0.0055 inch) was clamped down approximately 1 inch from the end of the fiber sample. This one-inch region of fiber sample was immersed into a stream of liquid nitrogen and held for 3 seconds. The fiber sample was then removed and quickly stripped. The stripped end of the fiber sample was then inspected. If coating remained on the glass portion of the fiber sample, the tube-off sample was deemed defective and a new tube-off sample was prepared. A proper tube-off sample is one that stripped clean from the glass and consisted of a hollow tube with primary and secondary coating. The glass, primary and secondary coating diameter were measured from the end-face of the un-stripped fiber sample.

The fiber tube-off samples were run using a Rheometrics DMTA IV instrument at a sample gauge length 11 mm to obtain the in situ modulus of the secondary coating. The width, thickness, and length were determined and provided as input to the operating software of the instrument. The sample was mounted and run using a time sweep program at ambient temperature (21° C.) using the following parameters:

Frequency: 1 Rad/sec
Strain: 0.3%
Total Time=120 sec.
Time Per Measurement=1 sec
Initial Static Force=15.0 g
Static>Dynamic Force by=10.0%

Once completed, the last five E' (storage modulus) data points were averaged. Each sample was run three times (fresh sample for each run) for a total of fifteen data points. The averaged value of the three runs was reported.

Puncture Resistance of Secondary Coating. Puncture resistance measurements were made on samples that included a glass fiber, a primary coating, and a secondary coating. The glass fiber had a diameter of 125 microns. The primary coating was formed from the reference primary coating composition listed in Table 10 below. Samples with various secondary coatings were prepared as described below. The thicknesses of the primary coating and secondary coating were adjusted to vary the cross-sectional area of the secondary coating as described below. The ratio of the thickness of the secondary coating to the thickness of the primary coating was maintained at about 0.8 for all samples.

The puncture resistance was measured using the technique described in the article entitled "Quantifying the Puncture Resistance of Optical Fiber Coatings", by G. Scott Glaesemann and Donald A. Clark, published in the Proceedings of the $52^{nd}$ International Wire & Cable Symposium, pp. 237-245 (2003). A summary of the method is provided here. The method is an indentation method. A 4-centimeter length of optical fiber was placed on a 3 mm-thick glass slide. One end of the optical fiber was attached to a device that permitted rotation of the optical fiber in a controlled fashion. The optical fiber was examined in transmission under 100× magnification and rotated until the secondary coating thickness was equivalent on both sides of the glass fiber in a direction parallel to the glass slide. In this position, the thickness of the secondary coating was equal on both sides of the optical fiber in a direction parallel to the glass slide. The thickness of the secondary coating in the directions normal to the glass slide and above or below the glass fiber differed from the thickness of the secondary coating in the direction parallel to the glass slide. One of the thicknesses in the direction normal to the glass slide was greater and the other of the thicknesses in the direction normal to the glass slide was less than the thickness in the direction parallel to the glass slide. This position of the optical fiber was fixed by taping the optical fiber to the glass slide at both ends and is the position of the optical fiber used for the indentation test.

Indentation was carried out using a universal testing machine (Instron model 5500R or equivalent). An inverted microscope was placed beneath the crosshead of the testing machine. The objective of the microscope was positioned directly beneath a 750 diamond wedge indenter that was installed in the testing machine. The glass slide with taped fiber was placed on the microscope stage and positioned directly beneath the indenter such that the width of the indenter wedge was orthogonal to the direction of the optical fiber. With the optical fiber in place, the diamond wedge was lowered until it contacted the surface of the secondary coating. The diamond wedge was then driven into the secondary coating at a rate of 0.1 mm/min and the load on the secondary coating was measured. The load on the secondary coating increased as the diamond wedge was driven deeper into the secondary coating until puncture occurred, at which point a precipitous decrease in load was observed. The indentation load at which puncture was observed was recorded and is reported herein as grams of force. The experiment was repeated with the optical fiber in the same orientation to obtain ten measurement points, which were averaged to determine a puncture resistance for the orientation. A second set of ten measurement points was taken by rotating the orientation of the optical fiber by 180°.

Microbending. In the wire mesh covered drum test, the attenuation of light at wavelength of 1550 nm through a coated fiber having a length of 750 m was determined at room temperature. The microbend induced attenuation was determined by the difference between a zero-tension deployment and a high-tension deployment on the wire mesh drum. Separate measurements were made for two winding configurations. In the first configuration, the fiber was wound in a zero-tension configuration on an aluminum drum having a smooth surface and a diameter of approximately 400 mm. The zero-tension winding configuration provided a stress-free reference attenuation for light passing through the fiber. After sufficient dwell time, an initial attenuation measurement was performed. In the second winding configuration, the fiber sample was wound to an aluminum drum that was wrapped with fine wire mesh. For this deployment, the barrel surface of the aluminum drum was covered with wire mesh and the fiber was wrapped around the wire mesh. The mesh was wrapped tightly around the barrel without stretching and was kept intact without holes, dips, tearing, or damage. The wire mesh material used in the measurements was made from corrosion-resistant type 304 stainless steel woven wire cloth and had the following characteristics: mesh per linear inch: 165×165, wire diameter: 0.0019", width opening: 0.0041", and open area %: 44.0. A 750 m length of coated fiber was wound at 1 m/s on the wire mesh covered drum at 0.050 cm take-up pitch while applying 80 (+/−1) grams of tension. The ends of the fiber were taped to maintain tension and there were no fiber crossovers. The points of contact of the wound fiber with the mesh impart stress to the fiber and the attenuation of light through the wound fiber is a measure of stress-induced (microbending) losses of the fiber. The wire drum measurement was performed after a dwell time of 1-hour. The increase in fiber attenuation (in dB/km) in the measurement performed in the second configuration (wire mesh covered drum) relative to the first configuration (smooth drum) was determined for each wavelength. The average of three trials was determined at each wavelength and is reported as the wire mesh microbend loss.

Reference Primary Coating. In measurements of in situ glass transition temperature ($T_g$), puncture resistance, and wire mesh covered drum microbending attenuation, the measurement samples included a primary coating between the glass fiber and a secondary coating. The primary coating composition had the formulation given in Table 10 and is typical of commercially available primary coating compositions.

TABLE 10

Reference Primary Coating Composition

| Component | Amount |
|---|---|
| Oligomeric Material | 50.0 wt % |
| SR504 | 46.5 wt % |
| NVC | 2.0 wt % |
| TPO | 1.5 wt % |
| Irganox 1035 | 1.0 pph |
| 3-Acryloxypropyl trimethoxysilane | 0.8 pph |
| Pentaerythritol tetrakis(3-mercaptopropionate) | 0.032 pph | where the oligomeric material was prepared as described above from H12MVDI, HEA, and PPG4000 using a molar ratio n:m:p=3.5:3.0:2.0, SR504 is ethoxylated(4)nonylphenol acrylate (available from Sartomer), NVC is N-vinylcaprolactam (available from Aldrich), TPO (a photoinitiator) is (2,4,6-trimethylbenzoyl)-diphenyl phosphine oxide (available from BASF), Irganox 1035 (an antioxidant) is benzenepropanoic acid, 3,5-bis(1,1-dimethylethyl)-4-hydroxythiodi-2,1-ethanediyl ester (available from BASF), 3-acryloxypropyl trimethoxysilane is an adhesion promoter (available from Gelest), and pentaerythritol tetrakis(3-mercaptopropionate) (also known as tetrathiol, available from Aldrich) is a chain transfer agent. The concentration unit "pph" refers to an amount relative to a base composition that includes all monomers, oligomers, and photoinitiators. For example, a concentration of 1.0 pph for Irganox 1035 corresponds to 1 g Irganox 1035 per 100 g combined of oligomeric material, SR504, NVC, and TPO.

Secondary Coatings Properties Tensile Properties. The results of tensile property measurements prepared from the curable secondary compositions are shown in Table 11.

TABLE 11

Tensile Properties of Secondary Coatings

| Composition | Tensile Strength (MPa) | Elongation at yield (%) | Yield Strength (MPa) | Young's Modulus (MPa) |
|---|---|---|---|---|
| KA | 54.3 | 39.0 | | 1528 |
| KB | 63.1 | 24.1 | | 1703 |
| KC | 45.7 | 28.4 | | 1242 |
| KD | 61.8 | 32.5 | | 1837 |

TABLE 11-continued

Tensile Properties of Secondary Coatings

| Composition | Tensile Strength (MPa) | Elongation at yield (%) | Yield Strength (MPa) | Young's Modulus (MPa) |
|---|---|---|---|---|
| A | 86.09 | 4.60 | 48.21 | 2049 |
| SB | 75.56 | 4.53 | 61.23 | 2532 |
| SC | 82.02 | 4.76 | 66.37 | 2653 |
| SD | 86.08 | 4.87 | 70.05 | 2776 |

The results show that secondary coatings prepared from compositions SB, SC, and SD exhibited higher Young's modulus, and higher yield strength than the secondary coating prepared from comparative composition A. The higher values represent improvements that make secondary coatings prepared for the curable coating compositions disclosed herein better suited for small diameter optical fibers. More specifically, the higher values enable use of thinner secondary coatings on optical fibers without sacrificing performance. Thinner secondary coatings reduce the overall diameter of the optical fiber and provide higher fiber counts in cables of a given cross-sectional area.

The Young's modulus of secondary coatings prepared as cured products from the curable secondary coating compositions disclosed herein is greater than 2400 MPa, or greater than 2500 MPa, or greater than 2600 MPa, or greater than 2700 MPa, or in the range from 2400 MPa to 3000 MPa, or in the range from 2600 MPa to 2800 MPa.

The yield strength of secondary coatings prepared as cured products from the curable secondary coating compositions disclosed herein is greater than 55 MPa, or greater than 60 MPa, or greater than 65 MPa, or greater than 70 MPa, or in the range from 55 MPa to 75 MPa, or in the range from 60 MPa to 70 MPa.

Figure 9:
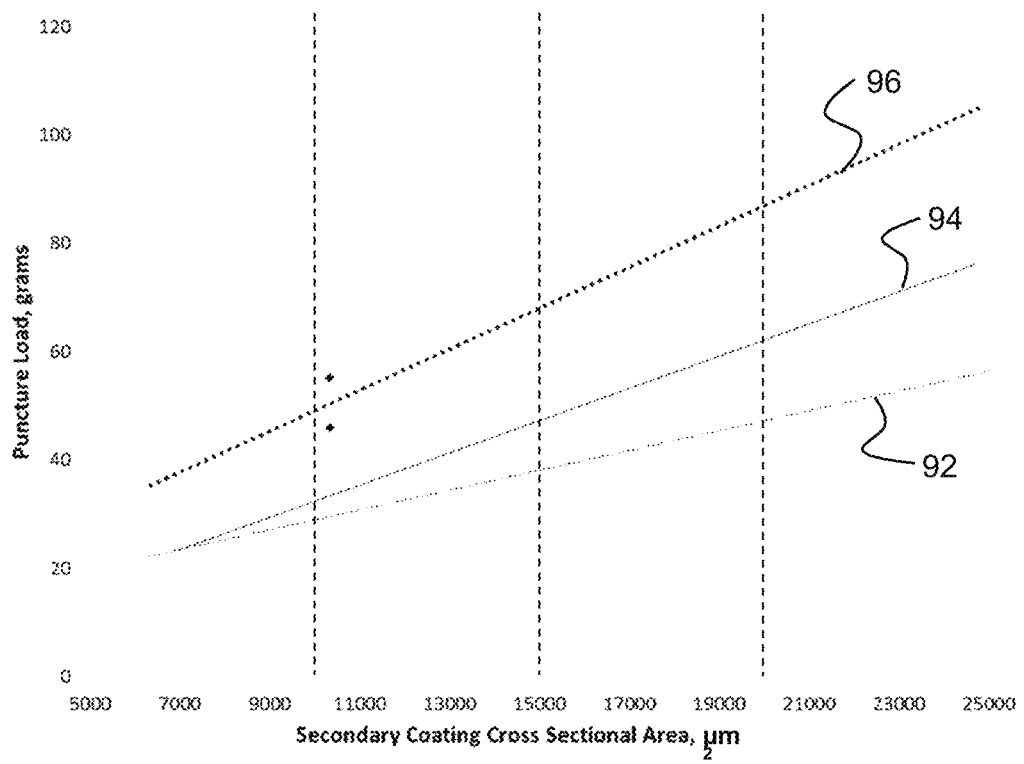
FIG. 9 shows the dependence of puncture load on cross-sectional area for three secondary coatings.

Secondary Coatings—Properties—Puncture Resistance. The puncture resistance of secondary coatings made from comparative curable secondary coating composition A, a commercial curable secondary coating composition (CPC6e) from a commercial vendor (DSM Desotech) having a proprietary composition, and curable secondary coating composition SD was determined according to the method described above. Several fiber samples with each of the three secondary coatings were prepared. Each fiber sample included a glass fiber with a diameter of 125 microns, a primary coating formed from the reference primary coating composition listed in Table 10, and one of the three secondary coatings. Samples with various secondary coatings were prepared. The thicknesses of the primary coating and secondary coating were adjusted to vary the cross-sectional area of the secondary coating as shown in FIG. 9. The ratio of the thickness of the secondary coating to the thickness of the primary coating was maintained at about 0.8 for all samples.

Fiber samples with a range of thicknesses were prepared for each of the secondary coatings to determine the dependence of puncture load on the thickness of the secondary coating. One strategy for achieving higher fiber count in cables is to reduce the thickness of the secondary coating. As the thickness of the secondary coating is decreased, however, its performance diminishes and its protective function is compromised. Puncture resistance is a measure of the protective function of a secondary coating. A secondary coating with a high puncture resistance withstands greater impact without failing and provides better protection for the glass fiber.

The puncture load as a function of cross-sectional area for the three coatings is shown in FIG. 9. Cross-sectional area is selected as a parameter for reporting puncture load because an approximately linear correlation of puncture load with cross-sectional area of the secondary coating was observed. Traces 92, 94, and 96 shows the approximate linear dependence of puncture load on cross-sectional area for the comparative secondary coatings obtained by curing the comparative CPC6e secondary coating composition, the comparative curable secondary coating composition A, and curable secondary coating composition SD; respectively. The vertical dashed lines are provided as guides to the eye at cross-sectional areas of 10000 micron$^2$, 15000 micron$^2$, and 20000 micron$^2$ as indicated.

The CPC6e secondary coating depicted in Trace 92 corresponds to a conventional secondary coating known in the art. The comparative secondary coating A depicted in Trace 94 shows an improvement in puncture load for high cross-sectional areas. The improvement, however, diminishes as the cross-sectional area decreases. This indicates that a secondary coating obtained as a cured product from comparative curable secondary coating composition A is unlikely to be suitable for low diameter, high fiber count applications. Trace 96, in contrast, shows a significant increase in puncture load for the secondary coating obtained as a cured product from curable secondary coating composition SD. At a cross-sectional area of 7000 micron$^2$, for example, the puncture load of the secondary coating obtained from curable secondary coating composition SD is 50% or more greater than the puncture load of either of the other two secondary coatings.

The puncture load of secondary coatings formed as cured products of the curable secondary coating compositions disclosed herein at a cross-sectional area of 10000 micron$^2$ is greater than 36 g, or greater than 40 g, or greater than 44 g, or greater than 48 g, or in the range from 36 g to 52 g, or in the range from 40 g to 48 g. The puncture load of secondary coatings formed as cured products of the curable secondary coating compositions disclosed herein at a cross-sectional area of 15000 micron$^2$ is greater than 56 g, or greater than 60 g, or greater than 64 g, or greater than 68 g, or in the range from 56 g to 72 g, or in the range from 60 g to 68 g. The puncture load of secondary coatings formed as cured products of the curable secondary coating compositions disclosed herein at a cross-sectional area of 20000 micron$^2$ is greater than 68 g, or greater than 72 g, or greater than 76 g, or greater than 80 g, or in the range from 68 g to 92 g, or in the range from 72 g to 88 g. Embodiments include secondary coatings having any combination of the foregoing puncture loads.

As used herein, normalized puncture load refers to the ratio of puncture load to cross-sectional area. The puncture load of secondary coatings formed as cured products of the curable secondary coating compositions disclosed herein have a normalized puncture load greater than $3.2 \times 10^{13}$ g/micron$^2$, or greater than $3.6 \times 10^{-3}$ g/micron$^2$, or greater than $4.0 \times 10^{-3}$ g/micron$^2$, or greater than $4.4 \times 10^{-3}$ g/micron$^2$, or greater than $4.8 \times 10^{-3}$ g/micron$^2$, or in the range from $3.2 \times 10^{-3}$ g/micron$^2$ to $5.6 \times 10^{-3}$ g/micron$^2$, or in the range from $3.6 \times 10^{-3}$ g/micron$^2$ to $5.2 \times 10^{-3}$ g/micron$^2$, or in the range from $4.0 \times 10^{-3}$ g/micron$^2$ to $4.8 \times 10^{-3}$ g/micron$^2$.

Design Examples—Coated Optical Fibers

Modeled Results. The experimental examples and principles disclosed herein indicate that by varying the mole numbers n, m, and p, it is possible to control the relative amount of di-adduct compound in the oligomer as well as the properties of cured films formed from the primary coating compositions over a wide range, including the ranges specified herein for Young's modulus and in situ modulus. Similarly, variations in the type and concentration of different monomers in the secondary composition leads to variations in the Young's modulus over the range disclosed herein. Curing dose is another parameter that can be used to vary modulus of primary and secondary coatings formed from the curable compositions disclosed herein.

To examine the effect of the thickness and modulus of the primary and secondary coatings on transmission of a radial force to a glass fiber, a series of modeled examples was considered. In the model, a radial external load P was applied to the surface of the secondary coating of an optical fiber and the resulting load at the surface of the glass fiber was calculated. The glass fiber was modeled with a Young's modulus of 73.1 GPa (consistent with silica glass) and a diameter of 125 microns. The Poisson ratios $v_p$ and $v_s$ of the primary and secondary coatings were fixed at 0.48 and 0.33, respectively. A comparative sample C1 and six samples M1-M6 in accordance with the present disclosure were considered. The comparative sample included primary and secondary coatings with thicknesses and moduli consistent with optical fibers known in the art. Samples M1-M6 are examples with reduced thicknesses of the primary and secondary coatings. Parameters describing the configurations of the primary and secondary coatings are summarized in Table 12.

TABLE 12

Coating Properties of Modeled Optical Fibers

| | Primary Coating | | | Secondary Coating | | |
|---|---|---|---|---|---|---|
| Sample | In Situ Modulus (MPa) | Diameter (microns) | Thickness (microns) | Young's Modulus (MPa) | Diameter (microns) | Thickness (microns) |
| C1 | 0.20 | 190 | 32.5 | 1600 | 242 | 26.0 |
| M1 | 0.14 | 167 | 21.0 | 1900 | 200 | 16.5 |
| M2 | 0.12 | 161 | 18.0 | 1900 | 190 | 14.5 |
| M3 | 0.10 | 155 | 15.0 | 2000 | 180 | 12.5 |
| M4 | 0.09 | 150 | 12.5 | 2300 | 170 | 10.0 |
| M5 | 0.12 | 145 | 15.0 | 2200 | 170 | 12.5 |
| M6 | 0.11 | 138 | 14.0 | 2200 | 160 | 11.0 |

Table 13 summarizes the load P1 at the outer surface of the glass fiber as a fraction of load P applied to the surface of the secondary coating. The ratio P1/P is referred to herein as the load transfer parameter and corresponds to the fraction of external load P transmitted through the primary and secondary coatings to the surface of the glass fiber. The load P is a radial load and the load transfer parameter P1/P was calculated from a model based on the equations below:

$$\frac{P_1}{P} = \frac{4(1-v_p)(1-v_s)}{\{A+B\}}$$

where $$A = \left( \frac{E_s(1+v_p)(1-2v_p)\left(1-(r_4/r_5)^2\right)\left(1-(r_5/r_6)^2\right)}{E_p(1+v_s)} \right)$$

and $$B = \left( \left(1-2v_p(r_4/r_5)^2 + (r_4/r_5)^2\right)\left(1-2v_s(r_5/r_6)^2 + (r_5/r_6)^2\right) \right)$$

In the equations, $v_p$ and $v_s$ are the Poisson's ratios of the primary and secondary coatings, $r_4$ is the outer radius of the glass fiber, $r_5$ is the outer radius of the primary coating, $r_6$ is the outer radius of the secondary coating, $E_P$ is the in situ modulus of the primary coating, and $E_s$ is the Young's modulus of the secondary coating. The scaled load transfer parameter P1/P (scaled) in Table 13 corresponds to the ratio P1/P for each sample relative to comparative sample C1.

TABLE 13

Load Transfer Parameter (P1/P) at Surface of Glass Fiber

| Sample | P1/P | P1/P (scaled) |
| --- | --- | --- |
| C1 | 0.0178 | 1.00 |
| M1 | 0.0171 | 0.97 |
| M2 | 0.0175 | 0.98 |
| M3 | 0.0172 | 0.97 |
| M4 | 0.0170 | 0.95 |
| M5 | 0.0167 | 0.94 |
| M6 | 0.0166 | 0.94 |

The modeled examples show that despite smaller coating thicknesses, optical fibers having primary and secondary coatings as described herein exhibit a reduction in the force experienced by a glass fiber relative to a comparative optical fiber having conventional primary and secondary coatings with conventional thicknesses. The resulting reduction in overall size of the optical fibers described herein enables higher fiber count in cables of a given size (or smaller cable diameters for a given fiber count) without increasing the risk of damage to the glass fiber caused by external forces.

The scaled load transfer parameter $P_1/P$ (scaled) of the secondary coating is less than 0.99, or less than 0.97, or less than 0.95. The load transfer parameter $P_1/P$ of the secondary coating is less than 0.0200, or less than 0.0180, or less than 0.0178, or less than 0.0176, or less than 0.0174, or less than 0.0172, or less than 0.0170, or less than 0.0168, or in the range from 0.0160-0.0180, or in the range from 0.0162-0.0179, or in the range from 0.0164-0.0178, or in the range from 0.0166-0.0177, or in the range from 0.0168-0.0176.

A first set of nine modeled design examples Ex. 1 through Ex. 9 of the multimode optical fiber 100 as listed in Tables 1-2 above with different coating designs and optical attributes are set forth in Tables 14-15 below. All the exemplary optical fibers in Ex. 1-Ex. 9 set forth in Tables 14 and 15 have a small primary in situ modulus $E_P$ (e.g., 0.2 MPa, 0.18 MPa, 0.1 MPa, etc.) and a large secondary Young's modulus $E_s$ (e.g., 2000 MPa, 2250 MPa, 2300 MPa, 2500 MPa, 2775 MPa, etc.).

TABLE 14

Coating Design Examples of Mutimode Optical Fibers (1)

| Parameter | Ex. 1 | Ex. 2 | Ex. 3 | Ex. 4 | Ex. 5 |
| --- | --- | --- | --- | --- | --- |
| Radius of glass fiber $r_{4b}$ (micron) | 40.25 | 40.25 | 40.25 | 40.25 | 40.25 |
| Primary in situ modulus $E_p$ (MPa) | 0.20 | 0.20 | 0.20 | 0.20 | 0.20 |
| Primary coating radius $r_5$ (micron) | 62.50 | 62.50 | 49.50 | 49.50 | 62.50 |
| Thickness of primary coating $r_5$-$r_{4b}$ (micron) | 22.30 | 22.25 | 7.25 | 9.25 | 22.25 |
| Secondary Young's modulus $E_s$ (MPa) | 2000 | 2000 | 2000 | 2000 | 2000 |
| Secondary coating radius $r_6$ (micron) | 82.50 | 82.50 | 62.50 | 62.50 | 77.50 |
| Thickness of secondary coating $r_6$-$r_5$ (micron) | 20.00 | 20.00 | 13.00 | 13.00 | 15.00 |
| Spring constant $\chi_p$ (MPa) | 0.36 | 0.36 | 1.11 | 0.87 | 0.36 |

TABLE 15

Coating Design Examples of Mutimode Optical Fibers (2)

| Parameter | Ex. 6 | Ex. 7 | Ex. 8 | Ex. 9 |
| --- | --- | --- | --- | --- |
| Radius of glass fiber $r_{4b}$ (micron) | 40.00 | 40.25 | 40.25 | 40.25 |
| Primary modulus $E_p$ (MPa) | 0.18 | 0.18 | 0.10 | 0.10 |
| Primary coating radius $r_5$ (micron) | 62.50 | 62.50 | 50.00 | 50.00 |
| Thickness of primary coating $r_5$-$r_{4b}$ (micron) | 22.5 | 22.25 | 9.75 | 9.75 |
| Secondary modulus $E_s$ (MPa) | 2250 | 2500 | 2300 | 2775 |
| Secondary coating radius $r_6$ (micron) | 82.50 | 82.50 | 62.50 | 62.50 |
| Thickness of secondary coating $r_6$-$r_5$ (micron) | 20 | 20 | 12.5 | 12.5 |
| Spring constant $\chi_p$ (MPa) | 0.32 | 0.33 | 0.41 | 0.41 |

A second set of nine modeled design examples Ex. 10 through Ex. 18 of the multimode optical fiber 100 with different coating designs and optical attributes are set forth in Tables 16-17 below. All the exemplary optical fibers in Ex. 10-Ex. 18 set forth in Tables 16 and 17 have a small primary in situ modulus $E_P$ (e.g., 0.26 MPa, 0.20 MPa, 0.30 MPa, etc.) and a large secondary Young's modulus $E_s$ (e.g., 2000 MPa, 2250 MPa, 2100 MPa, 1900 MPa, 2650 MPa, etc.).

TABLE 16

Coating Design Examples of Mutimode Optical Fibers (3)

| Parameter | Ex. 10 | Ex. 11 | Ex. 12 | Ex. 13 | Ex. 14 |
| --- | --- | --- | --- | --- | --- |
| Radius of glass fiber $r_{4b}$ (micron) | 40 | 40 | 40 | 40 | 40 |
| Primary in situ modulus $E_p$ (MPa) | 0.26 | 0.20 | 0.30 | 0.20 | 0.20 |
| Primary coating radius $r_5$ (micron) | 60 | 60 | 55 | 70 | 65 |
| Thickness of primary coating $r_5$-$r_{4b}$ (micron) | 20 | 20 | 15 | 30 | 25 |
| Secondary Young's modulus $E_s$ (MPa) | 2000 | 2500 | 2100 | 1900 | 2650 |
| Secondary coating radius $r_6$ (micron) | 82.5 | 78.5 | 77.5 | 77.5 | 82.5 |
| Thickness of secondary coating $r_6$-$r_5$ (micron) | 22.5 | 18.5 | 22.5 | 7.5 | 17.5 |
| Tertiary coating radius $r_7$ (micron) | — | 82.5 | 82.5 | 82.5 | — |
| Thickness of tertiary coating $r_7$-$r_6$ (micron) | — | 4 | 5 | 5 | — |
| Spring constant $\chi_p$ (MPa) | 1.04 | 0.80 | 1.60 | 0.53 | 0.64 |

TABLE 17

Coating Design Examples of Mutimode Optical Fibers (4)

| Parameter | Ex. 15 | Ex. 16 | Ex. 17 | Ex. 18 |
| --- | --- | --- | --- | --- |
| Radius of glass fiber $r_{4b}$ (micron) | 31.25 | 31.5 | 31.25 | 31.25 |
| Primary in situ modulus $E_p$ (MPa) | 0.26 | 0.30 | 0.20 | 0.20 |

TABLE 17-continued

Coating Design Examples of Mutimode Optical Fibers (4)

| Parameter | Ex. 15 | Ex. 16 | Ex. 17 | Ex. 18 |
|---|---|---|---|---|
| Primary coating radius $r_5$ (micron) | 49.25 | 51.5 | 46.25 | 51.0 |
| Thickness of primary coating $r_5$-$r_{4b}$ (micron) | 18 | 20 | 15 | 19.75 |
| Secondary Young's modulus $E_s$ (MPa) | 1800 | 2250 | 2400 | 2000 |
| Secondary coating radius $r_6$ (micron) | 67.5 | 65 | 56 | 63.5 |
| Thickness of secondary coating $r_6$-$r_5$ (micron) | 18.25 | 13.5 | 9.75 | 12.5 |
| Tertiary coating radius $r_7$ (micron) | — | — | 60 | 67.5 |
| Thickness of tertiary coating $r_7$-$r_6$ (micron) | — | — | 4 | 4 |
| Spring constant $\chi_p$ (MPa) | 0.90 | 0.95 | 0.83 | 0.63 |

Fabricating the Optical Fibers

The optical fibers described here can be made using the standards methods of making optical fiber. A core cane comprising the core and the trench region can be made using processes such as OVD, VAD, MCVD and PCVD. In some embodiments, the first outer cladding layer and the second outer cladding layer (e.g., titania-doped layer) can be put on the core cane in a single step to make the optical fiber preform. The first outer cladding layer and the second outer cladding layer (e.g., titania-doped layer) can be deposited on the core cane in laydown as soot in a single step, with the silica precursor introduced to the laydown burner during the deposition of layers corresponding to the first outer cladding layer, and silica and titania precursors introduced to the laydown burner during the deposition of layers corresponding to the second outer cladding layer (e.g., titania-doped layer). Silica precursors include $SiCl_4$ and OMCTS (octamethylcyclotetrasiloxane). Titania precursors include $TiCl_4$ and titanium alkoxides (e.g. Ti(isopropoxide)$_4$). The produced cane-soot layer can then be moved to a onsolidation furnace where it can be first dehydrated using a dehydration agent and then the temperature of the assembly can be increased to between 1350° C. to 1500° C. to sinter the soot layer to a void free densified preforms. In some embodiments, oxygen can be introduced during the sintering of the preform process to have the titania oxidation state of 4+ that results in the titania-doped layer to have higher transparency. In some embodiments, the dehydration agent can be chosen from chlorine, thionyl chlorine, silicon tetrachloride or combinations thereof. In some embodiments, the titania precursor can be titanium tetrachloride, titanium isopropoxide, or combination thereof. The formed sintered optical fiber can then be drawn into an optical fiber.

Figure 10:
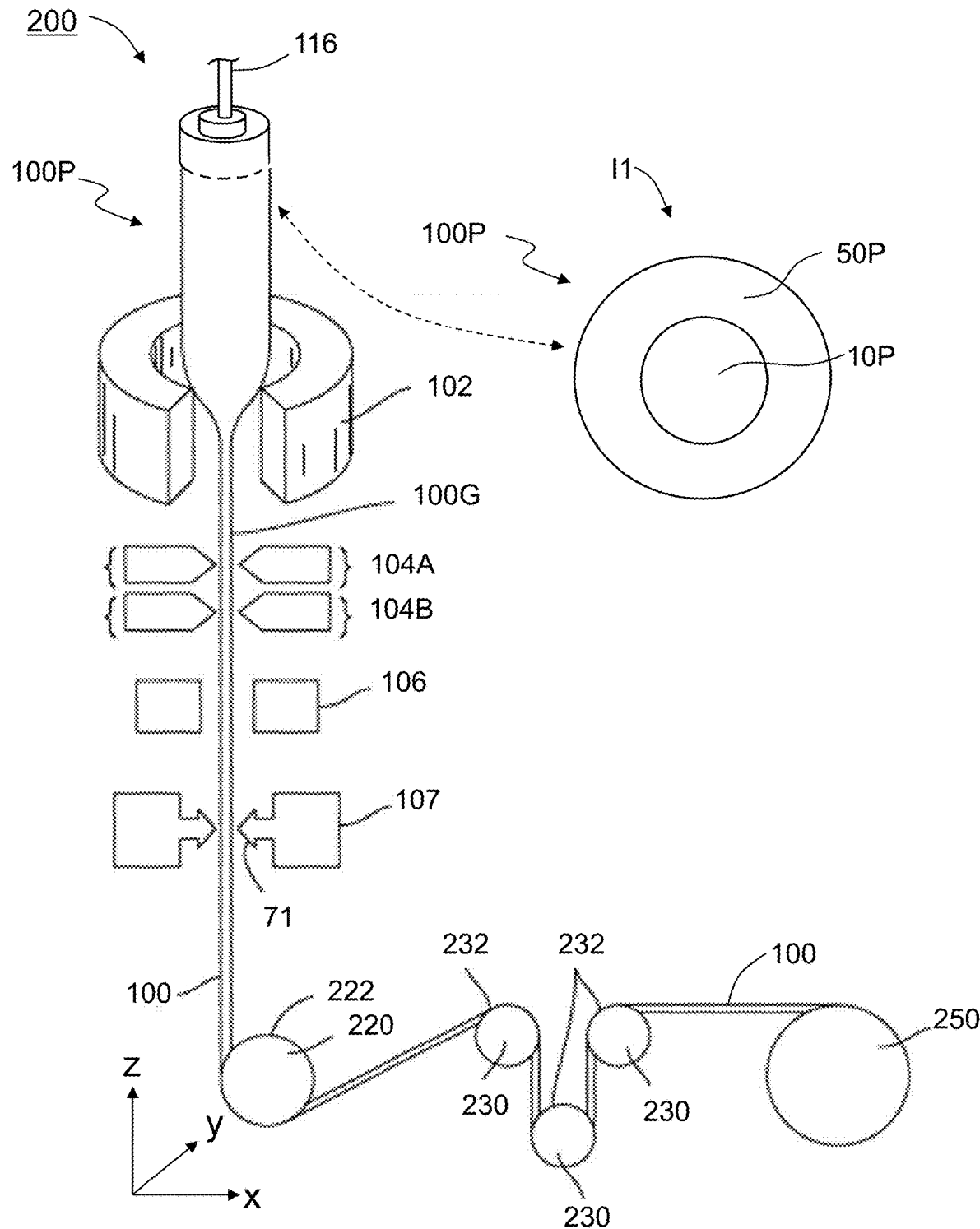
FIG. 10 is a schematic diagram of an exemplary optical fiber drawing system illustrating fabrication of an optical fiber, according to some embodiments.

FIG. 10 is a schematic diagram of an example optical fiber drawing system ("drawing system") 200 for drawing a glass preform 100P into the optical fiber 100, according to some embodiments. The multimode optical fiber 100 can be fabricated using the drawing system 200 and fiber drawing techniques known in the art.

The core and cladding layers of the glass preform can be produced in a single-step process or multi-step process using chemical vapor deposition (CVD) methods which are well known in the art. A variety of CVD processes are known and are suitable for producing the core and cladding layers used in the optical fibers of the present invention. They include outside vapor deposition process (OVD) process, vapor axial deposition (VAD) process, modified CVD (MCVD), and plasma-enhanced CVD (PECVD).

As shown in FIG. 10, the exemplary drawing system 200 can include a draw furnace ("furnace") 102 for heating the glass preform 100P to the glass melt temperature. In an example, the fiber draw process is carried out a glass melt temperature, which in an example is in the range from 1800° C. to 1900° C. A preform holder 116 is used to hold the glass preform 100P.

In some embodiments, the drawing system 200 also includes non-contact measurement sensors 104A and 104B for measuring the size of a drawn (bare) optical fiber 100G that exits the draw furnace 102 for size (diameter) control. A cooling station 106 can reside downstream of the measurement sensors 104A and 104B and is configured to cool the bare optical fiber 100G. A coating station 107 can reside downstream of the cooling station 106 and can be configured to deposit one or more protective coating materials 71 onto the bare optical fiber 100G to form the protective coating 70 including the primary coating 72, the secondary coating 74, and optionally the tertiary coating 76. A tensioner 220 can reside downstream of the coating station 107. The tensioner 220 can have a surface 222 that pulls (draws) the coated optical fiber 100. A set of guide wheels 230 with respective surfaces 232 resides downstream of the tensioner 220. The guide wheels 230 can serve to guide the coated optical fiber 100 to a fiber take-up spool ("spool") 250 for storage.

In some embodiments, the close-up inset I1 of FIG. 10 shows a cross-sectional view of the glass preform 100P used to fabricate the multimode optical fiber 100. The glass preform 100P includes a preform core 10P, and a preform cladding 50P comprising a preform inner cladding region, a preform depressed index cladding, a preform first outer cladding, and a preform second outer cladding (not shown). In some embodiments, the preform core 10P can be a graded refractive index core. The preform 100P can be fabricated using known techniques, such as an outside vapor deposition (OVD) process. The cross-sectional view of the coated multimode optical fiber 100 can be referred to the descriptions above in connection with FIGS. 1 and 2.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. A multimode optical fiber, comprising:
   a core region having an outer radius $r_1$ in a range from 20 microns to 30 microns;
   a cladding region surrounding and directly adjacent to the core region, the cladding region including a first outer cladding region having an outer radius $r_{4a}$ and a second outer cladding region surrounding and directly adjacent to the first outer cladding region and having an outer radius $r_{4b}$, wherein the second outer cladding region comprises silica-based glass doped with titania and $r_{4b}$ is less than or equal to 45 microns;
   a primary coating with an outer radius $r_5$ less than or equal to 80 microns surrounding and directly adjacent to the cladding region, the primary coating having a thickness ($r_5$-$r_4$) less than or equal to 30 microns; and
   a secondary coating with an outer radius $r_6$ less than or equal to 100 microns surrounding and directly adjacent to the primary coating, the secondary coating having a thickness ($r_6-r_5$) less than or equal to 30 microns, and a normalized puncture load greater than $3.6 \times 10^{-3}$ g/micron$^2$.

2. The multimode optical fiber of claim 1, wherein: the second outer cladding region has a titania concentration in a range from 4 wt % to 20 wt.

3. The multimode optical fiber of claim 1, wherein: the core region has a graded index relative refractive index profile with a maximum relative refractive index $\Delta_{1max}$ in a range from 0.8% to 1.20%.

4. The multimode optical fiber of claim 3, wherein the graded index relative refractive index profile is an α-profile with a value of α in a range from 1.8 to 2.3.

5. The multimode optical fiber of claim 3, wherein: the first outer cladding region has an outer radius $r_{4a}$ less than or equal to 43 microns; and the second outer cladding region has a thickness ($r_{4b}-r_{4a}$) in a range from 2 microns to 6 microns.

6. The multimode optical fiber of claim 1, wherein: the first outer cladding region has a relative refractive index $\Delta_{4a}$ that is in the range from −0.05% to 0.05%; and the second outer cladding region has a relative refractive index $\Delta_{4b}$ that is larger than $\Delta_{1max}$.

7. The multimode optical fiber of claim 1, wherein: the cladding region further includes an inner cladding region surrounding and directly adjacent to the core region, the inner cladding region having an outer radius $r_2$ and a thickness ($r_2-r_1$) in a range from 1 micron to 15 microns; and a relative refractive index $\Delta_2$ of the inner cladding region is less than a relative refractive index $\Delta_{4a}$ of the first outer cladding region.

8. The multimode optical fiber of claim 1, wherein: the cladding region further includes an inner cladding region surrounding and directly adjacent to the core region, the inner cladding region having an outer radius $r_2$ and a thickness ($r_2-r_1$) in a range from 1 micron to 15 microns; and a relative refractive index $\Delta_2$ of the inner cladding region is less than a relative refractive index $\Delta_{4b}$ of the second outer cladding region.

9. The multimode optical fiber of claim 1, wherein: the cladding region further includes an inner cladding region and a depressed index cladding region; the inner cladding region directly surrounds the core region, and has an outer radius $r_2$ and a thickness ($r_2-r_1$) in a range from 1 micron to 5 microns; the depressed index cladding region directly surrounds the inner cladding region, and has an outer radius $r_3$ and a thickness ($r_3-r_2$) in a range from 3 microns to 10 microns; and a relative refractive index $\Delta_2$ of the inner cladding region is greater than a relative refractive index $\Delta_3$ of the depressed index cladding region.

10. The multimode optical fiber of claim 9, wherein: the relative refractive index $\Delta_2$ is in the range from −0.05% to 0.05%; and the relative refractive index $\Delta_3$ is in a range from −0.55% to −0.1%.

11. The multimode optical fiber of claim 9, wherein: the depressed index cladding region has a trench volume in a range from 70% %Δ-micron$^2$ to 150%Δ-micron$^2$.

12. The multimode optical fiber of claim 1, wherein the in situ modulus of the primary coating $E_p$ is less than or equal to 0.30 MPa; and the Young's modulus of the secondary coating $E_s$ is greater than or equal to 1600 MPa.

13. The multimode optical fiber of claim 1, wherein: a diameter $2r_5$ of the primary coating is less than or equal to 150 microns; and a diameter $2r_6$ of the secondary coating is less than or equal to 180 microns.

14. The multimode optical fiber of claim 1, wherein the thickness ($r_5-r_4$) of the primary coating is in a range from 8.0 microns to 20.0 microns.

15. The multimode optical fiber of claim 1, wherein the thickness ($r_6-r_5$) of the secondary coating is in a range from 8.0 microns to 20.0 microns.

16. The multimode optical fiber of claim 1, wherein a ratio of the thickness ($r_5-r_4$) of the primary coating to the thickness ($r_6-r_5$) of the secondary coating is in a range from 0.5 to 1.5.

17. The multimode optical fiber of claim 1, wherein a spring constant $\chi_P$ of the primary coating is in a range from 0.3 MPa to 1.2 MPa.

18. The multimode optical fiber of claim 1, further comprising: a tertiary coating with an outer radius $r_7$ less than or equal to 100 microns surrounding and directly adjacent to the secondary coating, the tertiary coating having a thickness ($r_7-r_6$) less than or equal to 10 microns.

19. The multimode optical fiber of claim 1, wherein the primary coating is a cured product of a coating composition comprising:
a radiation-curable monomer;
an adhesion promoter, the adhesion promoter comprising an alkoxysilane compound or a mercapto-functional silane compound; and
an oligomer, the oligomer comprising:
a polyether urethane acrylate compound having the molecular formula:

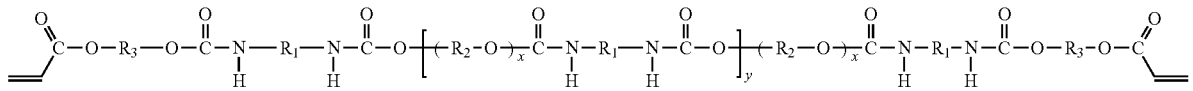

wherein
$R_1$, $R_2$ and $R_3$ are independently selected from linear alkylene groups, branched alkylene groups, or cyclic alkylene groups;
y is 1, 2, 3, or 4; and
x is between 40 and 100; and
a di-adduct compound having the molecular formula:

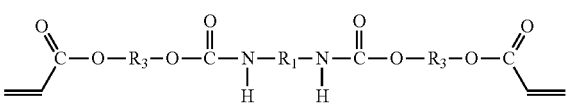

wherein the di-adduct compound is present in an amount of at least 1.0 wt % in the oligomer.

20. The multimode optical fiber of claim 19, wherein the oligomer is the cured product of a reaction between:
- a diisocyanate compound;
- a hydroxy (meth)acrylate compound; and
- a polyol compound, said polyol compound having unsaturation less than 0.1 meq/g;
- wherein said diisocyanate compound, said hydroxy (meth)acrylate compound and said polyol compound are reacted in molar ratios n:m:p, respectively, wherein n is in the range from 3.0 to 5.0, m is within ±15% of 2n−4, and p is 2.

21. The multimode optical fiber of claim 1, wherein the secondary coating is the cured product of a composition comprising:
- an alkoxylated bisphenol-A diacrylate monomer in an amount greater than 55 wt %, the alkoxylated bisphenol-A diacrylate monomer having a degree of alkoxylation in the range from 2 to 16; and
- a triacrylate monomer in an amount in the range from 2.0 wt % to 25 wt %, the triacrylate monomer comprising an alkoxylated trimethylolpropane triacrylate monomer having a degree of alkoxylation in the range from 2 to 16 or a tris[(acryloyloxy)alkyl] isocyanurate monomer.

22. The multimode optical fiber of claim 21, wherein the triacrylate monomer is present in an amount in the range from 8.0 wt % to 15 wt %.

23. An optical coupling comprising the multimode optical fiber of claim 1.

24. The optical coupling of claim 23, further comprising:
- a waveguide; and
- a connector structure in direct contact with the waveguide, the connector structure configured to support the multimode optical fiber at a bend radius $r_b$.

25. The optical coupling of claim 24, wherein the waveguide comprises a grating and the connector structure is configured to interface the multimode optical fiber with the grating.

26. The optical coupling of claim 24, wherein the bend radius $r_b$ is 3 mm or less.

27. The multimode optical fiber of claim 1, wherein the outer radius $r_{4a}$ of the first outer cladding region is in a range from 30 μm to 42 μm.

28. The multimode optical fiber of claim 1, wherein the first outer cladding region has a relative refractive index $\Delta_{4a}$ that is in the range from −0.05% to 0.05%.

* * * * *

UNITED STATES PATENT AND TRADEMARK OFFICE
CERTIFICATE OF CORRECTION

PATENT NO. : 11,579,359 B2
APPLICATION NO. : 17/316292
DATED : February 14, 2023
INVENTOR(S) : Kevin Wallace Bennett et al.

It is certified that error appears in the above-identified patent and that said Letters Patent is hereby corrected as shown below:

In the Claims

In Column 61, Line 7, in Claim 2, delete "20 wt." and insert -- 20 wt %. --.

In Column 62, Line 5, in Claim 11, delete "70% %" and insert -- 70% --.

Signed and Sealed this
Fifth Day of September, 2023

Katherine Kelly Vidal
*Director of the United States Patent and Trademark Office*